(12) United States Patent
Ely et al.

(10) Patent No.: US 7,406,393 B2
(45) Date of Patent: Jul. 29, 2008

(54) POSITION SENSOR

(75) Inventors: David Thomas Eliot Ely, Cambridgeshire (GB); Gareth John McCaughan, Cambridgeshire (GB); Geoffrey Foote, Cambridgeshire (GB)

(73) Assignee: Synaptics (UK) Limited, Waterbeach, Cambridgeshire (GB)

( * ) Notice: Subject to any disclaimer, the term of this patent is extended or adjusted under 35 U.S.C. 154(b) by 318 days.

(21) Appl. No.: 10/506,884

(22) PCT Filed: Nov. 22, 2002

(86) PCT No.: PCT/GB02/05247

§ 371 (c)(1),
(2), (4) Date: Mar. 22, 2005

(87) PCT Pub. No.: WO03/075213

PCT Pub. Date: Sep. 12, 2003

(65) Prior Publication Data

US 2005/0171714 A1 Aug. 4, 2005

(30) Foreign Application Priority Data

| Mar. 5, 2002 | (GB) | ................................. | 0205116.7 |
| Apr. 24, 2002 | (GB) | ................................. | 0209372.2 |
| May 21, 2002 | (WO) | ..................... | PCT/GB02/02387 |
| May 31, 2002 | (GB) | ................................. | 0212699.3 |

(51) Int. Cl.
*G01C 9/00* (2006.01)

(52) U.S. Cl. .................................... 702/150

(58) Field of Classification Search .................. 702/150
See application file for complete search history.

(56) References Cited

U.S. PATENT DOCUMENTS

| 2,145,742 A | 1/1939 | Wechsung |
| 2,867,783 A | 1/1959 | Childs |
| 2,942,212 A | 6/1960 | Mynall |
| 3,219,956 A | 11/1965 | Newell et al. |
| 3,297,940 A | 1/1967 | Mulligan et al. |

(Continued)

FOREIGN PATENT DOCUMENTS

DE 1134848 8/1962

(Continued)

OTHER PUBLICATIONS

Patent Abstracts of Japan, vol. 010, No. 009, (P-420), Jan. 14, 1986 & JP 60 165512 A (Toshiba KK), Aug. 28, 1985.

(Continued)

*Primary Examiner*—John E. Barlow, Jr.
*Assistant Examiner*—Aditya S. Bhat
(74) *Attorney, Agent, or Firm*—Nixon & Vanderhye PC

(57) ABSTRACT

A low cost x-y digitising system is described for use in consumer electronic devices, such as portable digital assistants, mobile telephones, web browsers and the like. The digitiser includes a resonant stylus, an excitation winding for energising the resonant stylus and a set of sensor windings for sensing the signal generated by the stylus, from which the x-y position of the stylus is determined. A novel stylus design is described together with novel digitiser windings and novel excitation and processing circuitry.

38 Claims, 40 Drawing Sheets

U.S. PATENT DOCUMENTS

| | | |
|---|---|---|
| 3,482,242 A | 12/1969 | Hargrove |
| 3,647,963 A | 3/1972 | Bailey |
| 3,772,587 A | 11/1973 | Ferrand et al. |
| 3,812,481 A | 5/1974 | Stednitz |
| 3,851,242 A | 11/1974 | Ellis |
| 3,873,770 A | 3/1975 | Ioannou |
| 3,895,356 A | 7/1975 | Kraus |
| 3,898,635 A | 8/1975 | Kulterman |
| 3,906,436 A | 9/1975 | Kurauchi et al. |
| 3,962,663 A | 6/1976 | Visser |
| 4,005,396 A | 1/1977 | Fujiwara et al. |
| 4,014,015 A | 3/1977 | Gundlach |
| 4,065,850 A | 1/1978 | Burr et al. |
| 4,081,603 A | 3/1978 | Davis et al. |
| 4,092,852 A | 6/1978 | Fowler et al. |
| 4,094,572 A | 6/1978 | Burr et al. |
| 4,097,684 A | 6/1978 | Burr |
| 4,150,352 A | 4/1979 | Pomella et al. |
| 4,156,192 A | 5/1979 | Schedrovitsky et al. |
| 4,210,775 A | 7/1980 | Rodgers et al. |
| 4,223,300 A | 9/1980 | Wiklund |
| 4,255,617 A | 3/1981 | Carau, Sr. et al. |
| 4,341,385 A | 7/1982 | Doyle et al. |
| 4,358,723 A | 11/1982 | Scholl et al. |
| 4,387,509 A | 6/1983 | Dechelette |
| 4,423,286 A | 12/1983 | Bergeron |
| 4,425,511 A | 1/1984 | Borsh |
| 4,482,784 A | 11/1984 | Whetstone |
| 4,504,832 A | 3/1985 | Conte |
| 4,507,638 A | 3/1985 | Borsh |
| 4,532,376 A | 7/1985 | Rockwell |
| 4,577,057 A | 3/1986 | Blesser |
| 4,577,058 A | 3/1986 | Collins |
| 4,593,245 A | 6/1986 | Vierti et al. |
| 4,609,776 A | 9/1986 | Murakami et al. |
| 4,642,321 A | 2/1987 | Schoenberg et al. |
| 4,672,154 A | 6/1987 | Rodgers et al. |
| 4,686,501 A | 8/1987 | Sing et al. |
| 4,693,778 A | 9/1987 | Swiggett et al. |
| 4,697,050 A | 9/1987 | Farel et al. |
| 4,697,144 A | 9/1987 | Howbrook |
| 4,697,244 A | 9/1987 | Murakami et al. |
| 4,704,501 A | 11/1987 | Taguchi et al. |
| 4,709,209 A | 11/1987 | Murakami et al. |
| 4,711,026 A | 12/1987 | Swiggett et al. |
| 4,711,977 A | 12/1987 | Miyamori et al. |
| 4,723,446 A | 2/1988 | Saito et al. |
| 4,734,546 A | 3/1988 | Landmeier |
| 4,737,698 A | 4/1988 | McMullin et al. |
| 4,748,295 A | 5/1988 | Rogers |
| 4,752,655 A | 6/1988 | Tajiri et al. |
| 4,786,765 A | 11/1988 | Yamanami et al. |
| 4,820,961 A | 4/1989 | McMullin |
| 4,821,002 A | 4/1989 | Luly |
| 4,848,496 A | 7/1989 | Murakami et al. |
| 4,868,443 A | 9/1989 | Rossi |
| 4,878,553 A | 11/1989 | Yamanami et al. |
| 4,891,590 A | 1/1990 | Hammel et al. |
| 4,893,077 A | 1/1990 | Auchterlonie |
| 4,902,858 A | 2/1990 | Yamanami et al. |
| 4,963,703 A | 10/1990 | Phillips |
| 4,975,546 A | 12/1990 | Craig |
| 4,985,691 A | 1/1991 | Pulyer et al. |
| 4,988,837 A | 1/1991 | Murakami et al. |
| 4,999,461 A | 3/1991 | Murakami et al. |
| 5,004,872 A | 4/1991 | Lasley |
| 5,013,047 A | 5/1991 | Schwab |
| 5,023,408 A | 6/1991 | Murakami et al. |
| 5,028,745 A | 7/1991 | Yamanami et al. |
| 5,041,785 A | 8/1991 | Bogaerts et al. |
| 5,045,645 A | 9/1991 | Hoendervoogt et al. |
| 5,059,180 A | 10/1991 | McLees |
| 5,066,833 A | 11/1991 | Zalenski |
| 5,082,286 A | 1/1992 | Ryan et al. |
| 5,088,928 A | 2/1992 | Chan |
| 5,122,623 A | 6/1992 | Zank et al. |
| 5,129,654 A | 7/1992 | Bogner |
| 5,134,388 A | 7/1992 | Murakami et al. |
| 5,134,689 A | 7/1992 | Murakami et al. |
| 5,136,125 A | 8/1992 | Russell |
| 5,177,389 A | 1/1993 | Schalk |
| 5,188,368 A | 2/1993 | Ryan |
| 5,206,785 A | 4/1993 | Hukashima |
| 5,218,174 A | 6/1993 | Gray et al. |
| 5,225,637 A | 7/1993 | Rodgers et al. |
| 5,239,489 A | 8/1993 | Russell |
| 5,245,336 A | 9/1993 | Chen et al. |
| 5,247,137 A | 9/1993 | Epperson |
| 5,247,138 A | 9/1993 | Landmeier |
| 5,274,198 A | 12/1993 | Landmeier |
| 5,342,136 A | 8/1994 | Fukami |
| 5,349,139 A | 9/1994 | Verrier et al. |
| 5,357,062 A | 10/1994 | Rockwell et al. |
| 5,369,227 A | 11/1994 | Stone |
| 5,381,091 A | 1/1995 | Kobayashi et al. |
| 5,396,443 A | 3/1995 | Mese et al. |
| 5,406,155 A | 4/1995 | Persson |
| 5,434,372 A | 7/1995 | Lin |
| 5,461,204 A | 10/1995 | Makinwa et al. |
| 5,486,731 A | 1/1996 | Masaki et al. |
| 5,525,981 A | 6/1996 | Abernethy |
| 5,554,827 A | 9/1996 | Oda |
| 5,557,076 A | 9/1996 | Wieczorek et al. |
| 5,571,997 A | 11/1996 | Gray et al. |
| 5,600,105 A | 2/1997 | Fukuzaki et al. |
| 5,619,431 A | 4/1997 | Oda |
| 5,625,239 A | 4/1997 | Persson et al. |
| 5,635,683 A | 6/1997 | McDermott et al. |
| 5,646,496 A | 7/1997 | Woodland et al. |
| 5,657,011 A | 8/1997 | Komatsu et al. |
| 4,878,553 A | 9/1997 | Yamanami et al. |
| 5,691,513 A | 11/1997 | Yamamoto et al. |
| 5,691,748 A | 11/1997 | Fukuzaki |
| 5,693,913 A | 12/1997 | Sudo et al. |
| 5,693,993 A | 12/1997 | Ito et al. |
| 5,748,110 A | 5/1998 | Sekizawa |
| 5,751,229 A | 5/1998 | Funahashi |
| 5,783,940 A | 7/1998 | Kolomeitsev |
| 5,815,091 A | 9/1998 | Dames |
| 5,818,091 A | 10/1998 | Lee et al. |
| 5,818,431 A | 10/1998 | Oh et al. |
| 5,826,473 A | 10/1998 | Saka et al. |
| 5,854,449 A | 12/1998 | Adkins |
| 5,864,098 A | 1/1999 | Shinohe |
| 5,866,847 A | 2/1999 | Saka et al. |
| 5,895,895 A | 4/1999 | Ono et al. |
| 5,914,735 A | 6/1999 | Yamamoto et al. |
| 5,943,044 A | 8/1999 | Martinelli et al. |
| 6,002,387 A | 12/1999 | Ronkka et al. |
| 6,005,555 A | 12/1999 | Katsurahira et al. |
| 6,124,708 A | 9/2000 | Dames |
| 6,236,199 B1 | 5/2001 | Irle et al. |
| 6,239,789 B1 | 5/2001 | Sekizawa et al. |
| 6,249,135 B1 | 6/2001 | Maruyama et al. |
| 6,249,234 B1 | 6/2001 | Ely et al. |
| 6,249,235 B1 | 6/2001 | Iwasaki |
| 6,255,810 B1 | 7/2001 | Irle et al. |
| 6,262,684 B1 | 7/2001 | Stewart et al. |
| 6,288,710 B1 | 9/2001 | Lee et al. |
| 6,304,014 B1 | 10/2001 | England et al. |
| 6,304,076 B1 | 10/2001 | Madni et al. |
| 6,489,899 B1 | 12/2002 | Ely et al. |
| 6,513,943 B2 | 2/2003 | Fukuyoshi |
| 6,522,128 B1 | 2/2003 | Ely et al. |

| | | | |
|---|---|---|---|
| 6,534,970 B1 | 3/2003 | Ely et al. | |
| 6,667,740 B2 * | 12/2003 | Ely et al. | 345/179 |
| 6,705,511 B1 | 3/2004 | Dames et al. | |
| 6,788,221 B1 | 9/2004 | Ely et al. | |
| 6,797,895 B2 | 9/2004 | Lapstun et al. | |
| 6,798,404 B2 | 9/2004 | Sharma | |
| 6,888,538 B2 * | 5/2005 | Ely et al. | 345/173 |
| 2001/0001430 A1 | 5/2001 | Ely et al. | |
| 2001/0006369 A1 | 7/2001 | Ely | |

FOREIGN PATENT DOCUMENTS

| | | |
|---|---|---|
| DE | 3500121 | 7/1986 |
| DE | 3620412 | 12/1987 |
| EP | 0159191 A2 | 10/1985 |
| EP | 0182085 A2 | 5/1986 |
| EP | 0182085 A3 | 5/1986 |
| EP | 0209513 A1 | 6/1986 |
| EP | 0218745 | 4/1987 |
| EP | 0 307 667 | 3/1989 |
| EP | 0313046 | 4/1989 |
| EP | 0 499 641 | 8/1992 |
| EP | 0 511 406 | 11/1992 |
| EP | 0537458 | 4/1993 |
| EP | 0552001 A1 | 7/1993 |
| EP | 0554900 | 8/1993 |
| EP | 0607694 A1 | 7/1994 |
| EP | 0657917 A1 | 6/1995 |
| EP | 0 672 997 | 9/1995 |
| EP | 0675581 A1 | 10/1995 |
| EP | 0680009 | 11/1995 |
| EP | 0680009 A2 | 11/1995 |
| EP | 0709648 A2 | 5/1996 |
| EP | 0716390 | 6/1996 |
| EP | 0743508 | 11/1996 |
| EP | 0772149 | 5/1997 |
| FR | 1325017 | 4/1963 |
| FR | 2298082 | 8/1976 |
| FR | 2682760 | 4/1993 |
| GB | 851543 | 10/1960 |
| GB | 1122763 | 8/1968 |
| GB | 1452132 | 10/1976 |
| GB | 2012431 A | 7/1979 |
| GB | 2021273 A | 11/1979 |
| GB | 2042183 A | 9/1980 |
| GB | 2059593 A | 4/1981 |
| GB | 2064125 A | 6/1981 |
| GB | 2074736 A | 11/1981 |
| GB | 1604824 | 12/1981 |
| GB | 2103943 A | 3/1983 |
| GB | 2141235 A | 12/1984 |
| JP | 63-211014 A | 9/1988 |
| JP | 02-248816 | 10/1990 |
| JP | 406051905 A | 2/1994 |
| TW | 287267 | 1/1996 |
| TW | 347542 | 11/1998 |
| WO | 92/12401 | 7/1992 |
| WO | 94/25829 | 11/1994 |
| WO | 95/31696 | 11/1995 |
| WO | 96/03188 A1 | 2/1996 |
| WO | 97/14935 | 4/1997 |
| WO | 98/00921 | 1/1998 |
| WO | 98/54545 | 12/1998 |
| WO | 98/58237 A | 12/1998 |
| WO | 99/34171 | 7/1999 |
| WO | 00/33244 A | 6/2000 |

OTHER PUBLICATIONS

Klatt, "Phase of Digital Data Fixes Shaft Angle", Electrical Design News, vol. 16, No. 12, Jun. 15, 1971, pp. 53-56. XP002045871.

Patent Abstracts of Japan, vol. 15, No. 37, (P-1159), Jan. 29, 1991 & JP 02 275314 A (Omron Tateisi Electron Co), Nov. 9, 1990.

Patent Abstracts of Japan, vol. 10, No. 32 (E-379), Feb. 7, 1986 & JP 60 189231 A (Matsushita Denki Sangyo KK), Sep. 26, 1985.

Pulle et al., "A New Magnetoresistive Based Sensor for Switched Reluctance Drives", Proceedings of the Annual Power Electronics Specialists Conference (PECS), Toledo, Jun. 29-Jul. 3, 1992, vol. 2, No. Conf, 23, Jun. 29, 1992, pp. 839-843, Institute of Electrical and Electronics Engineers.

Search Report for UK Application No. GB0416614.6 dated Oct. 22, 2004.

Search Report for PCT Application No. PCT/GB 99/03989 (published as WO 00/33244 A3) dated Aug. 23, 2000.

Search Report for PCT Application No. PCT/GB 03/02432 (published as WO 2003/105072 A3) dated May 11, 2004.

McDonnel, "The Use of Inductosyn to Digital Converters in Linear Control Systems", Automation, vol. 10, No. 11-12, Nov. 1975-Dec. 1975, pp. 31-32.

Electronics Letters, vol. 11, No. 1, Jan. 9, 1975, pp. 5-6, Gordon, "Digital xy Position Indicator Using Walsh Functions".

International Search Report for International Patent Application No. PCT/GB02/05247 dated May 23, 2005.

International Search Report for International Patent Application No. PCT/GB02/02387 dated Jan. 8, 2004.

British Examination Report for British Patent Application No. GB0422091.9 dated Jun. 1, 2005.

"Physics 2CL Lab Manual" Online! 1999, XP002327778, Retrieved from the Internet: URL:http://hep.ucsd.edu/dbmacf/1998-1999/2cl/manual/experiment3.pdf, Retrieved on May 11, 2005, pp. 51-61.

* cited by examiner

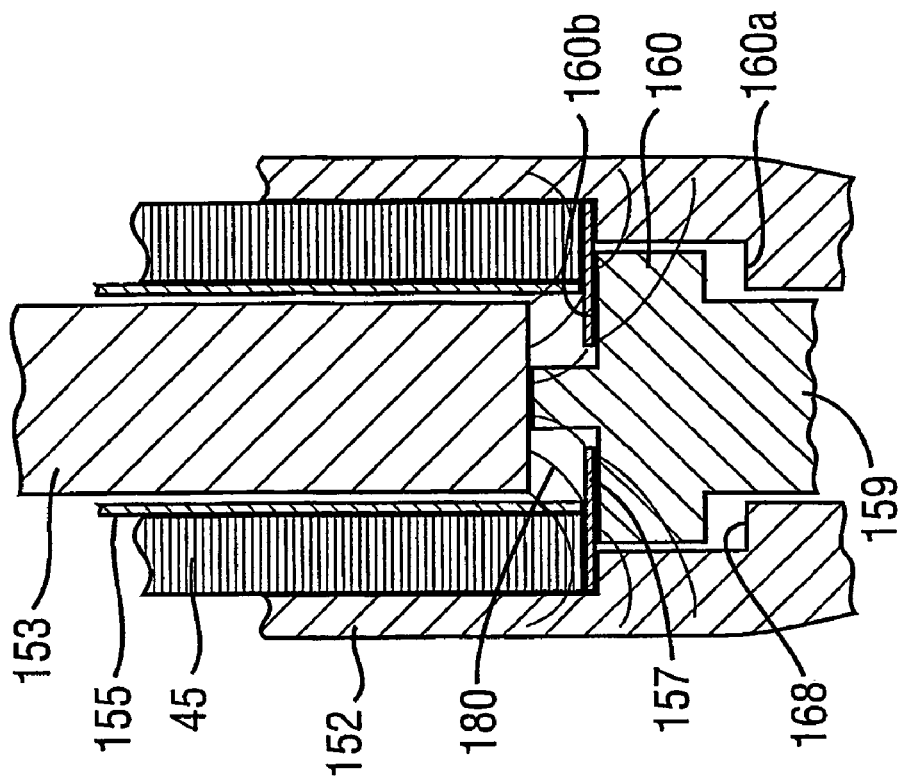
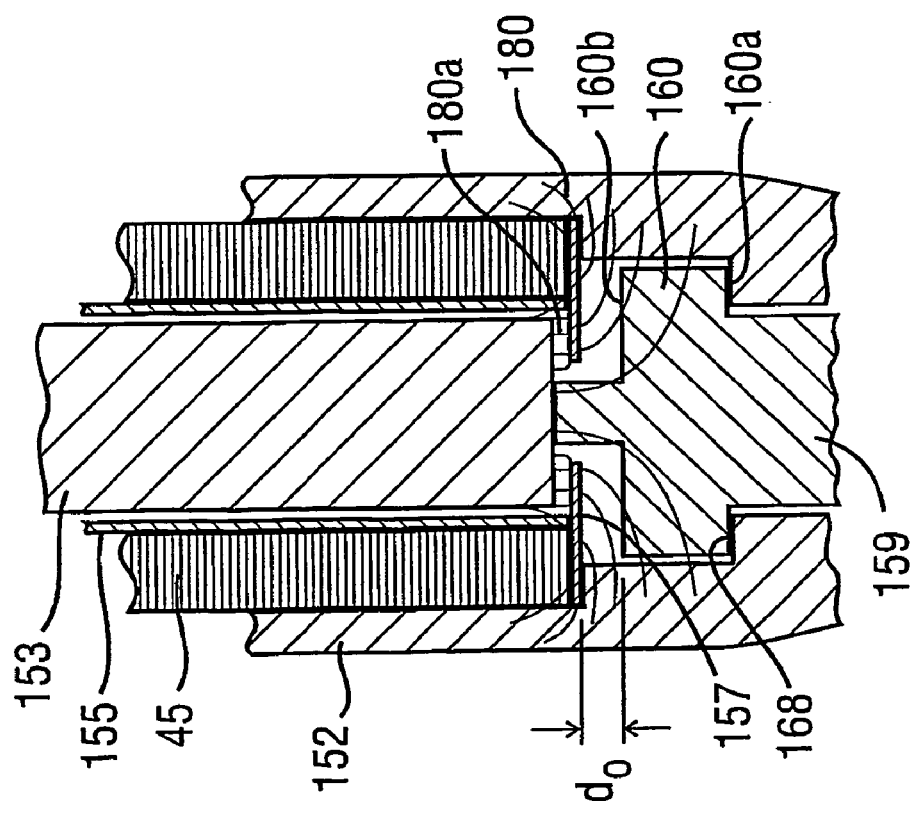

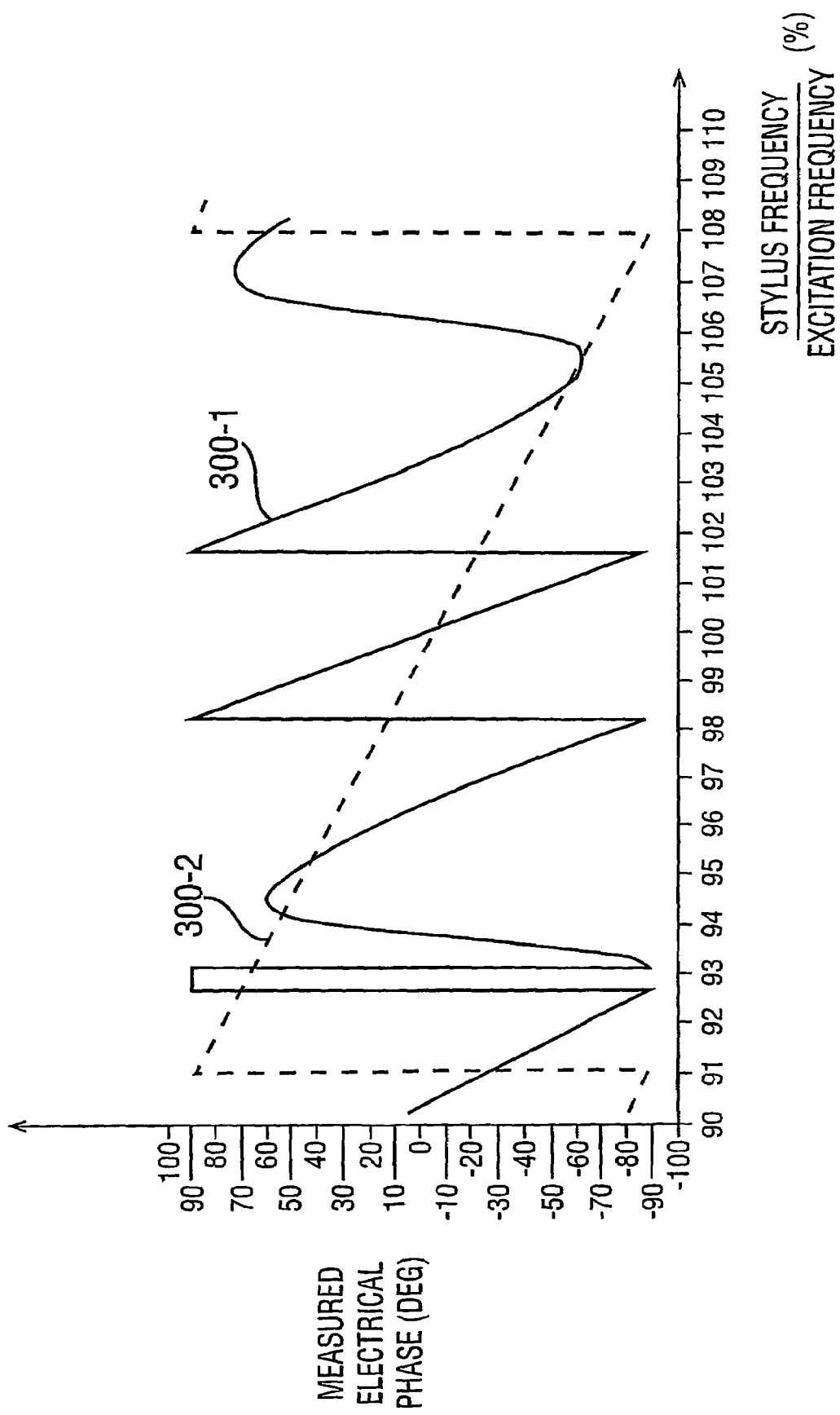

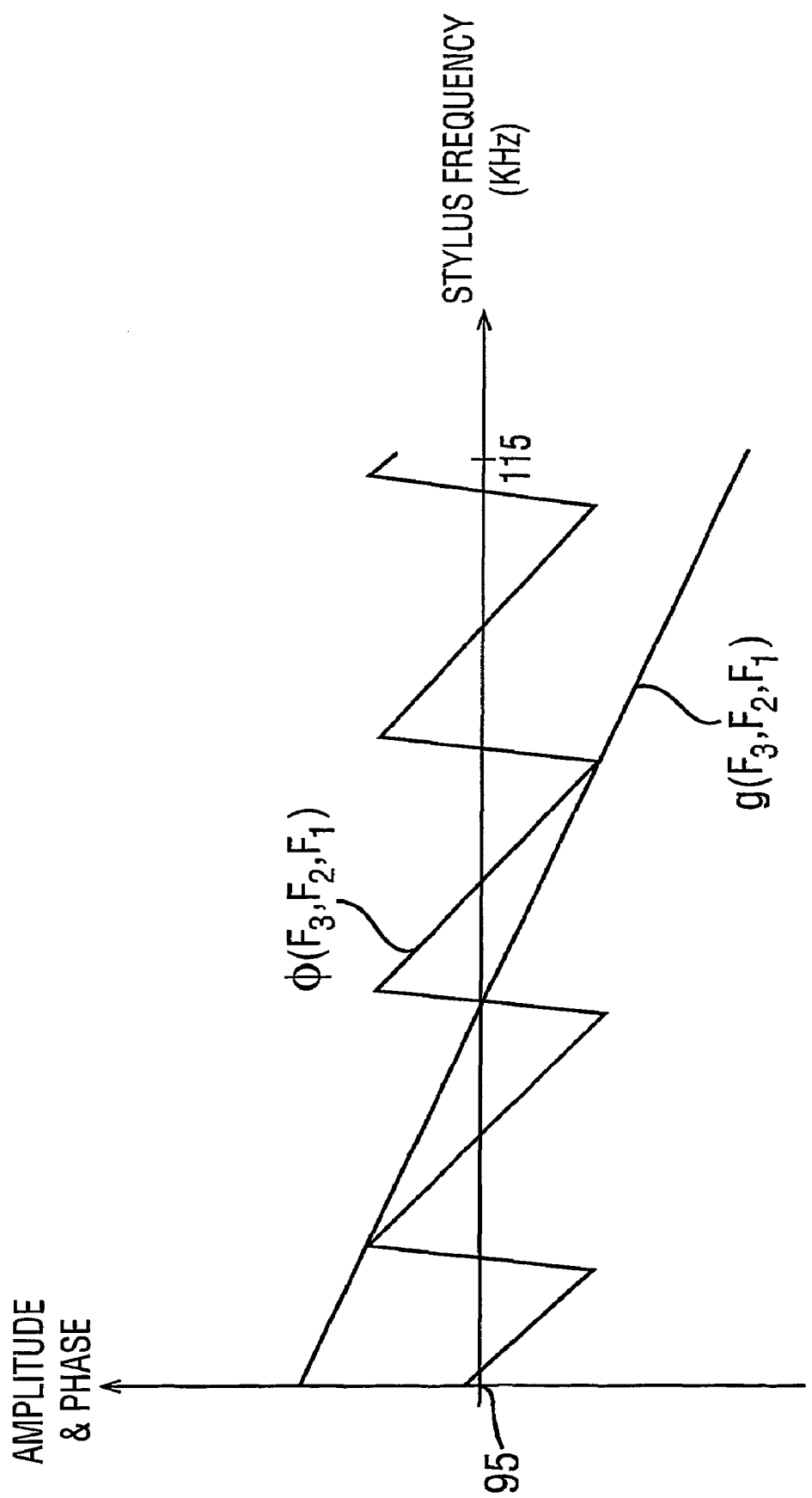

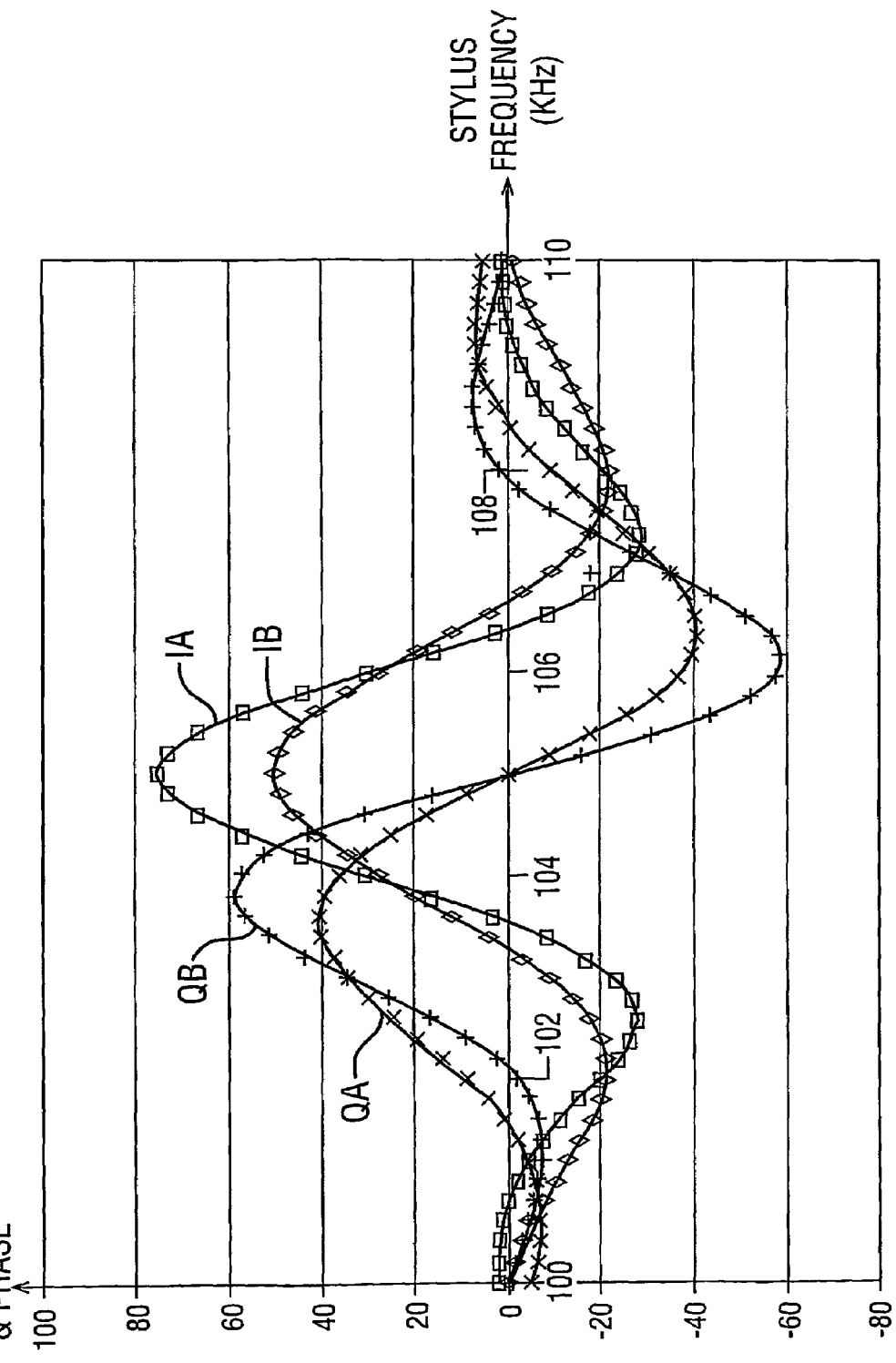

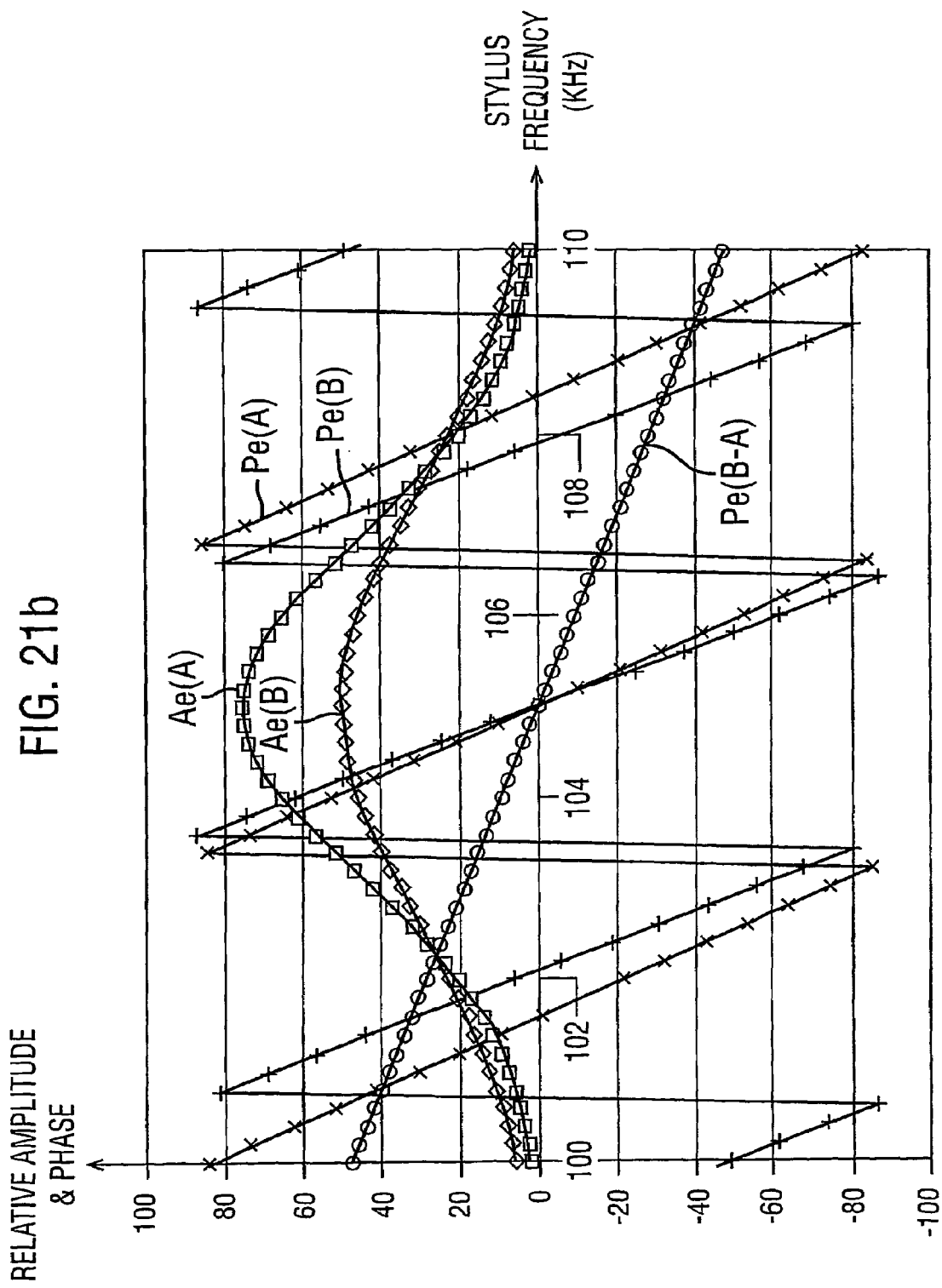

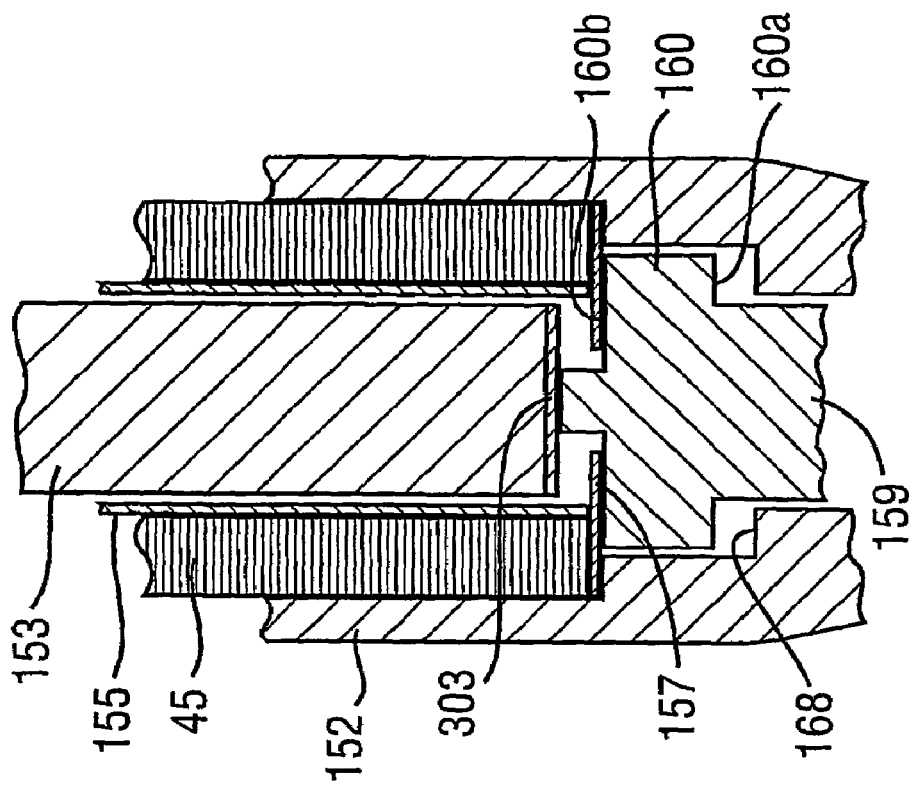
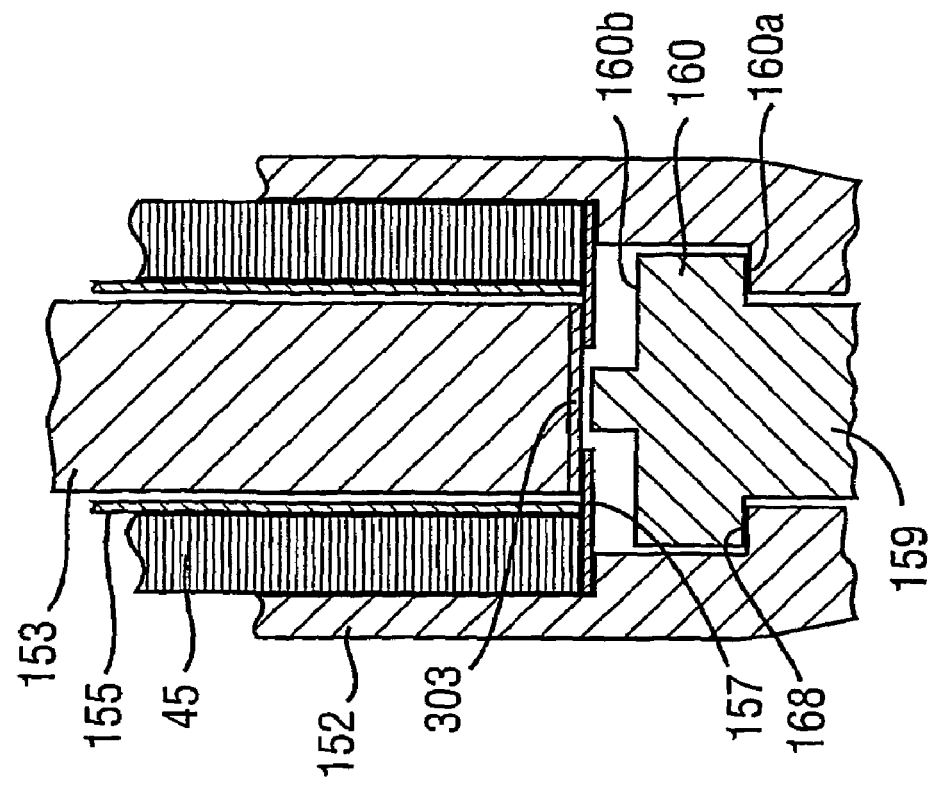

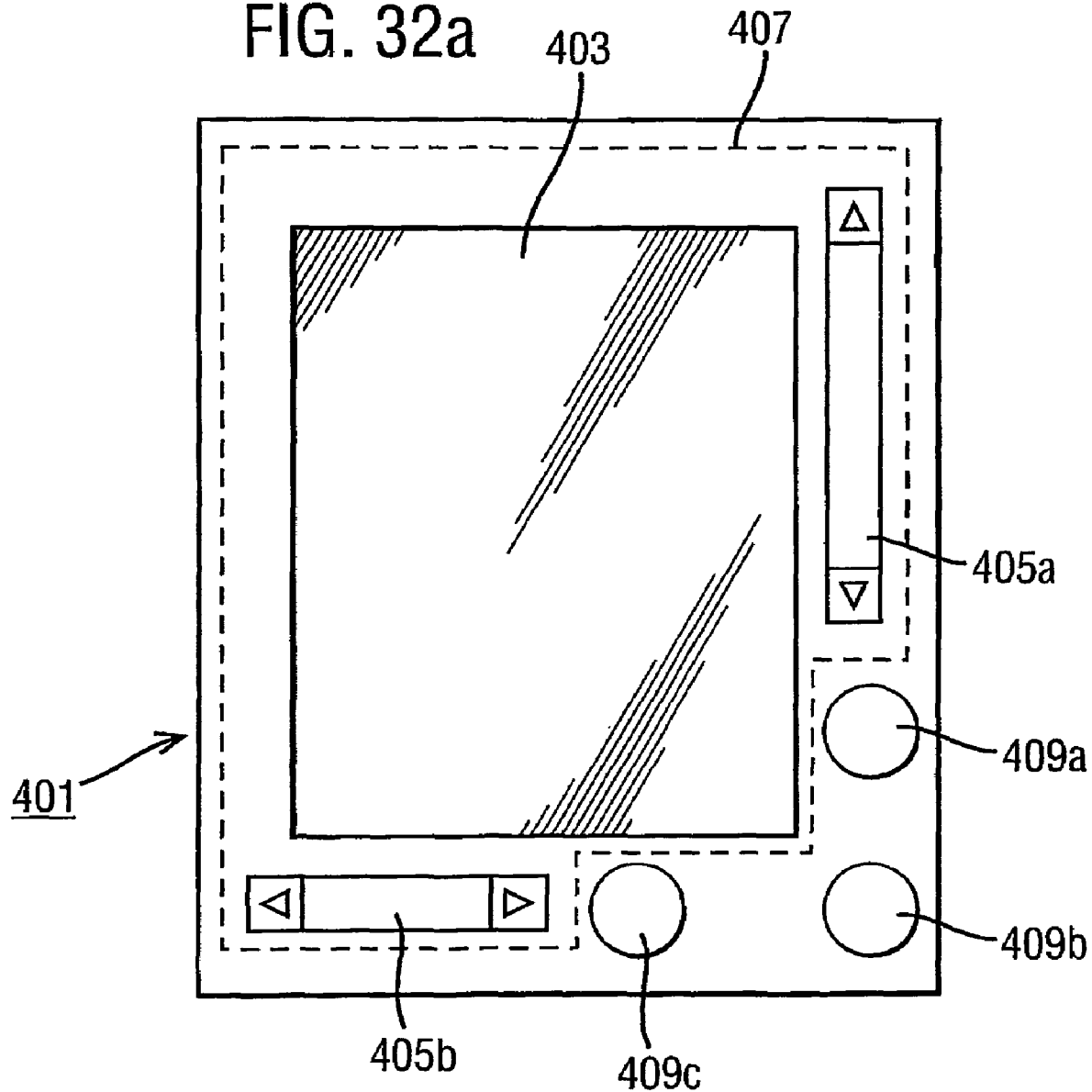

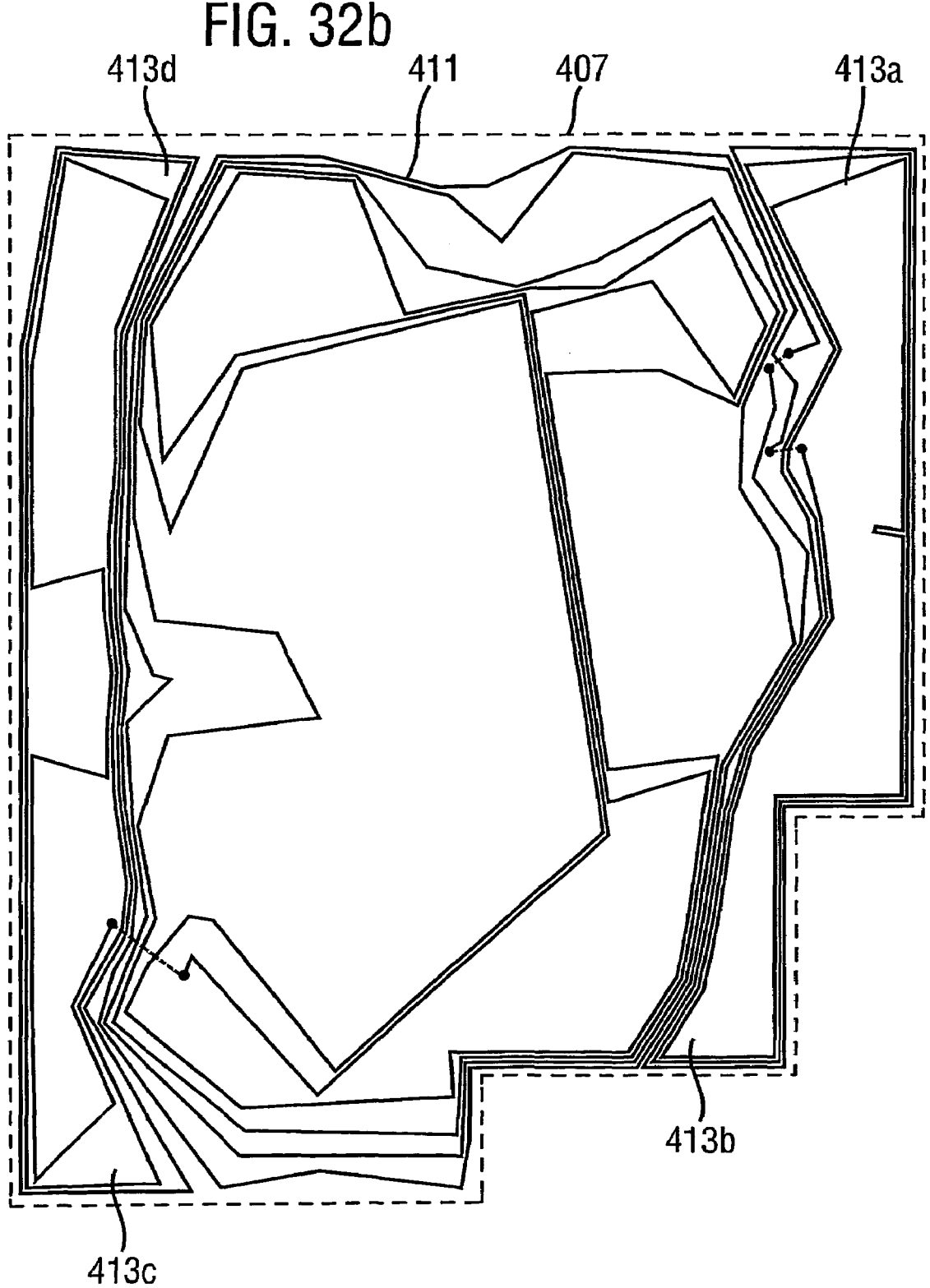

POSITION SENSOR

This application is the US national phase of international application PCT/GB03/05247 filed 22 Nov. 2002, which designated the US and claims priority to GB Application No. 0205116.7 filed 05 Mar. 2002, GB Application No. 0209372.2 filed 24 Apr. 2002, Application PCT/GB02/02387 filed 21 May 2002 and GB Application No. 0212699.3 filed 31 May 2002. The entire contents of these applications are incorporated herein by reference.

The present invention relates to a position sensor and to parts therefor. The invention has particular although not exclusive relevance to stylus input computer and communication devices, particularly small, low cost devices, such as personal digital assistants (PDAs), mobile telephones, web browsers and combinations of these. The invention has particular relevance where those computer and communication devices are battery powered.

Several pen or stylus sensing systems for computer input exist. For example, U.S. Pat. No. 4,878,553 and the applicant's earlier International application WO 00/33244 describe inductive stylus position sensing systems which allow for handwriting input, menu selection and other similar applications.

In WO 00/33244, processing electronics in the computer device generates an AC current, which is fed to an excitation coil in a sensor board of the device. This current generates an AC magnetic field that can couple with a coil in the stylus. A capacitor is also provided in the stylus connected in parallel with the coil to form a resonator. The magnetic field from the sensor board forces the resonator in the stylus to resonate. When the AC current is removed from the excitation coil, the resonator continues to resonate, with the amplitude of the oscillation decaying exponentially with time. This generates similar decaying EMFs in sensor coils on the sensor board, which are processed by processing electronics to provide a position indication of the stylus relative to the computer device.

In order to mimic the action of a conventional pen, the system described in WO 00/33244 also detects when the electronic stylus is pressed against a writing surface of the device by arranging the stylus so that the stylus resonator's frequency varies as a function of pressure applied to the nib of the stylus. The processing electronics in the device can then detect the resonator frequency in order to infer the nib pressure. In most PDA and similar applications, only a "clicked" or "unclicked" (i.e. stylus touching the writing surface or not touching the writing surface respectively) indication of nib pressure is required.

In WO 00/33244, the position processor normally operates with a fixed excitation frequency which it uses to excite the resonator in the stylus. The position processor then detects the electrical phase of the return signal in order to infer the pen resonator frequency. The electronic stylus described in this earlier International application is designed to provide a well-defined difference between the clicked and unclicked frequency (hereinafter the click-shift frequency). However, the absolute value of those frequencies is variable between styluses and the amount of variability may typically be greater than the click-shift frequency. As a result, a single measurement of the resonant frequency of the stylus may be insufficient to determine whether it is clicked or unclicked.

One possible solution to determine click status is to perform a special tuning step before the stylus can be used normally, such as requiring the user to put the stylus into a known state (for example in the clicked state by touching the stylus against the writing surface) and to store the resonant frequency of the stylus in this state. In subsequent normal operation the stylus state is reported as clicked if the resonator frequency is measured close to the previously stored value and not clicked if the difference is greater than a predetermined threshold. However, such a tuning technique has the drawback that it requires cooperation from the user. Ideally, if tuning is to be performed, it should be done in a manner that is transparent to the user.

Another solution to this problem would be for the position processor to continuously track the position of the stylus in order to predict when the stylus is in a particular state, at which point its frequency is measured and used as a reference. However, such prediction is difficult and for low-powered devices (such as hand-held battery-powered devices) requires excessive power to be drawn from the battery if the stylus is to be tracked continuously. Further, without continuous tracking, it is difficult to detect the condition where a user swaps between two styluses with different frequencies (which might occur if several styluses are provided each associated with a different function, such as writing and erasing).

Another problem associated with the stylus design described in WO 00/33244 is that the resonant frequency of the stylus can reduce significantly if the stylus is rested flat on the writing surface, due to magnetic screening used behind the sensor board of the hand-held device. In this case, the processor may erroneously report that the stylus has been clicked.

Some of these problems would be overcome in the stylus described in WO 00/33244 by simply increasing the click-shift frequency. However, with the design of stylus described in WO 00/33244, this would require significant movement of the nib of the stylus between the clicked and unclicked states which would feel unacceptably large for users.

In one embodiment, a system is provided which does not require a special tuning step. The stylus is designed so that its unclicked resonant frequency will always lie within a pre-defined "unclicked frequency band" and so that its clicked resonant frequency will always lie within a "clicked frequency band". The processing electronics then measures the frequency of the stylus and reports clicked if that measurement exceeds the decision frequency and unclicked if it is lower than the decision frequency. In the preferred embodiment, this is achieved whilst maintaining a relatively small nib-click distance (i.e. the distance the nib has to move between the clicked and unclicked states) so that the writing action of the stylus is similar to that of a conventional pen.

In an alternative embodiment, the stylus design may be arranged so that the frequency shifts in a downward direction when pressure is applied to the nib. However, an increase in frequency is preferred so that a stylus resting on the writing surface is not reported as being clicked due to significant resonant frequency reduction caused by the screening material used in the sensor board.

In a preferred embodiment, the styluses are designed so that their clicked and unclicked frequencies lie within a "free space clicked resonant frequency band" and "free space unclicked resonant frequency band" that are narrower than the "clicked frequency band" and "unclicked frequency band" discussed above, so that the resonant frequency of the stylus can change over time with changes in temperate and due to the proximity of the stylus to conductive or magnetically permeable objects.

In the main embodiment described below, a new stylus is described which can operate in the above manner. Further, a new set of digitiser windings are described which are preferably used with the stylus. A novel two-stage measurement process is also described for measuring the resonant frequency of the stylus and for determining the position of the stylus relative to the digitising tablet. Various novel excitation and processing techniques are also described for determining the resonant frequency of the stylus.

According to one aspect of the invention, processing electronics are provided for processing signals generated in a set of position sensor windings to determine amplitude measures of those signals. These amplitudes measures are then used to estimate the frequency of signals generated by a remote signal generator.

According to another aspect, the present invention provides a frequency determining system comprising:
- a signal generator operable to generate an alternating response signal when energised by an alternating excitation signal;
- a receiver operable to receive a first response signal generated by said signal generator when energised by a first excitation signal and operable to receive a second response signal when energised by a second excitation signal;
- a processing circuit operable to process the first and second response signals to determine first and second amplitude measures indicative of the amplitude of the corresponding response signals; and
- a determining circuit operable to determine an estimate of the frequency of the alternating response signals generated by said signal generator using said first and second amplitude measures.

According to another aspect, the present invention provides a processing apparatus comprising:
- a terminal operable to receive a first response signal generated by a signal generator when energised by a first excitation signal having a first excitation frequency and a second response signal generated by said signal generator when energised by a second excitation signal having a second different excitation frequency;
- a processing circuit operable to process the first and second response signals to generate first and second amplitude measures; and
- a determining circuit operable to determine a frequency measure indicative of the frequency of the alternating response signals using said first and second amplitude measures.

According to another aspect, the present invention provides a positioning system comprising first and second movable members in which:
- the first member comprises a signal generator operable to generate an alternating response.signal when energised by an energising signal; and
- a second member comprising:
- a receiver operable to receive a first response signal generated by said signal generator when energised by a first excitation signal and a second response signal generated by said signal generator when energised by a second excitation signal;
- a processing circuit operable to process each of the first and second response signals to generate first and second amplitude measures;
- a determining circuit operable to determine a frequency measure indicative of the frequency of the alternating response signals using said first and second amplitude measures; and
- a positioning circuit operable to process at least one of the first and second response signals to determine the relative position between the first and second members.

According to another aspect, the present invention provides a signal processing system comprising:
- a signal generator operable, when energised by an alternating excitation signal, to generate an alternating response signal of predetermined frequency and whose amplitude varies in dependence upon the difference in frequency between the excitation signal and the response signal;
- an energiser operable to generate first and second excitation signals at first and second excitation frequencies for energising said signal generator;
- a receiver operable to receive a first alternating receive signal that varies with a first response signal generated by said signal generator when energised by said first excitation signal and operable to receive a second alternating receive signal that varies with a second response signal generated by said signal generator when energised by said second excitation signal;
- a processing circuit operable to process the first and second receive signals to generate first and second processed signals respectively; and
- a combining circuit operable to combine the first and second processed signals to remove a common offset from said first and second processed signals and to output a combined signal.

According to another aspect, the present invention provides a signal processing apparatus comprising:
- a receiver operable to receive an alternating signal which varies with a predetermined parameter;
- a signal generator operable to generate a first signal having a first frequency and a second signal having a second different frequency;
- a mixing circuit operable to mix the received signal with the generated first and second signals to provide first and second mixed signals respectively;
- a combining circuit operable to combine the first and second mixed signals to remove a common offset from the first and second mixed signals and to provide a combined signal which varies with said predetermined parameter; and
- a processing circuit operable to process said combined signal to determine said predetermined parameter.

According to another aspect, the present invention provides a system for determining the value of a variable, the system comprising:
- a first receiver operable to receive a first alternating receive signal that varies with the value of said variable;
- a second receiver operable to receive a second alternating receive signal that varies with the value of said variable;
- a signal generator operable to generate first and second alternating mixing signals;
- a mixing circuit operable to mix the first receive signal with each of the first and second mixing signals to provide first and second mixed signals and operable to mix the second receive signal with each of the first and second mixing signals to provide third and fourth mixed signals;
- a sign determining unit operable to determine a relative sign measure indicative of the relative sign between the first and second receive signals;
- a combining circuit operable to combine the first and third mixed signals in dependence upon the determined relative sign measure, to provide a first combined signal and operable to combine the second and fourth mixed signals in dependence upon the determined relative sign measure, to provide a second combined signal; and
- a determining circuit operable to determine the value of said variable using said first and second combined signals.

According to another aspect, the present invention provides a position determining system comprising:

a first receiver operable to receive a first alternating receive signal that varies with the position to be determined;

a second receiver operable to receive a second alternating receive signal that varies with the position to be determined;

a signal generator operable to generate first and second alternating mixing signals;

a mixing circuit operable to mix the first receive signal with each of the first and second mixing signals to provide first and second mixed signals and operable to mix the second receive signal with each of the first and second mixing signals to provide third and fourth mixed signals;

a phase determining unit operable to process the first and second mixed signals to determine a phase measure indicative of the difference in frequency between the mixing signals and said alternating first receive signal;

a combining circuit operable to combine the first and second mixed signals in dependence upon said determined phase measure to provide a first combined signal and operable to combine the third and fourth mixed signals in dependence upon said determined phase measure, to provide a second combined signal; and a position determining unit operable to determine and to output a position measure using said first and second combined signals.

Various other aspects of the present invention will become apparent from the following detailed description of a preferred embodiment in which:

FIG. 1 is a schematic view of a hand-held personal digital assistant (PDA) which includes an x-y digitising system located behind the PDA's liquid crystal display which can sense the (x,y) position of a resonant stylus;

FIG. 2 schematically illustrates a cross-sectional view of the personal digital assistant shown in FIG. 1, illustrating the positional relationship between a sensor printed circuit board of the digitising system and the liquid crystal display;

Figure 1:
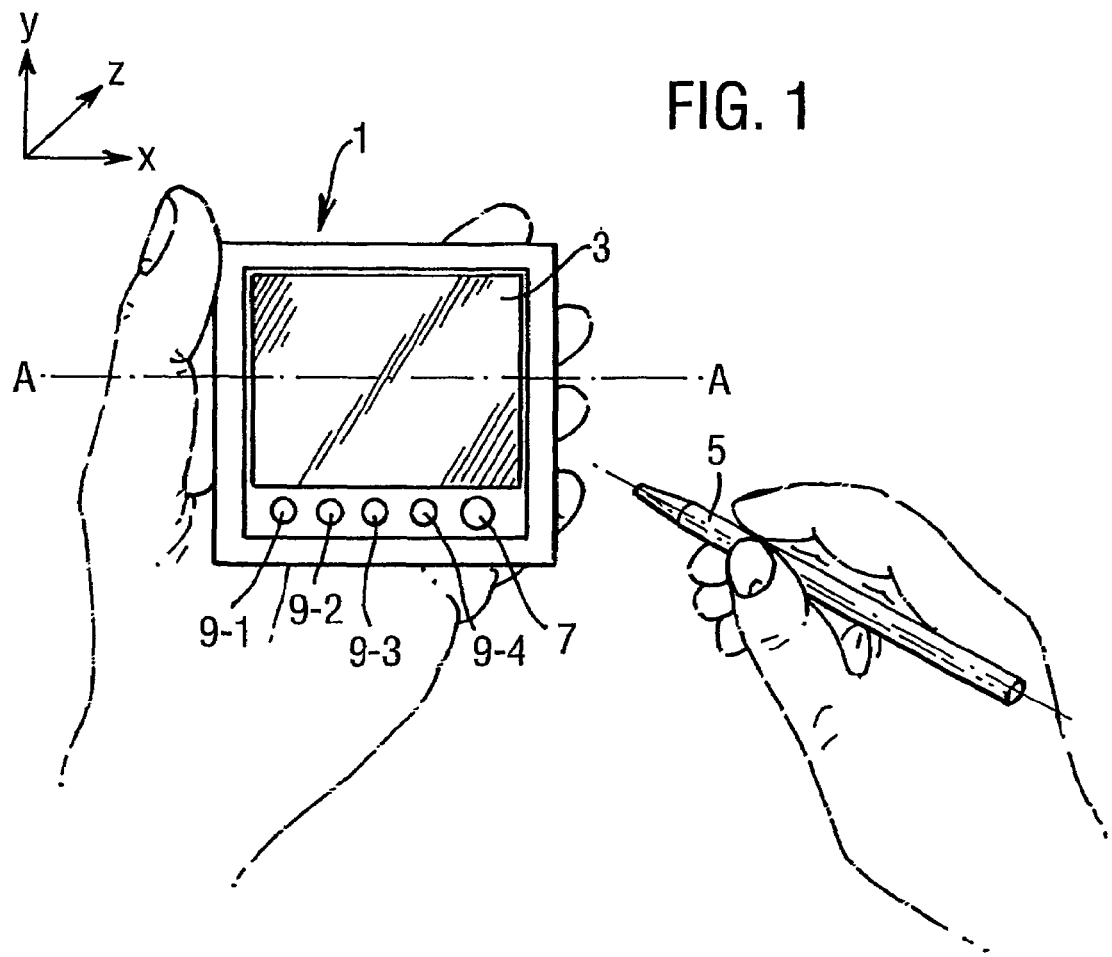
Figure 3A:
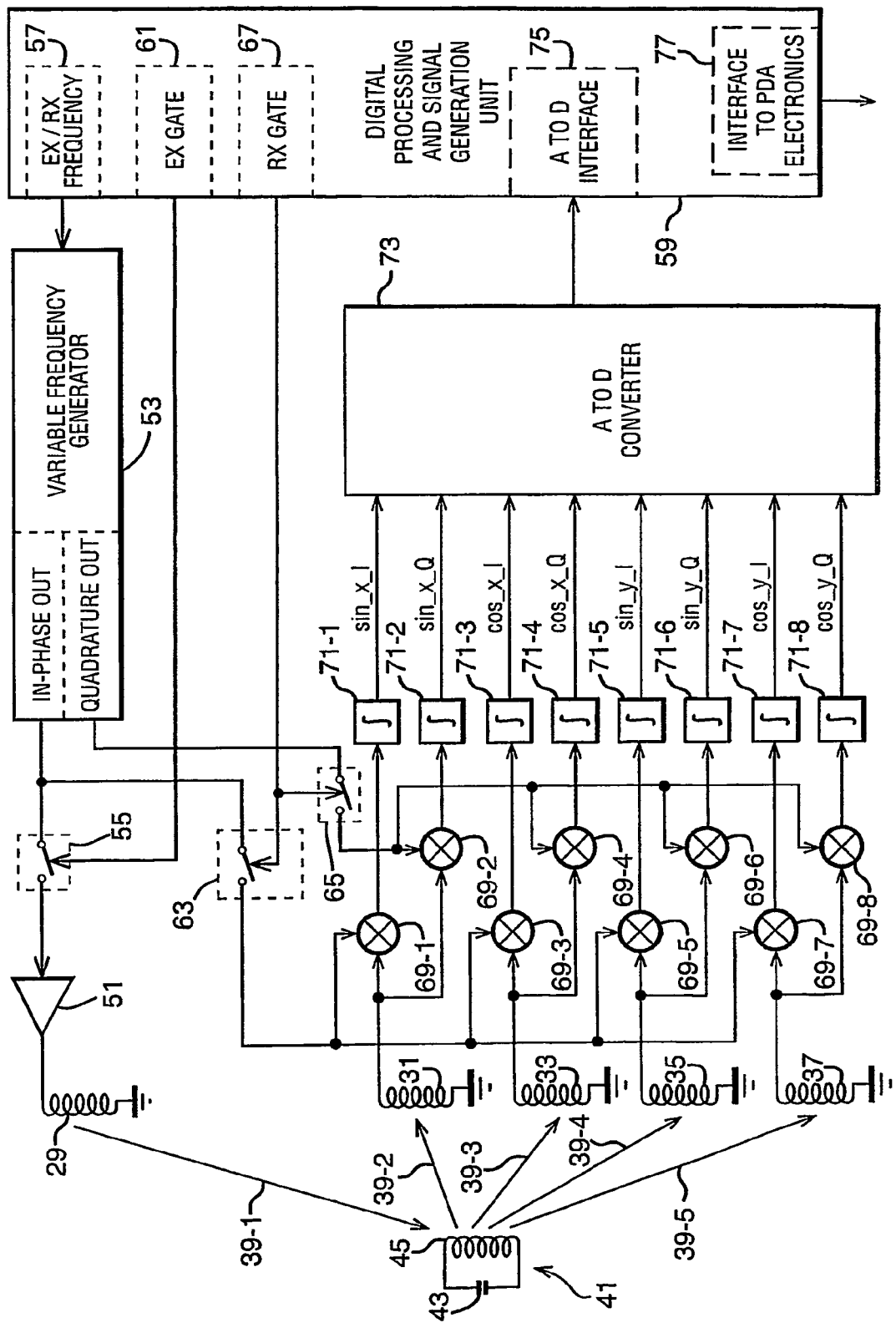
FIG. 3a is a schematic functional block diagram illustrating the excitation and processing electronics of the x-y digitising system and illustrating the magnetic coupling between an excitation winding of the digitising system and the resonant stylus and the magnetic coupling between the resonant stylus and four sensor windings which form part of the digitising system.
Figure 4A:
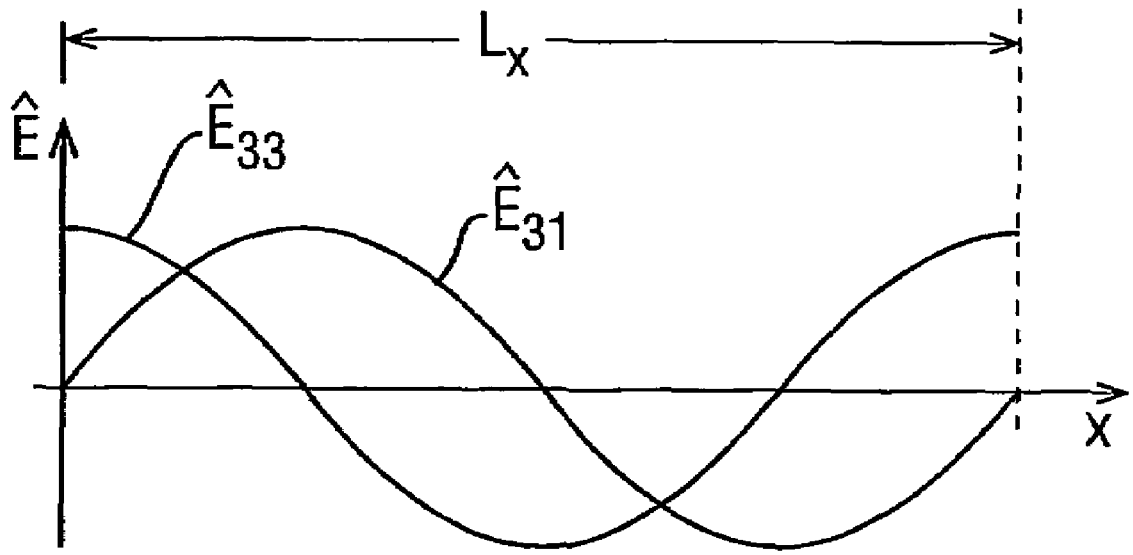
Figure 4B:
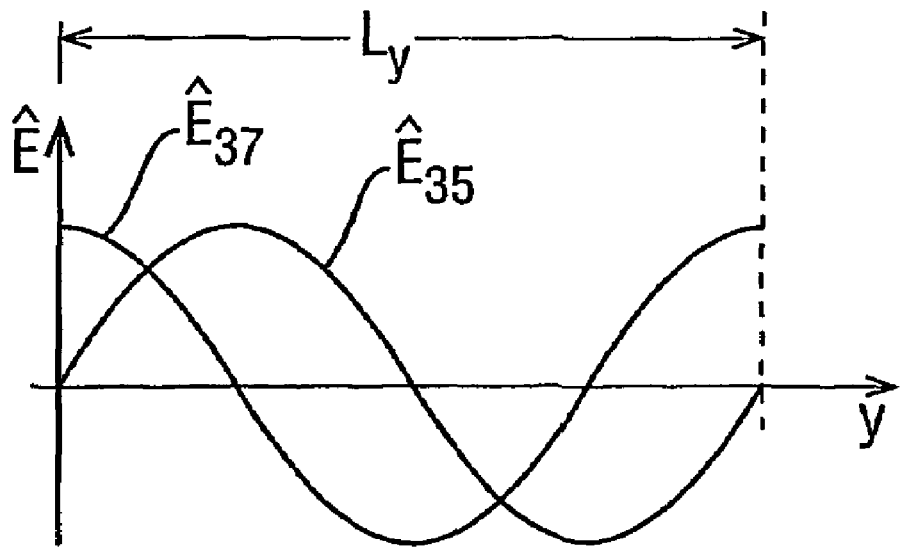
Figure 5A:
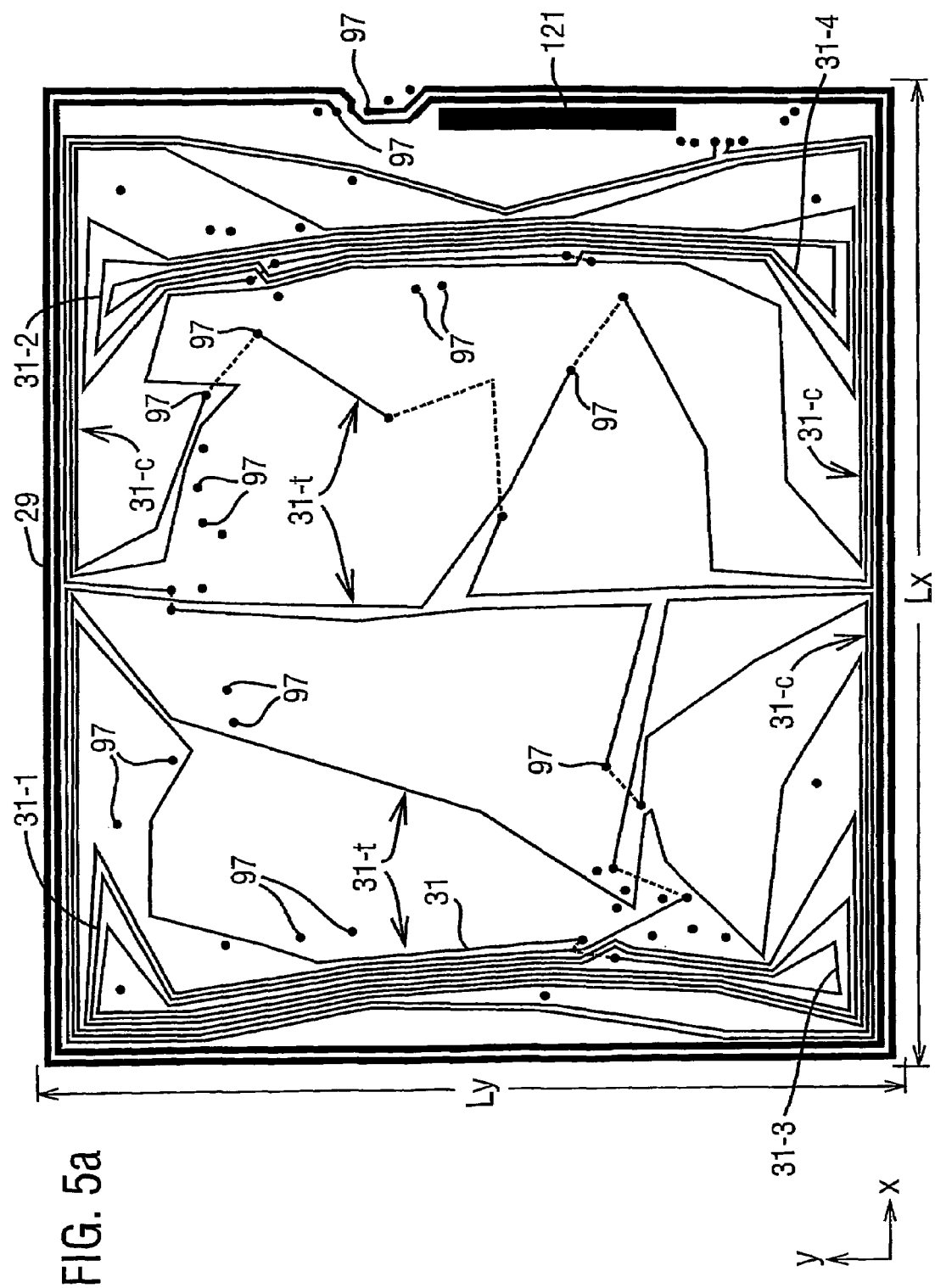
Figure 5B:
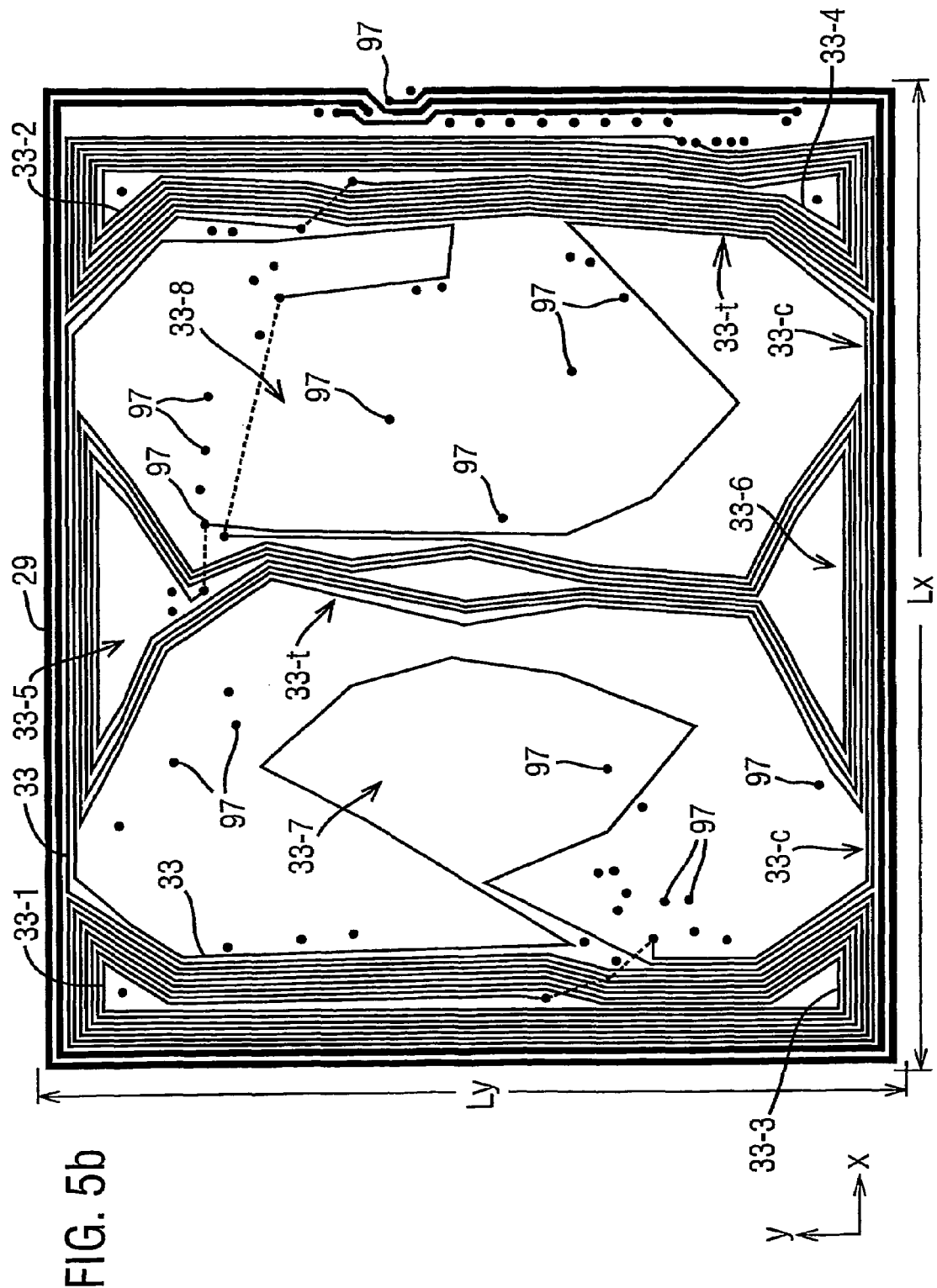
Figure 5C:
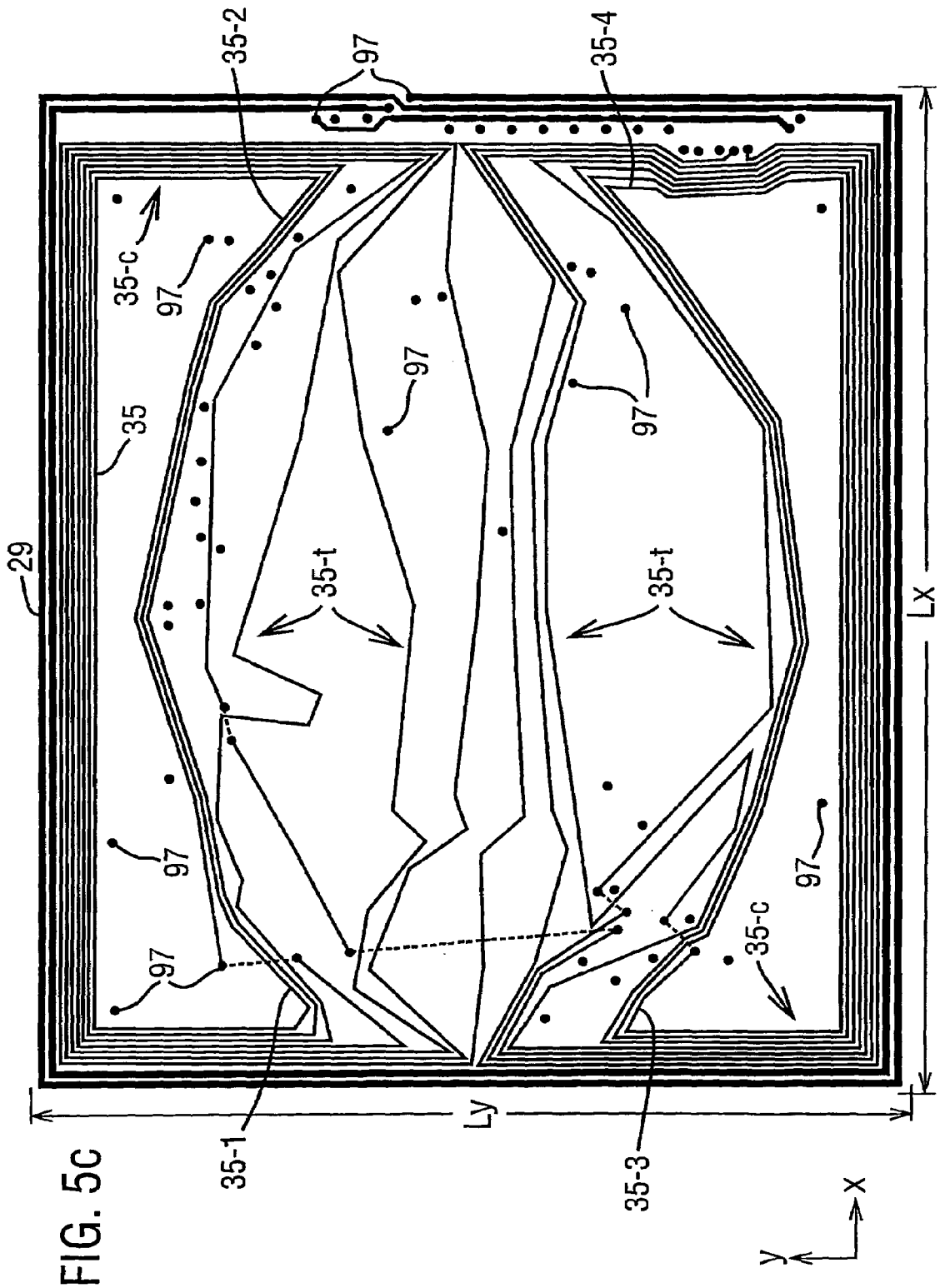
Figure 5D:
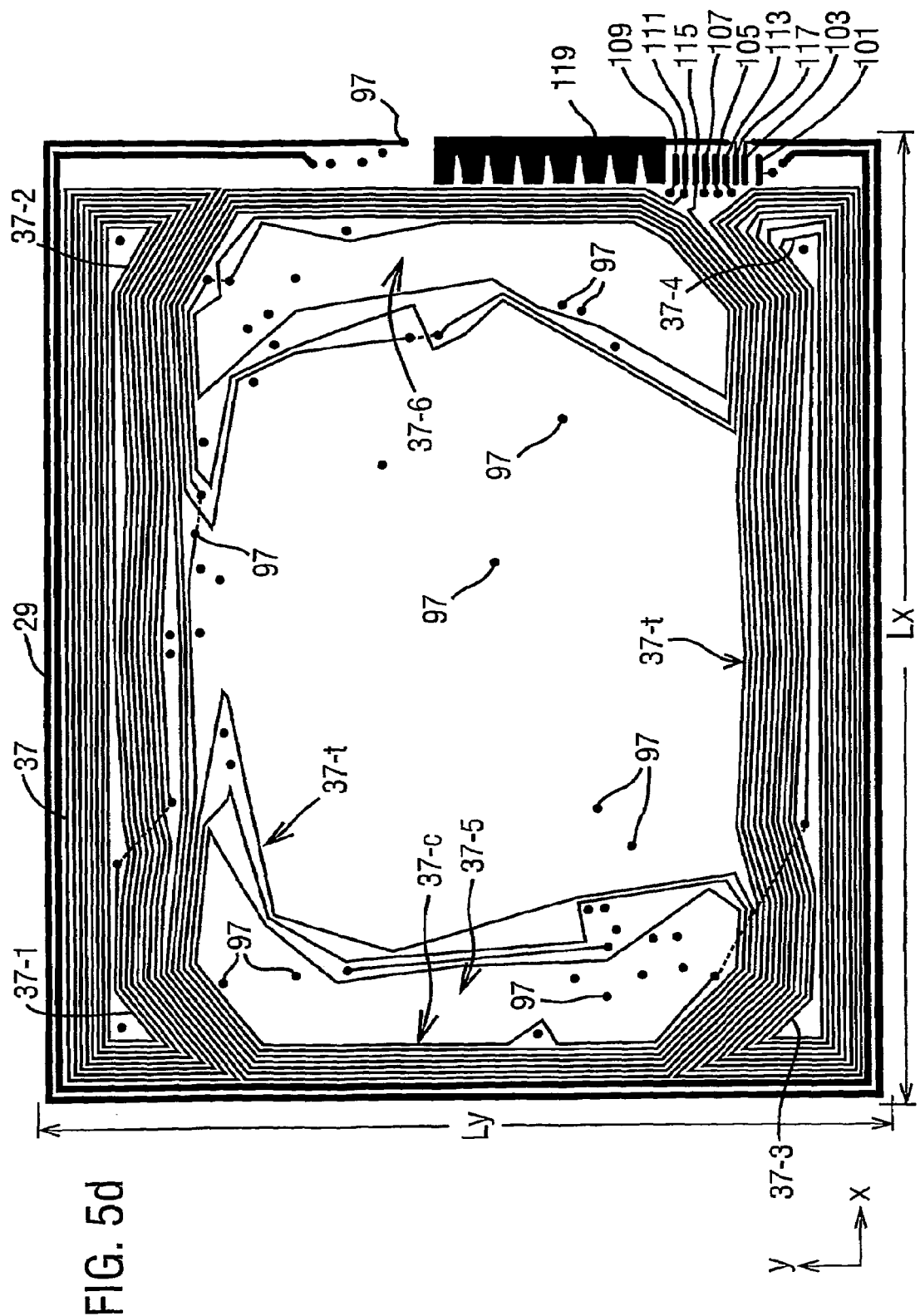
Figure 6:
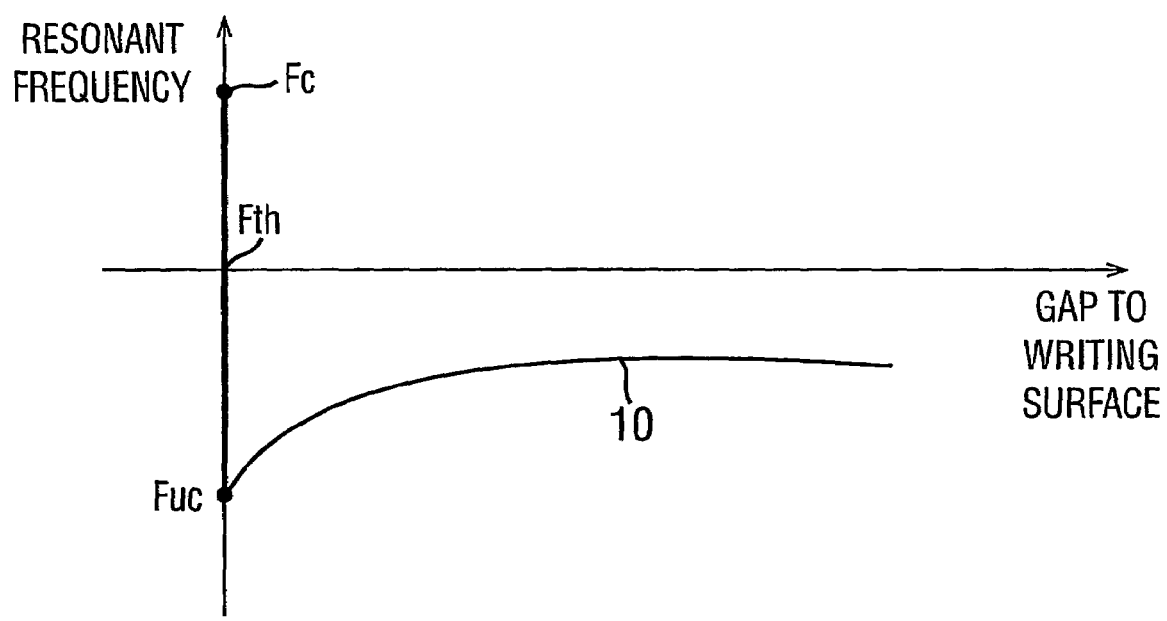
Figure 7A:
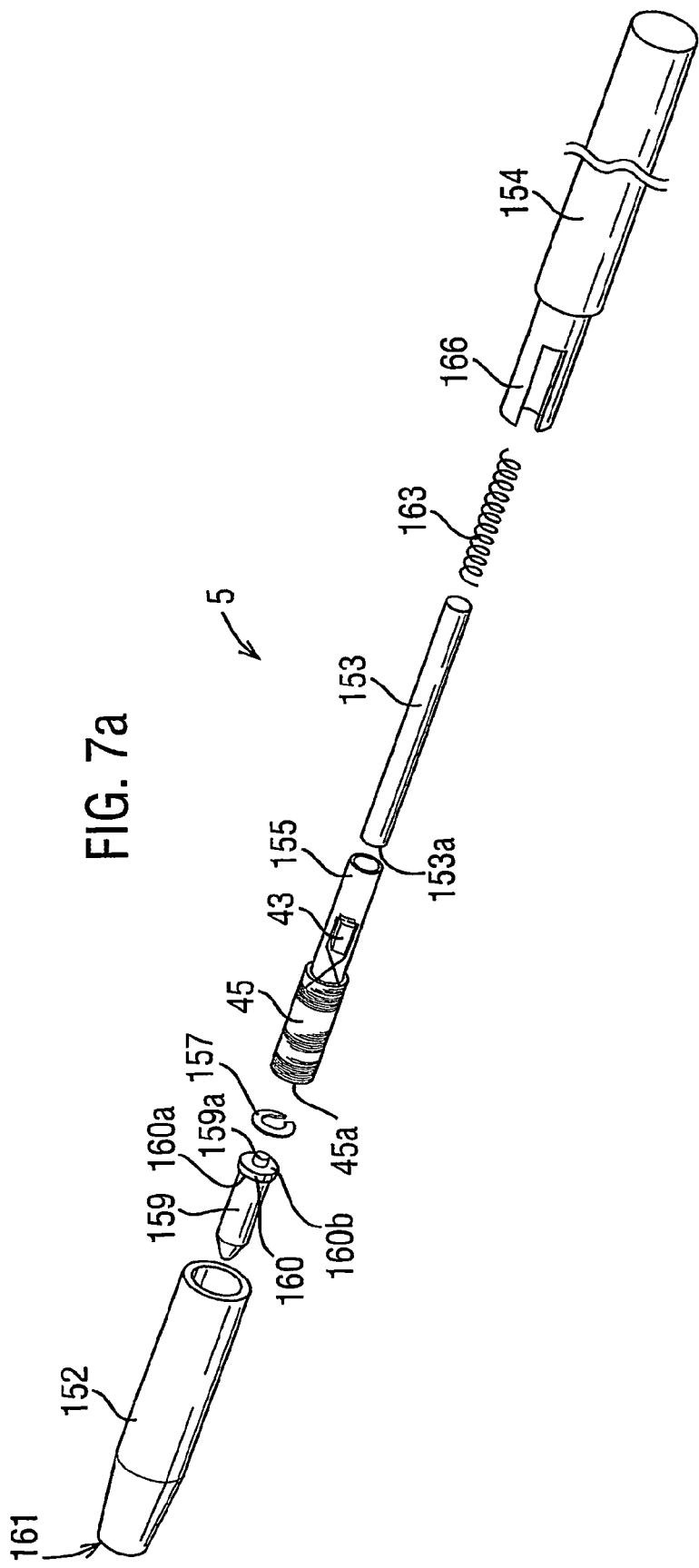
Figure 7B:
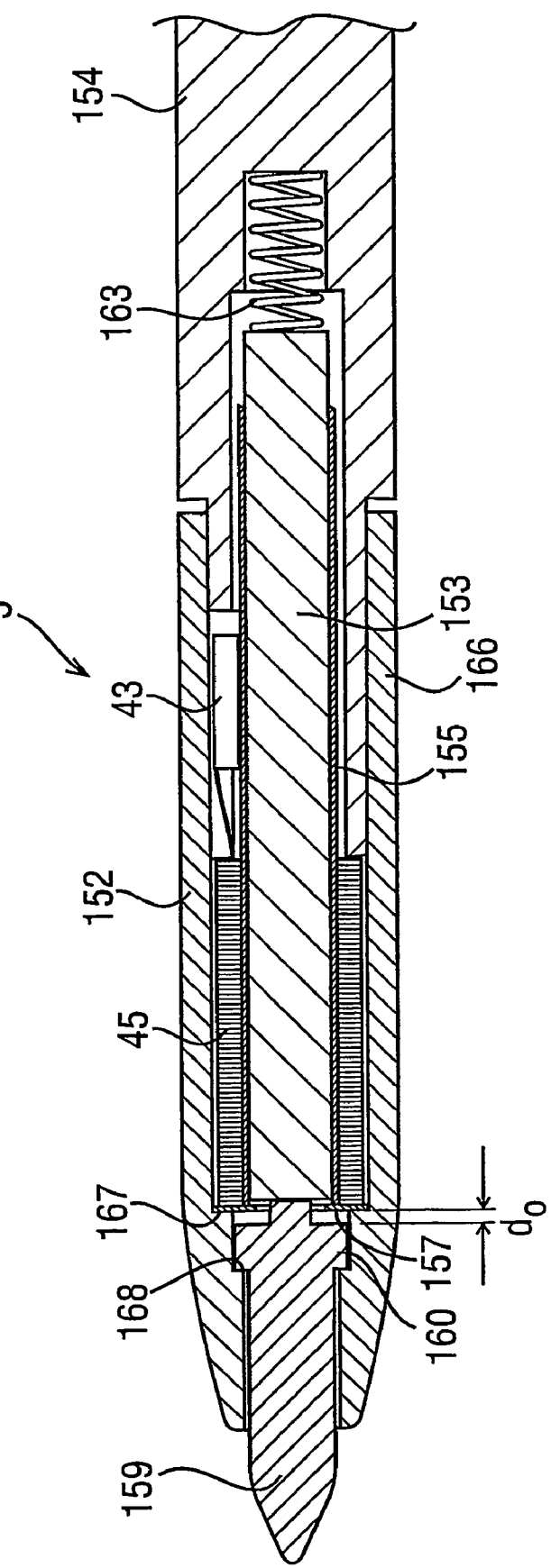
Figure 9:
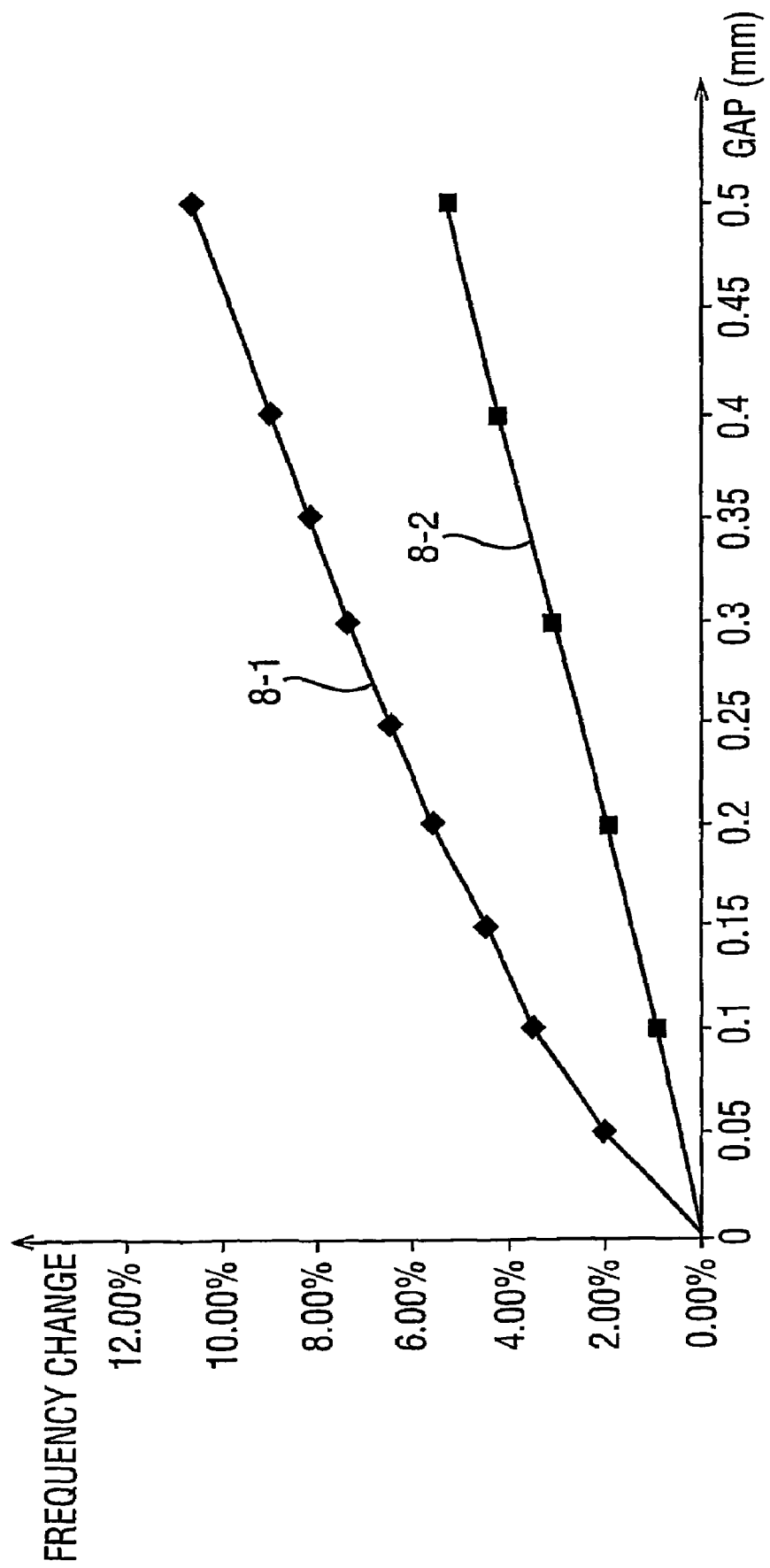
Figure 10:
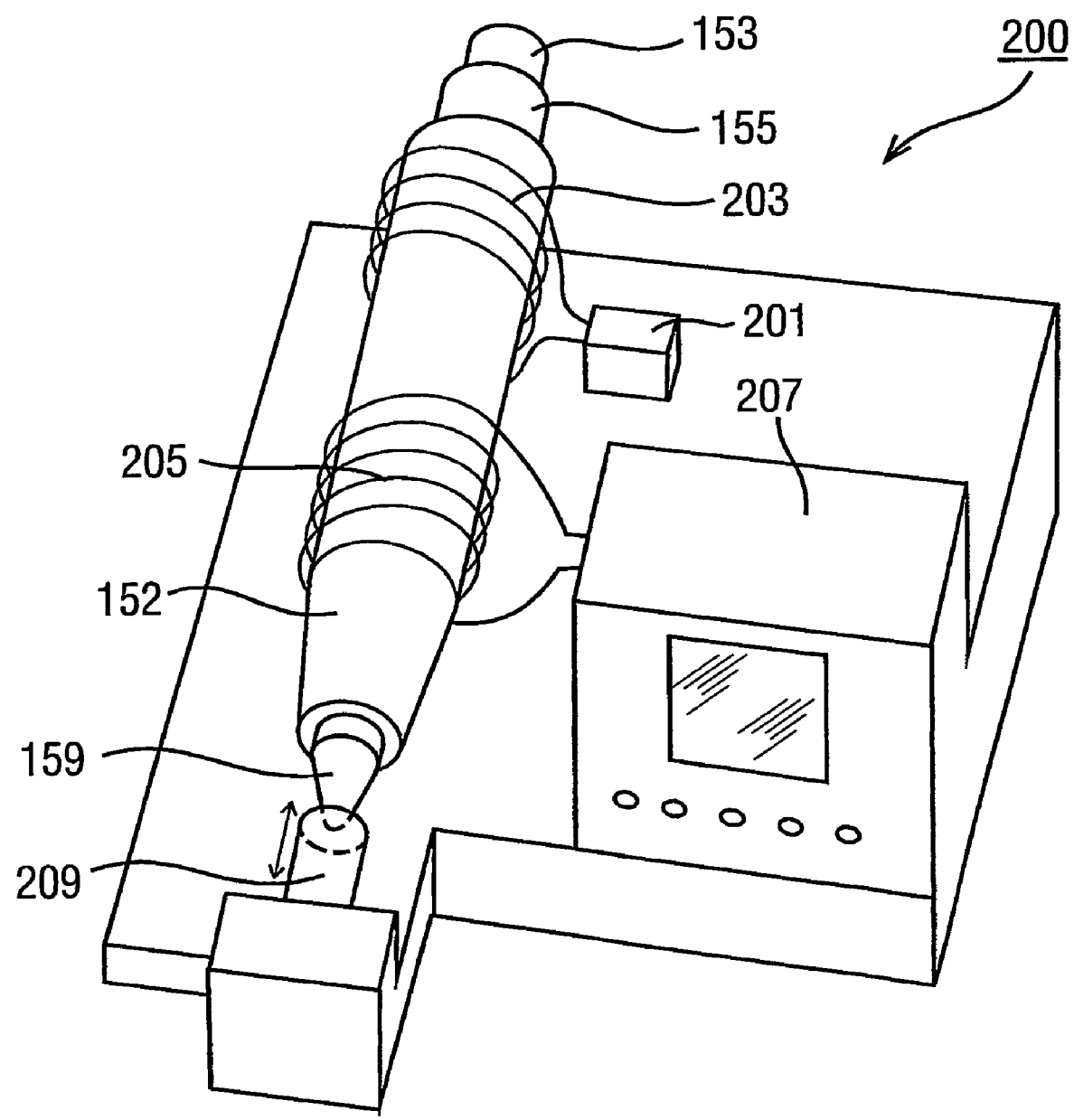
Figure 11:
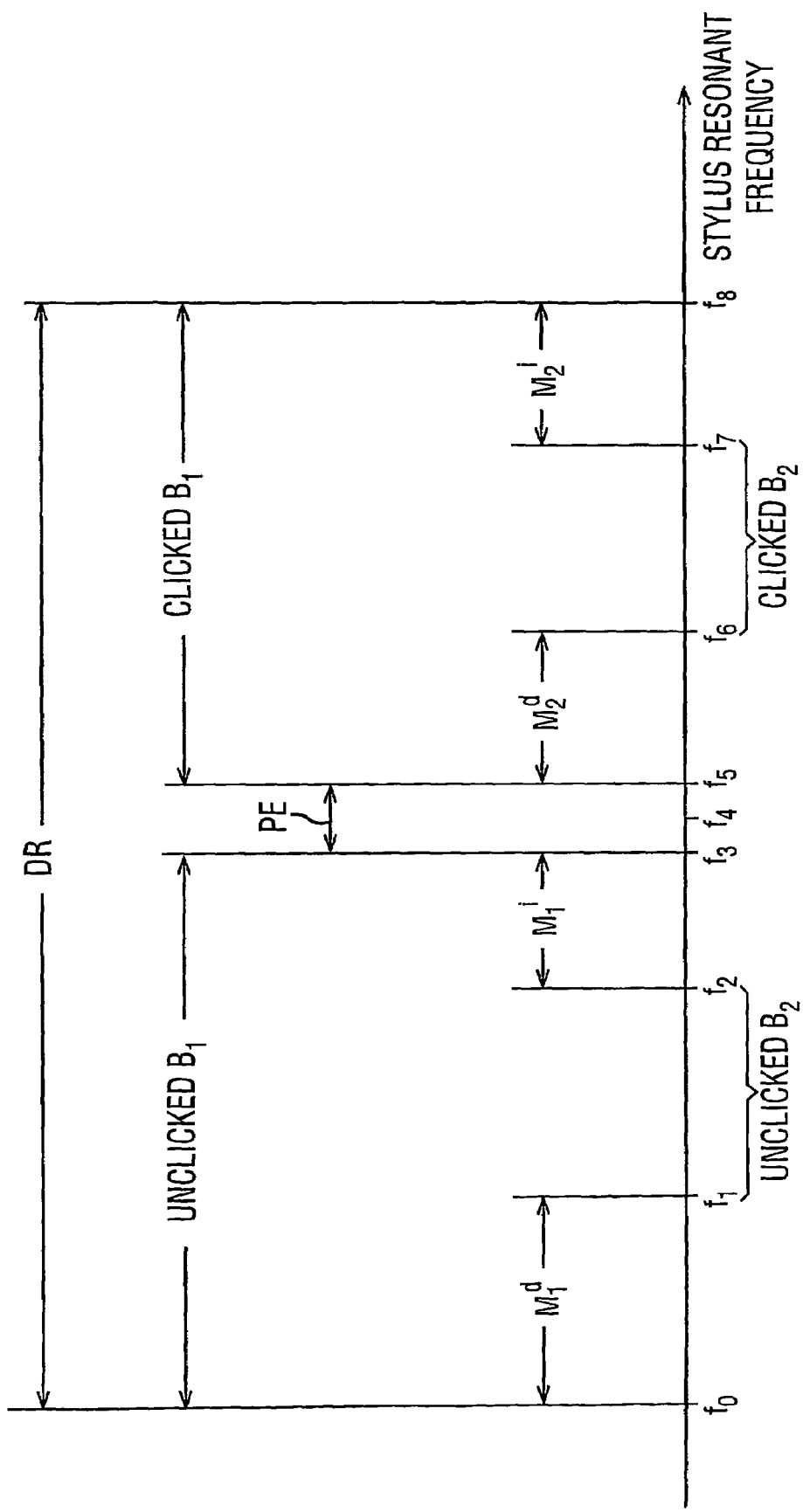
Figure 12:
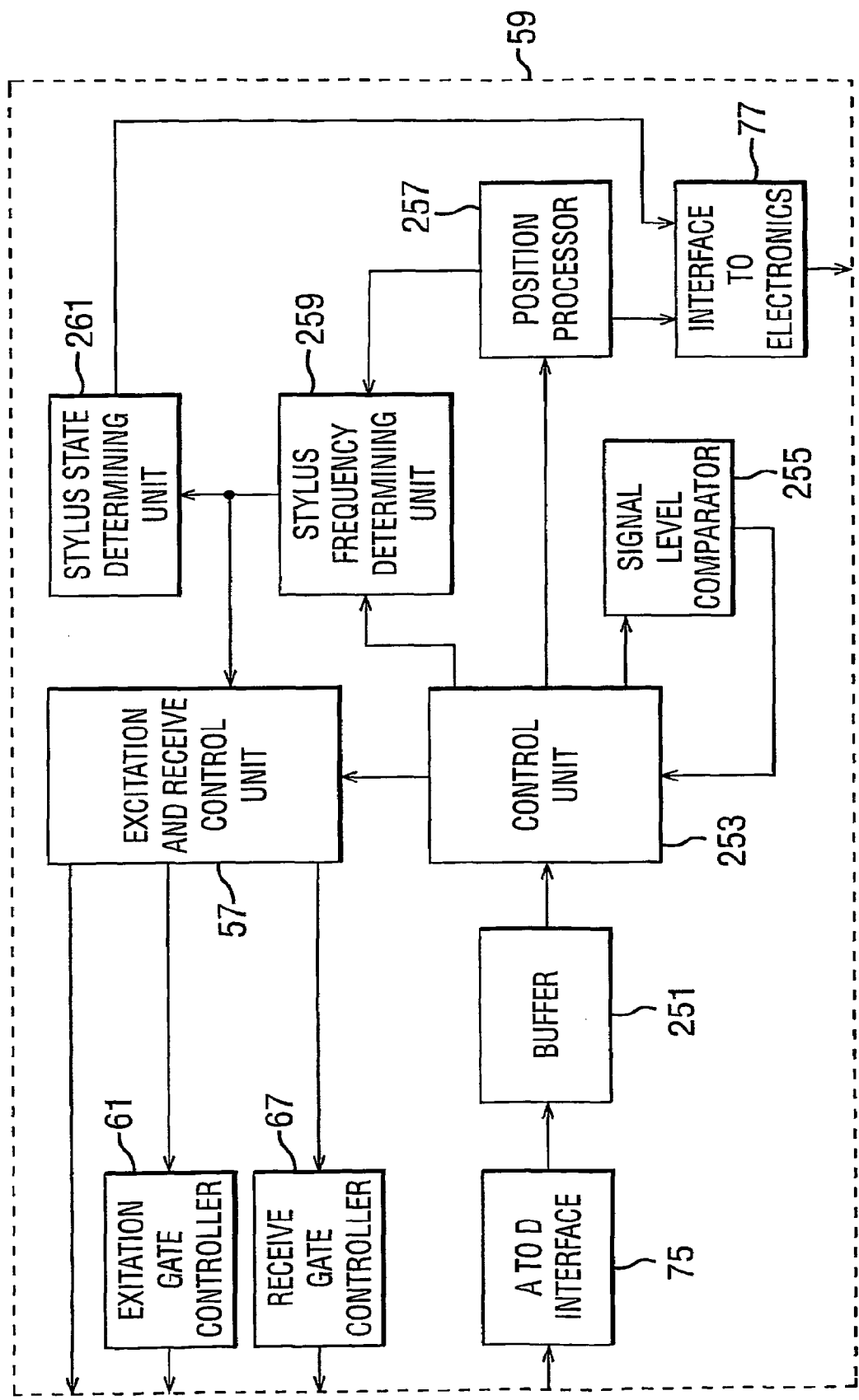
Figure 14A:
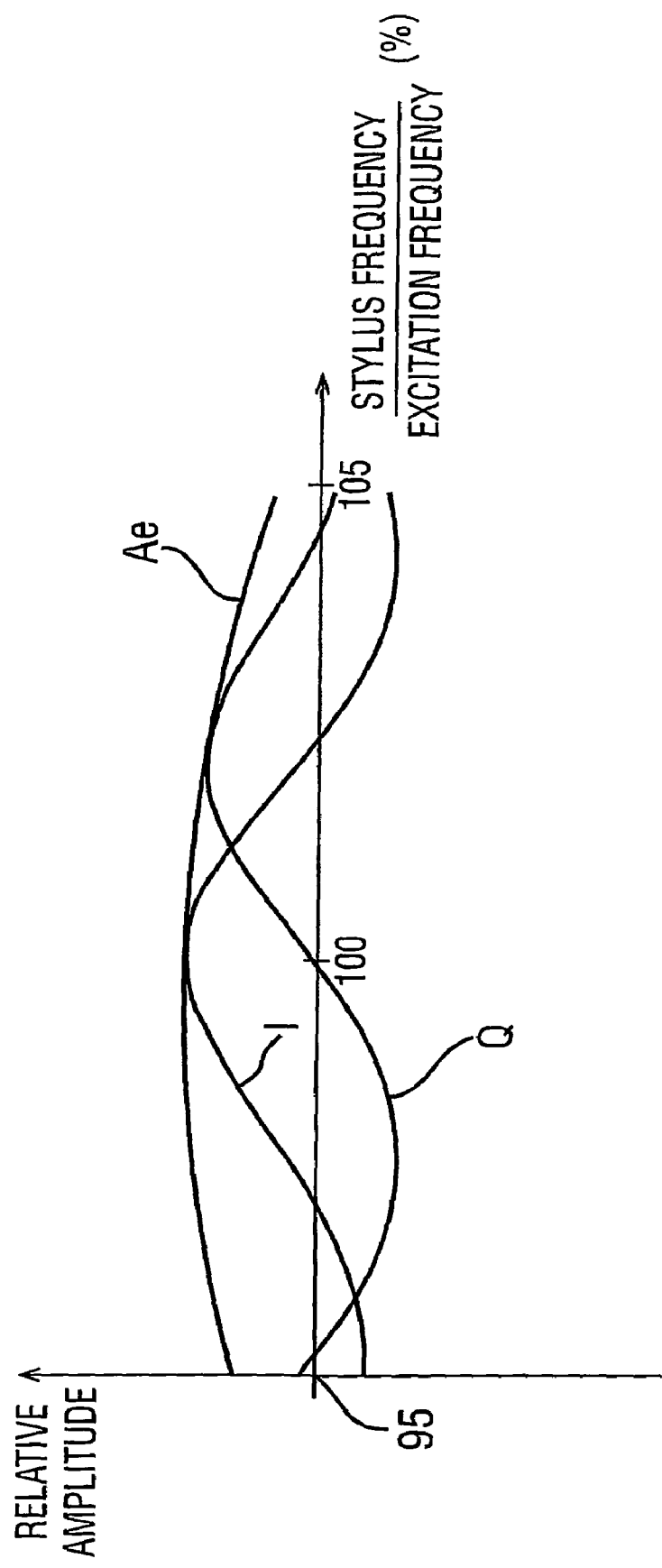
Figure 14B:
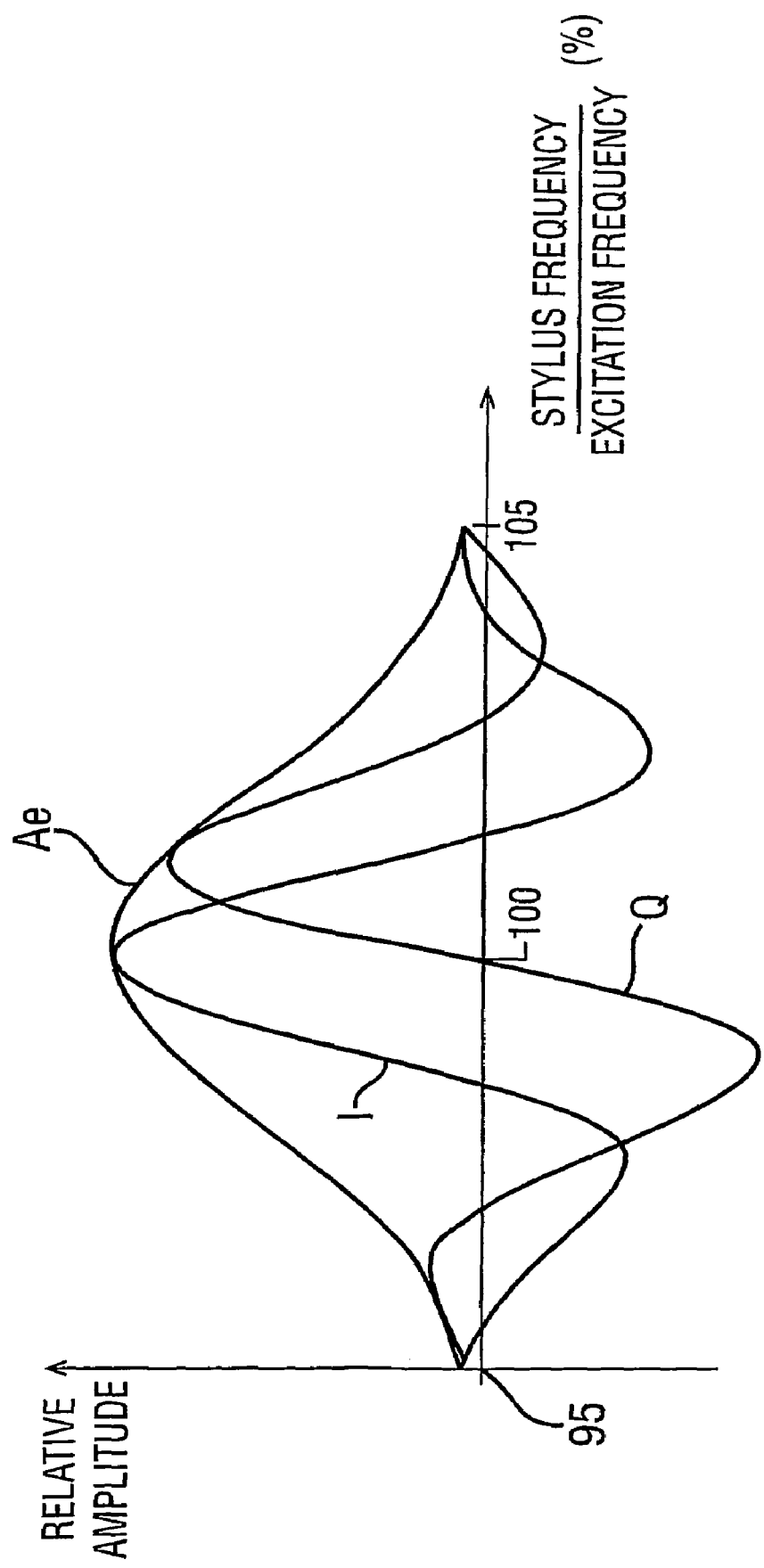
Figure 15:
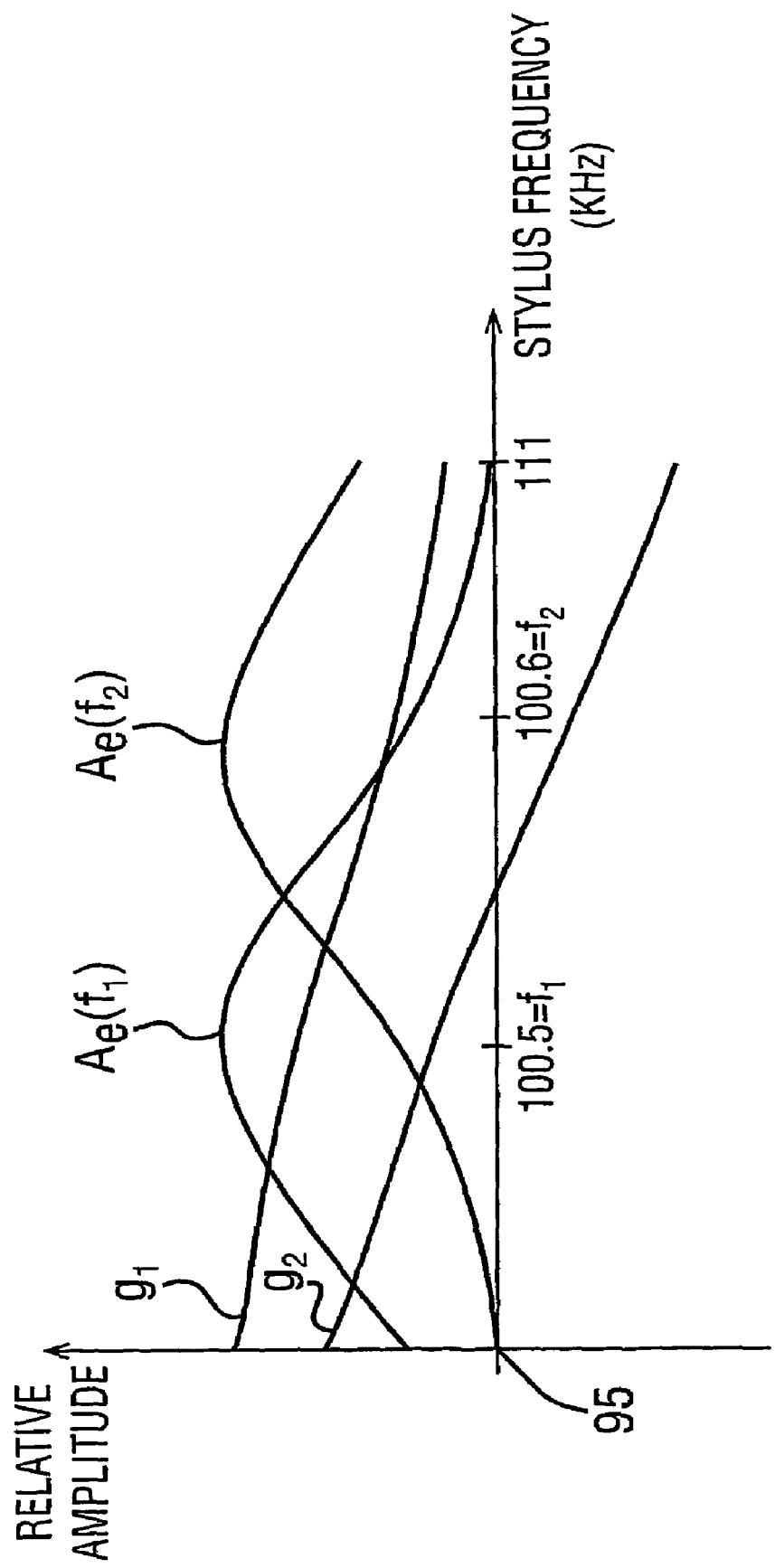
Figure 16:
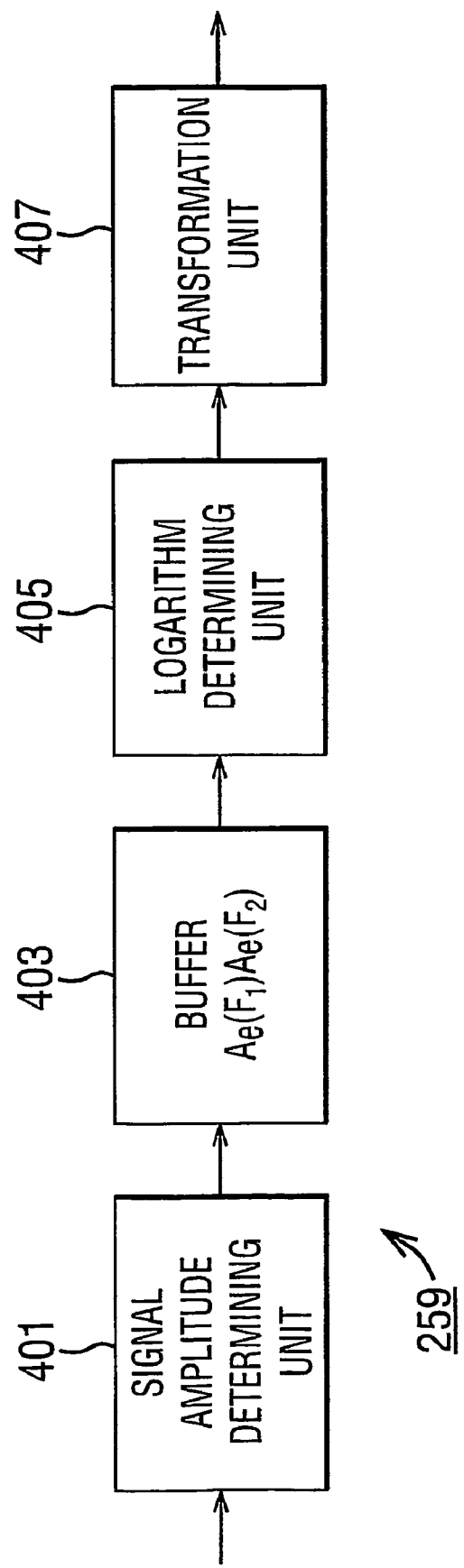
Figure 17A:
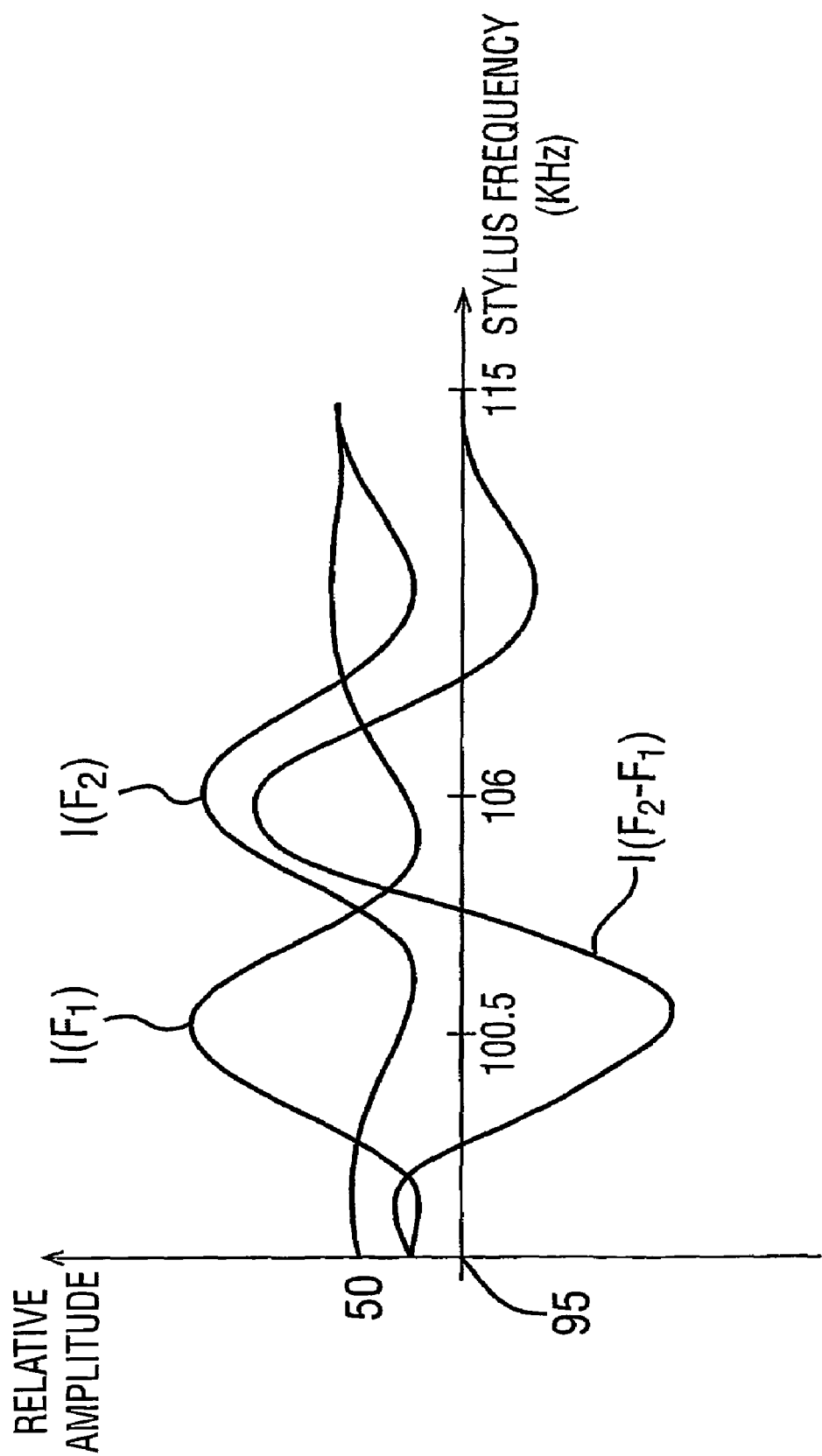
Figure 17B:
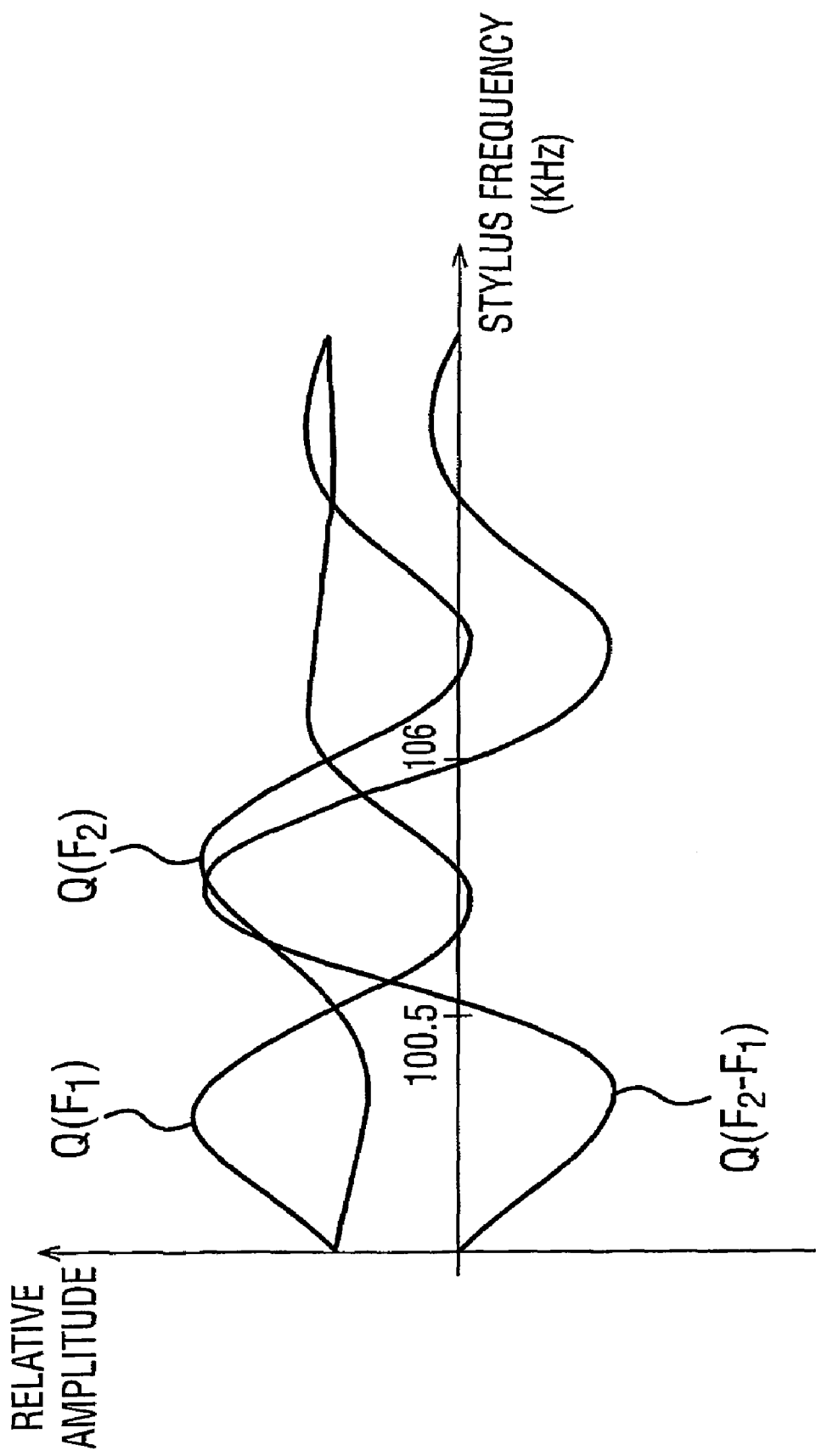
Figure 18:
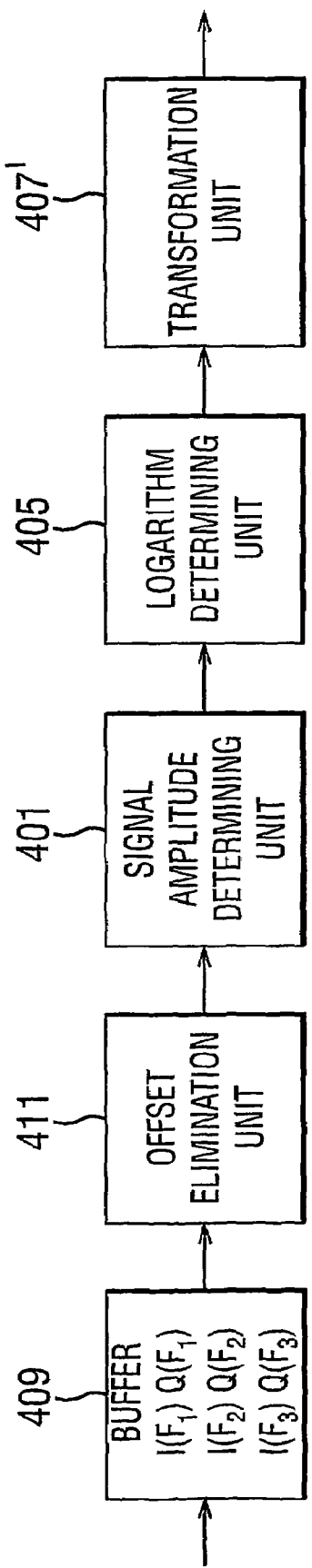
Figure 19A:
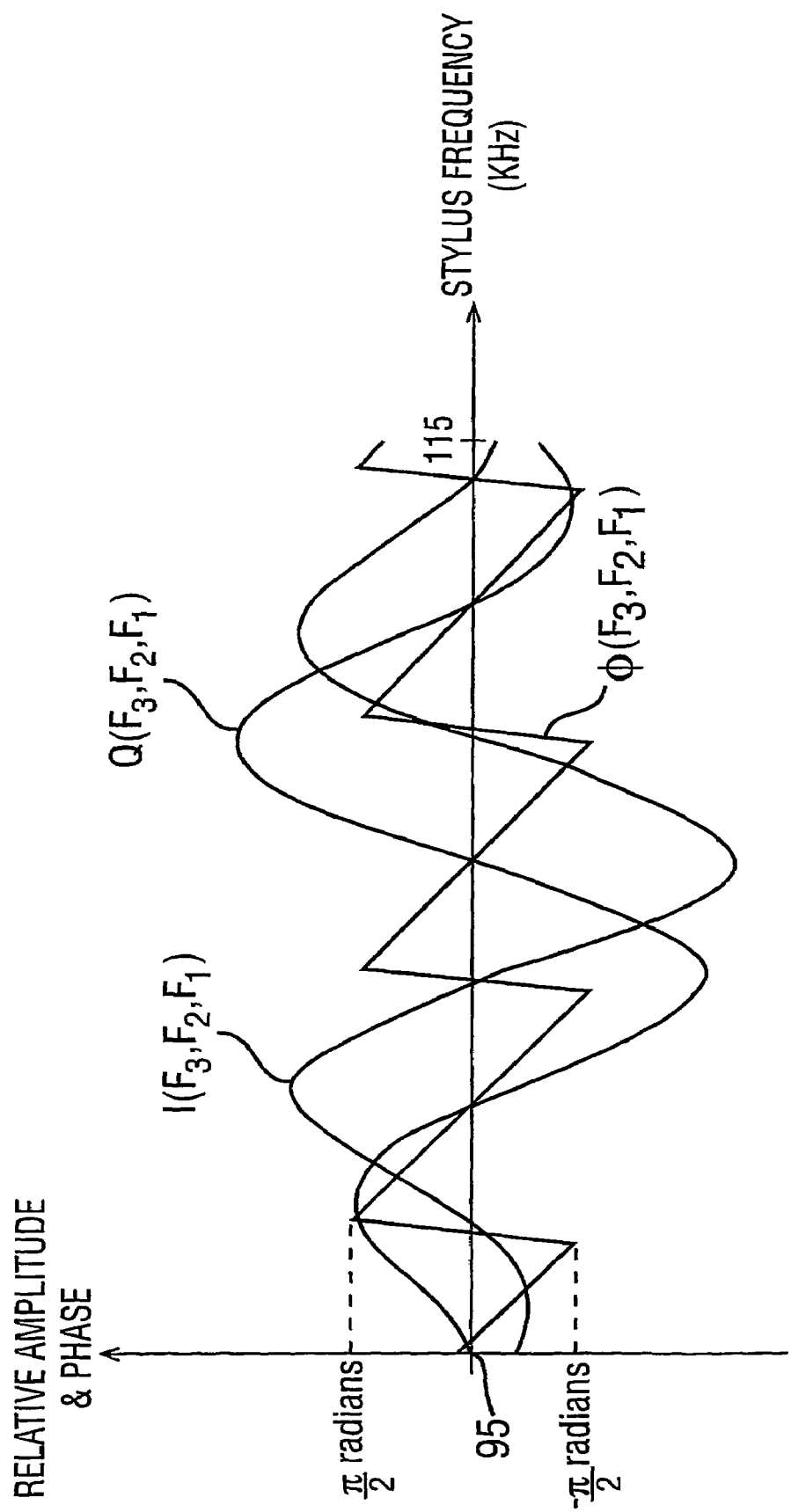
Figure 20:
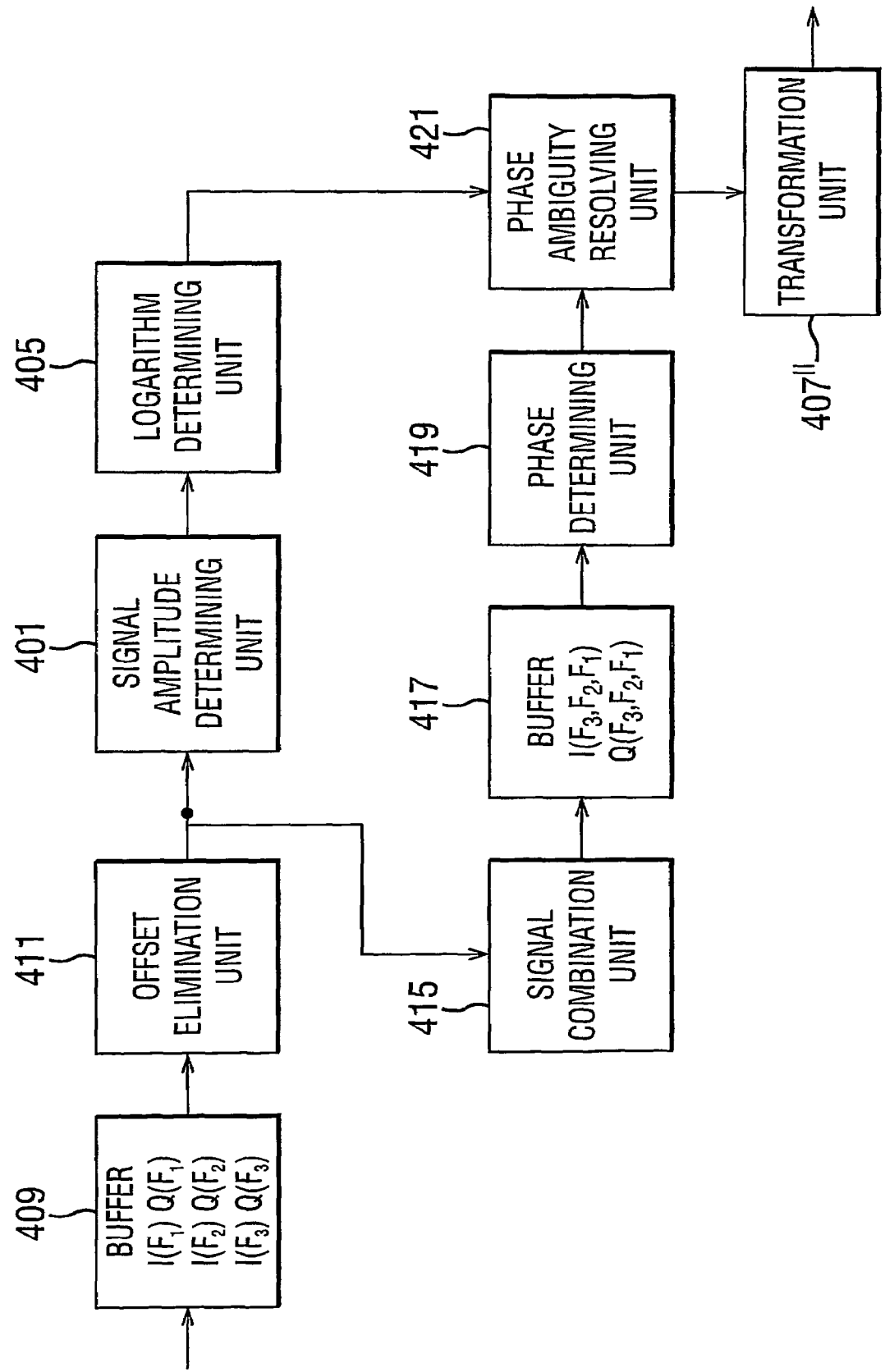
Figure 22:
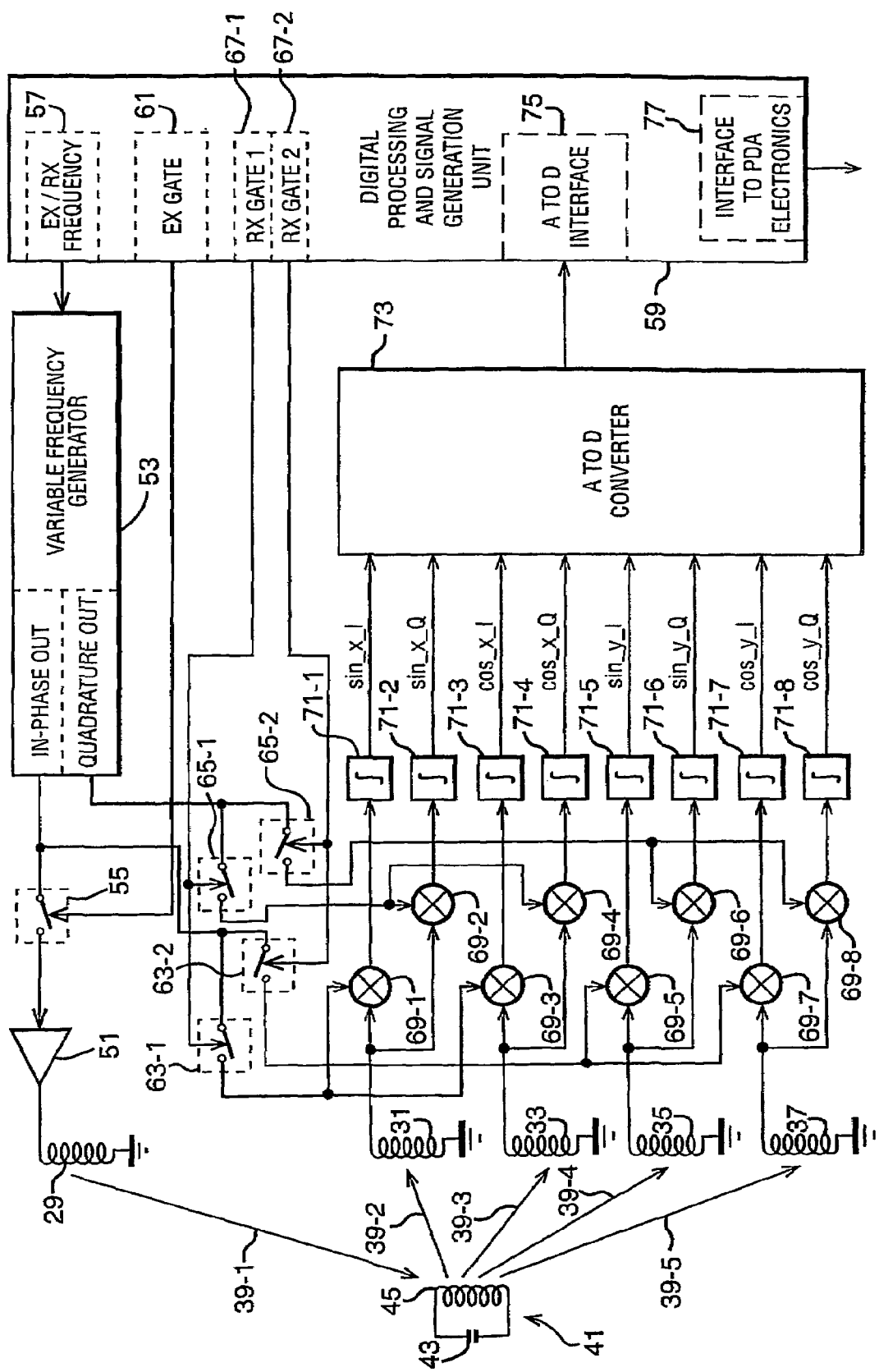
Figure 23:
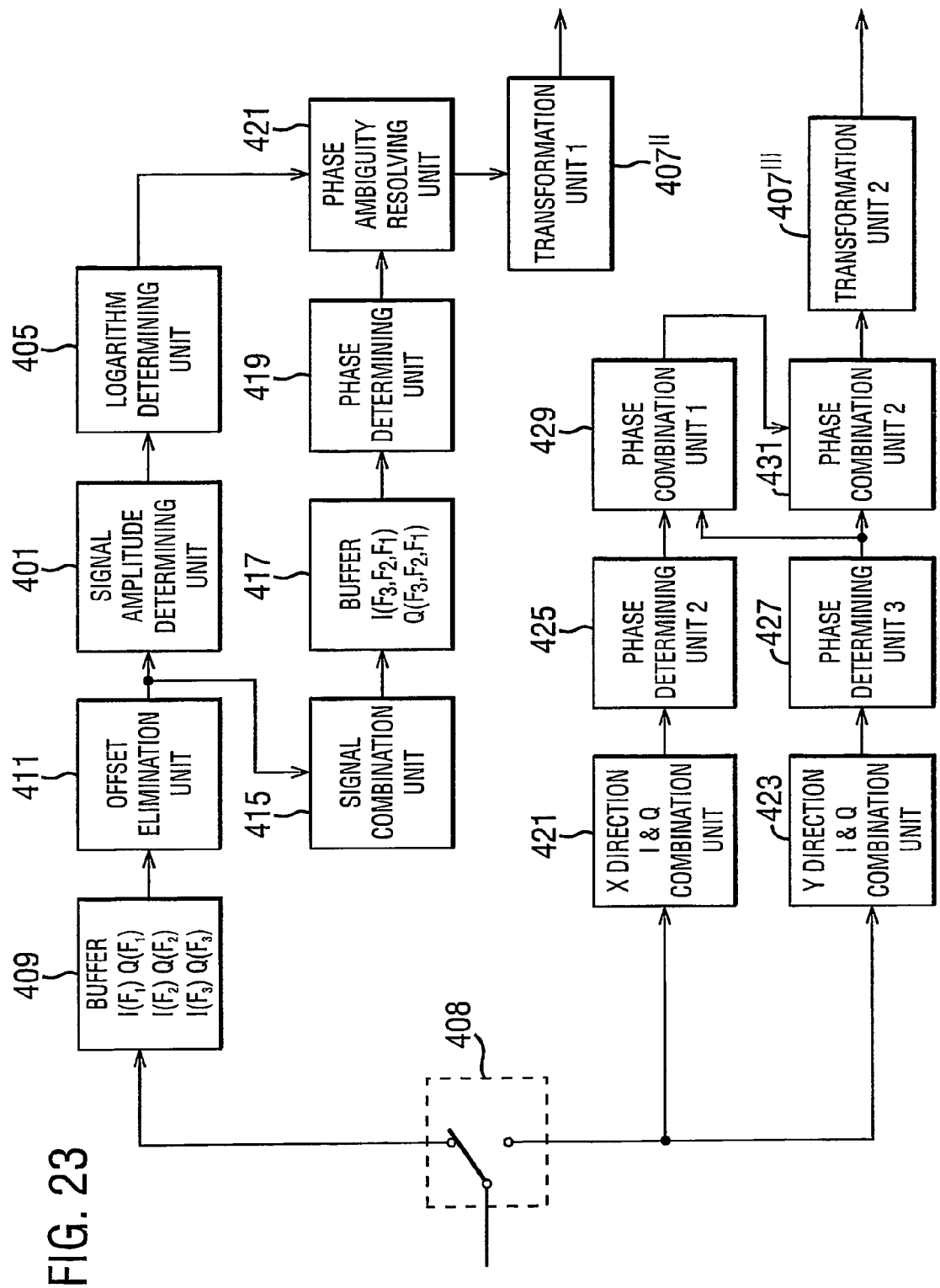
Figure 24A:
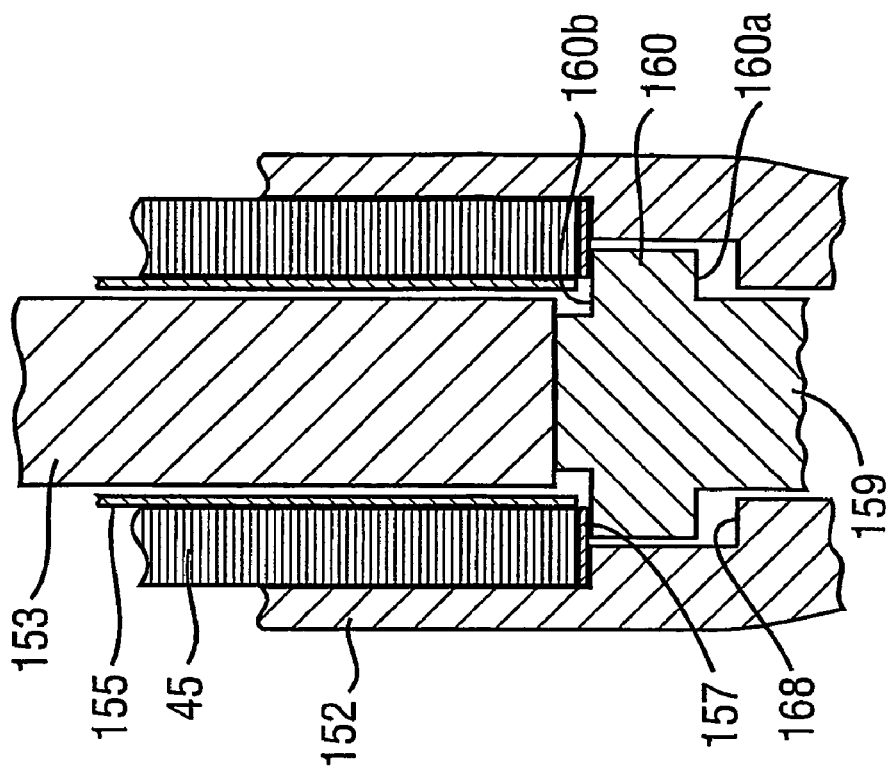
Figure 24B:
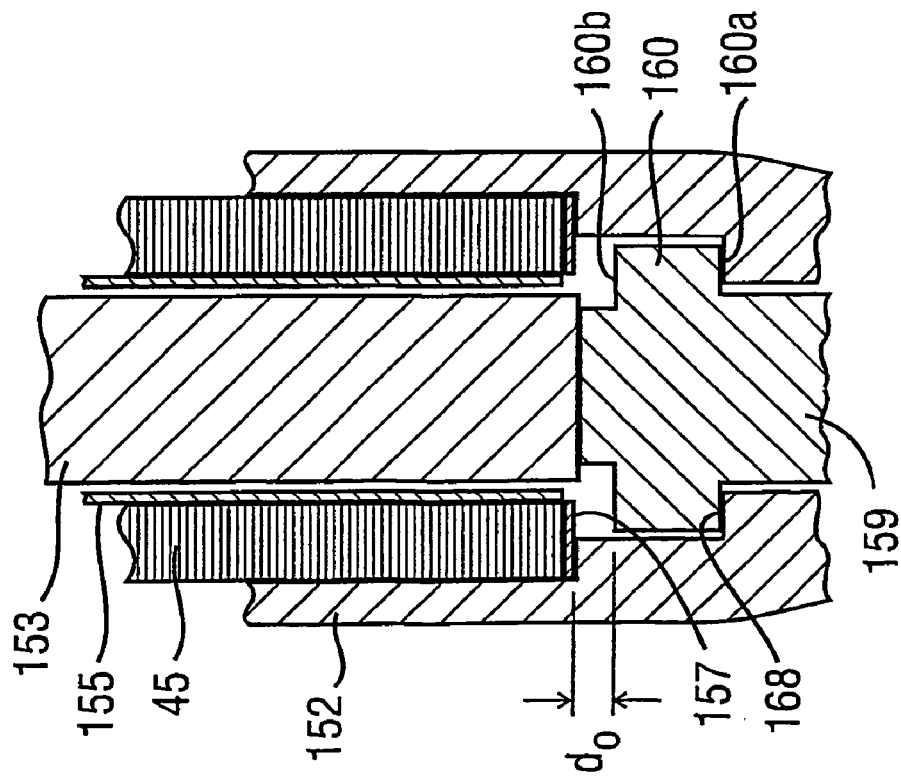
Figure 27:
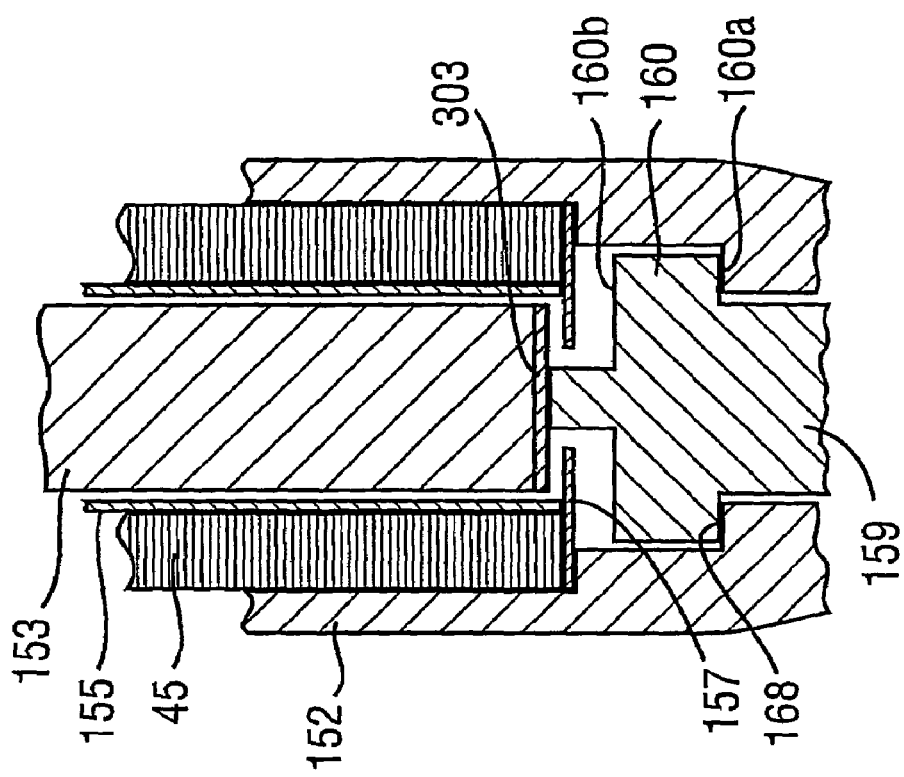
Figure 26:
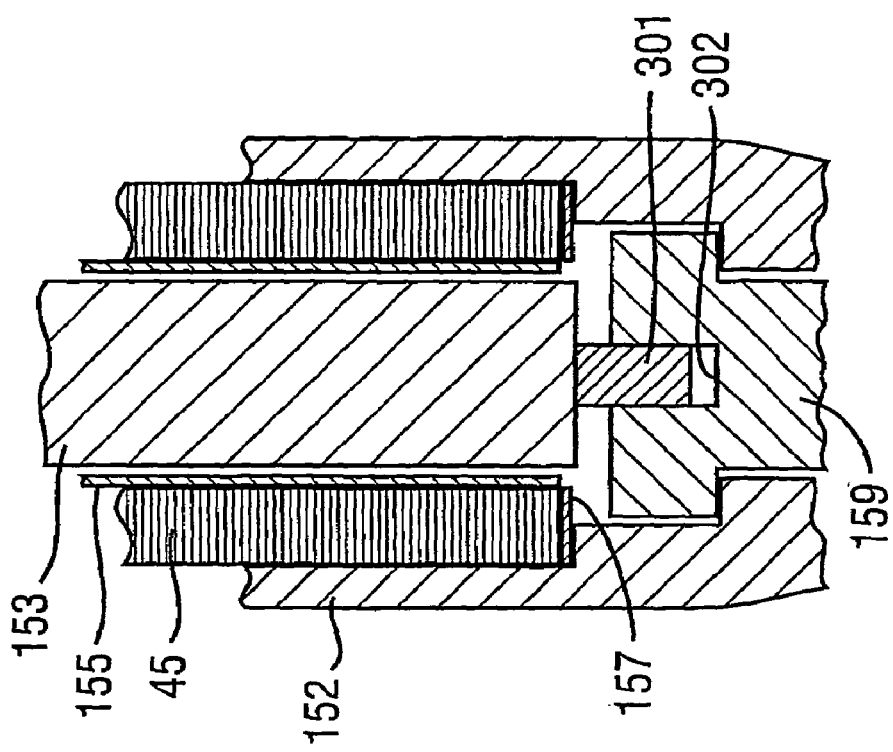
Figure 28:
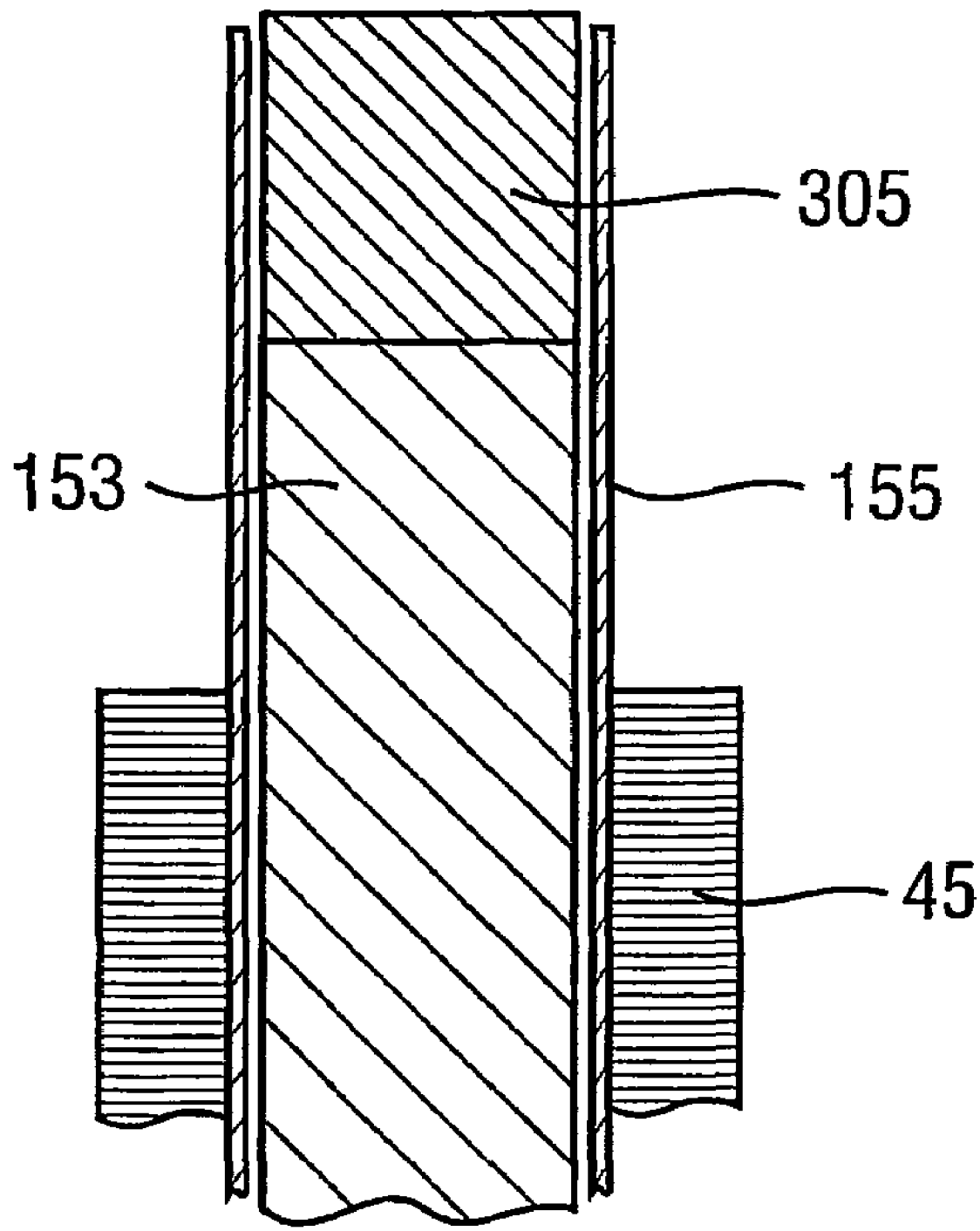
Figure 29:
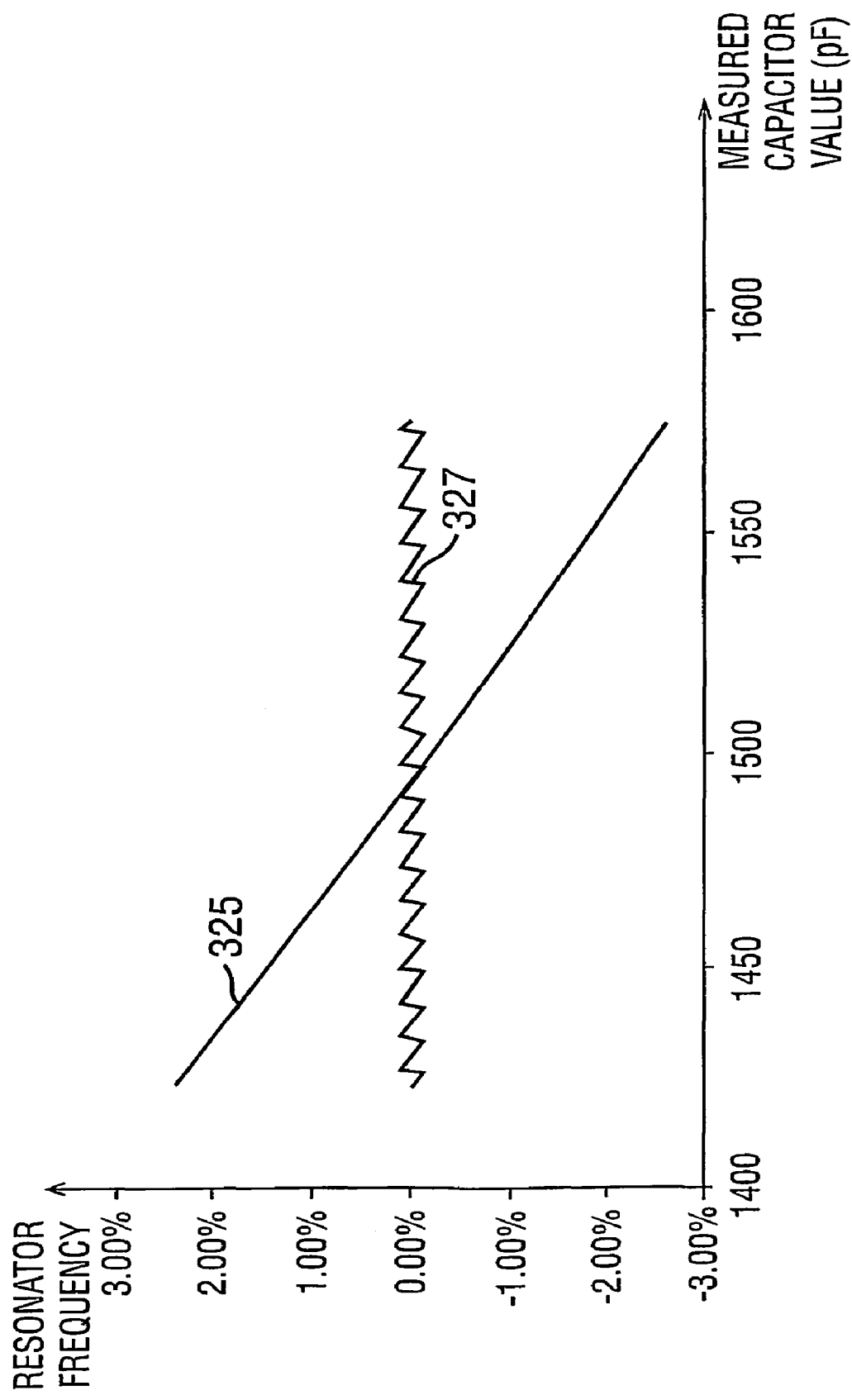
Figure 30:
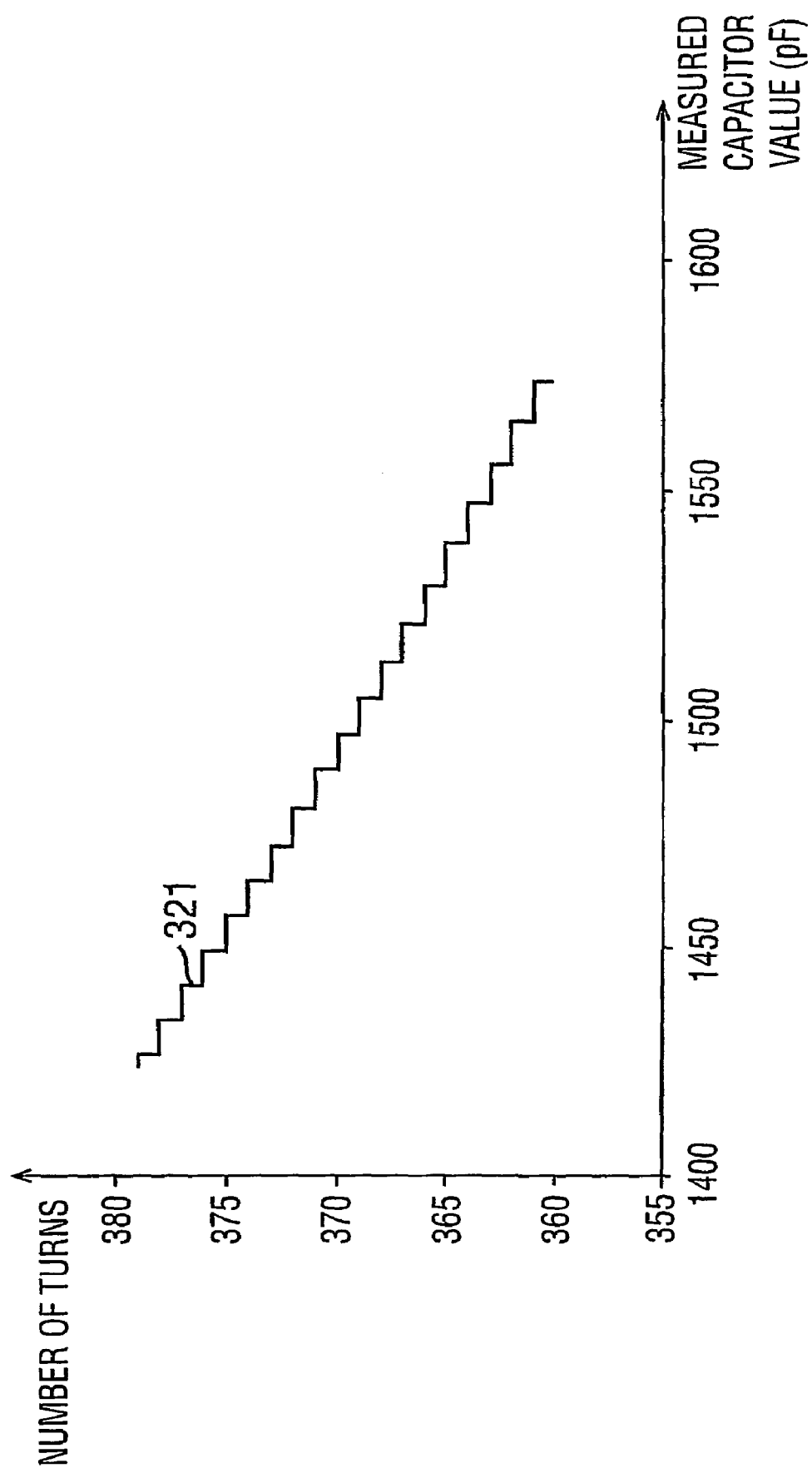
Figure 31:
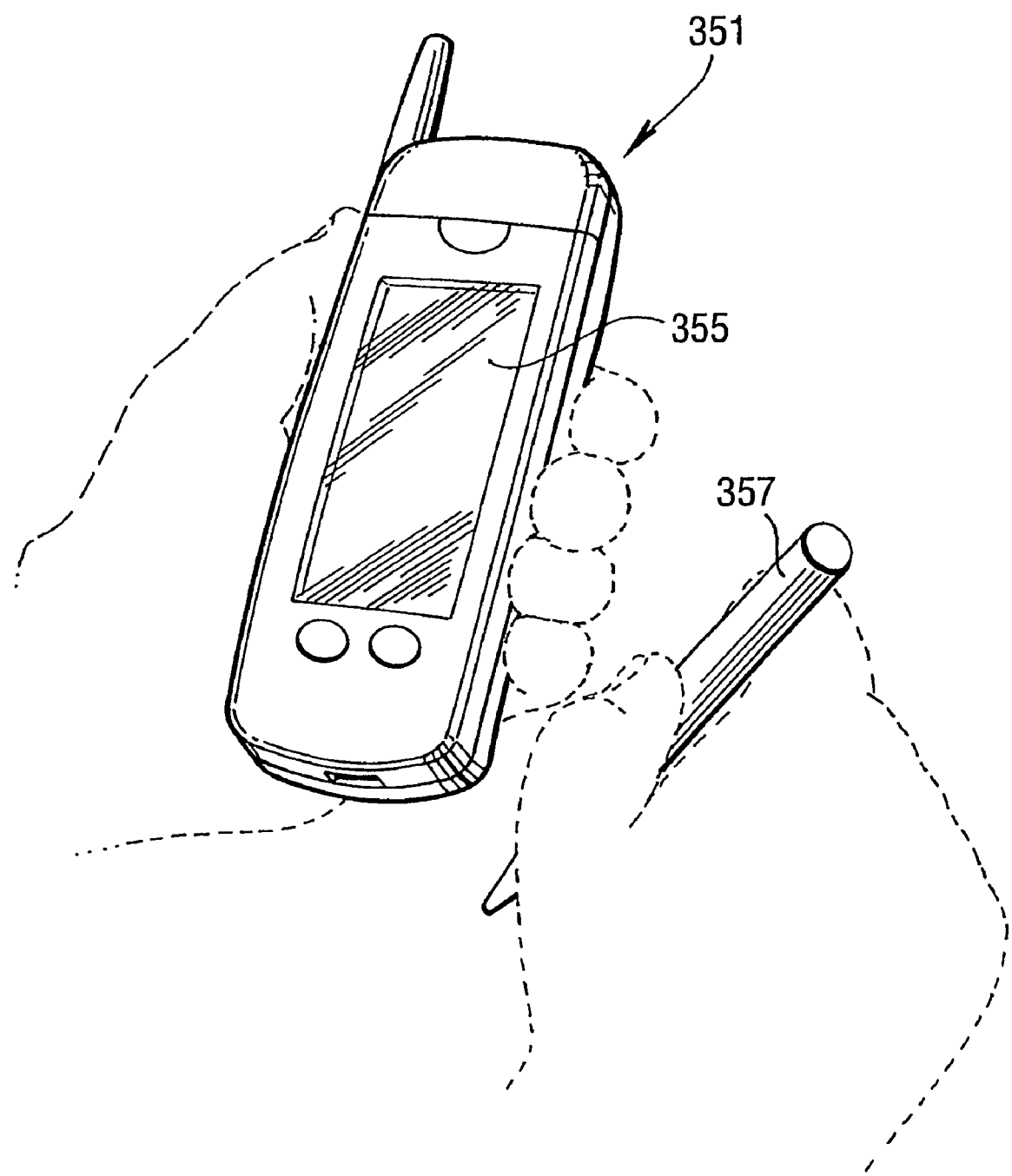

FIG. 4a schematically illustrates an approximation of the way in which the peak amplitude of the signals induced in x-sensor windings of the digitising system vary with the x-coordinate of the position of the stylus relative to the liquid crystal display;

FIG. 4b schematically illustrates an approximation of the way in which the peak amplitude of the signals induced in y-sensor windings of the digitising system vary with the y-coordinate of the position of the stylus relative to the liquid crystal display;

FIG. 5a illustrates the form of a sin x sensor winding of the digitising system which forms part of the personal digital assistant shown in FIG. 1;

FIG. 5b illustrates the form of a cos x sensor winding of the digitising system which forms part of the personal digital assistant shown in FIG. 1;

FIG. 5c illustrates the form of a sin y sensor winding of the digitising system which forms part of the personal digital assistant shown in FIG. 1;

FIG. 5d illustrates the form of a cos y sensor winding of the digitising system which forms part of the personal digital assistant shown in FIG. 1;

FIG. 6 is a plot illustrating the way in which the resonant frequency of the stylus changes with the gap between the stylus and the writing surface;

FIG. 7a is an exploded perspective view of the resonant stylus shown in FIG. 1;

FIG. 7b is a cross-sectional view of the resonant stylus shown in FIG. 1;

FIG. 8a is a cross-sectional view of part of the resonant stylus shown in FIG. 7b in an unclicked state, illustrating the positional relationship between a nib, a ferrite core and a coil forming part of the resonant stylus and showing magnetic field lies passing from the ferrite core around the coil in the unclicked state;

FIG. 8b is a cross-sectional view of part of the resonant stylus shown in FIG. 7b in a clicked state showing the positional relationship between the nib, ferrite core and coil of the resonant stylus and showing magnetic field lines passing from the ferrite core around the coil in the clicked state;

FIG. 9 is a plot illustrating the percentage frequency change of the resonant frequency with gap between the ferrite rod and the split washer;

FIG. 10 is a diagrammatical view of test equipment used to test the resonant frequency of the stylus during manufacture to ensure that the clicked and unclicked resonant frequencies fall within required tolerances;

FIG. 11 is a frequency plot illustrating a required unambiguous frequency detection range required of the positioning system and illustrating the range over which the resonant frequency of the stylus may vary between the clicked state and the unclicked state;

FIG. 12 is a block diagram illustrating the functional modules forming part of a digital processing and signal generation unit forming part of the excitation and processing electronics shown in FIG. 3a;

FIG. 13 is a plot illustrating the way in which the electrical phase of the sensor signals varies with the difference in frequency between the resonant frequency of the stylus and the excitation frequency;

FIG. 14a is a plot illustrating how an in phase component (I) and a quadrature phase component (Q) vary with the difference between the resonant frequency of the stylus and the excitation frequency and also illustrating the way in which the amplitude of the sensed signals varies with the difference between these frequencies;

FIG. 14b is a plot illustrating the same signals illustrated in FIG. 14a except with a different number of excitation and reception cycles of the excitation-detection sequence;

FIG. 15 is a plot showing how two amplitude estimates from different excitation frequencies vary with the resonant frequency of the stylus and illustrating two substantially linear plots obtained from these two amplitude measures;

FIG. 16 is a block diagram illustrating the components of a stylus frequency determining unit that is used in an embodiment which uses an amplitude method to estimate the resonant frequency of the stylus;

FIG. 17a is a plot illustrating the way in which an in-phase component obtained from first and second excitation frequencies vary with the resonant frequency of the stylus and illustrating an offset which is obtained and which is removed by subtracting the two measurements;

FIG. 17b is a plot for quadrature phase values corresponding to the in-phase values shown in FIG. 17a;

FIG. 18 is a block diagram illustrating the components of a stylus frequency determining unit that is used in an embodiment in which three excitation-detection sequences are used with different excitation frequencies and which uses offset elimination techniques to remove offsets within the measurements;

FIG. 19a is a plot illustrating the way in which in-phase and quadrature phase components obtained from three excitation-detection sequences, vary with the resonant frequency of the stylus and the way in which a phase estimate obtained from those in-phase and quadrature phase measurements varies with the resonant frequency of the stylus;

FIG. 19b is a plot showing the way in which the phase value shown in FIG. 19a varies with the resonant frequency of the stylus together with an amplitude function derived from the in-phase and quadrature phase measurements from the three excitation-detection sequences;

FIG. 20 is a block diagram illustrating the components of a stylus frequency determining unit that is used in an embodiment in which an amplitude measure is used to resolve the phase ambiguity associated with a phase measure of the resonant frequency of the stylus;

FIG. 21a is a plot illustrating the way in which two in-phase measurements and two quadrature phase measurements vary with the resonant frequency of the stylus;

FIG. 21b is a plot illustrating the way in which two phase measurements vary with the resonant frequency of the stylus and the way in which a combined phase measurement varies with the resonant frequency of the stylus;

FIG. 22 is a schematic functional block diagram illustrating an alternative form of the excitation and processing electronics to that shown in FIG. 3a in which different receive gate control signals are used for the processing channels for the x-direction sensor windings and the processing channels for the y-direction sensor windings;

FIG. 23 is a block diagram illustrating the components of a stylus frequency determining unit that is used in a preferred embodiment;

FIG. 24a is a partial cross-sectional view illustrating an alternative arrangement of the stylus in an unclicked state;

FIG. 24b is a partial cross-sectional. view of the stylus shown in FIG. 14a in the clicked state;

FIG. 25a is a partial cross-sectional view of an alternative stylus in an unclicked state;

FIG. 25b is a partial cross-sectional view illustrating the stylus shown in FIG. 15a in the clicked state;

FIG. 26 is a partial cross-sectional view of an alternative stylus whose resonant frequency can be varied at the time of manufacture using an adjustable pin;

FIG. 27 is a partial cross-sectional view of another alternative stylus whose resonant frequency can be varied at the time of manufacture using a spacer having a selected thickness;

FIG. 28 is a partial cross-sectional view of a stylus illustrating the way in which the resonant frequency of the stylus may be varied at the time of manufacture by adding an additional length of ferrite rod;

FIG. 29 is a plot illustrating the way in which the resonator frequency changes with capacitor value with a fixed number of coils and with the number of coils being varied to maintain a relatively fixed resonator frequency;

FIG. 30 is a plot illustrating the number of turns of conductor required on a coil forming part of the resonant stylus to maintain a given resonant frequency in dependence upon a measured value of the capacitance of a capacitor forming part of the resonant stylus; and FIG. 31 is a perspective view showing a mobile telephone having a liquid crystal display and a digitising system under the display which is operable to sense the position of a resonant stylus relative to the display;

FIG. 32a is a schematic view of a handheld personal digital assistant (PDA) which includes an x-y digitising system located behind the PDA's liquid crystal display which can sense the x-y position of a resonant stylus over a non-rectangular measurement area; and FIG. 32b schematically illustrates the form of one of the sensor windings employed by the digitising system forming part of the PDA shown in FIG. 32a.

OVERVIEW OF DIGITISING SYSTEM

FIG. 1 shows a hand-held battery-powered personal digital assistant (PDA) 1 which employs an x-y digitising system (not shown) which is located beneath a liquid crystal display 3 of the PDA 1. The x-y digitising system is operable to detect the presence and x-y position of a resonant stylus 5 relative to the LCD 3. The position signals output from the digitising system are used by the PDA 1 to control information that is displayed on the LCD 3 and to control the operating function of the PDA 1. As shown, the PDA 1 also includes a number of push buttons beneath the LCD 3 including an on-off button 7 and a number of control buttons 9-1 to 9-4 which are used to control different functions of the PDA 1.

Figure 2:
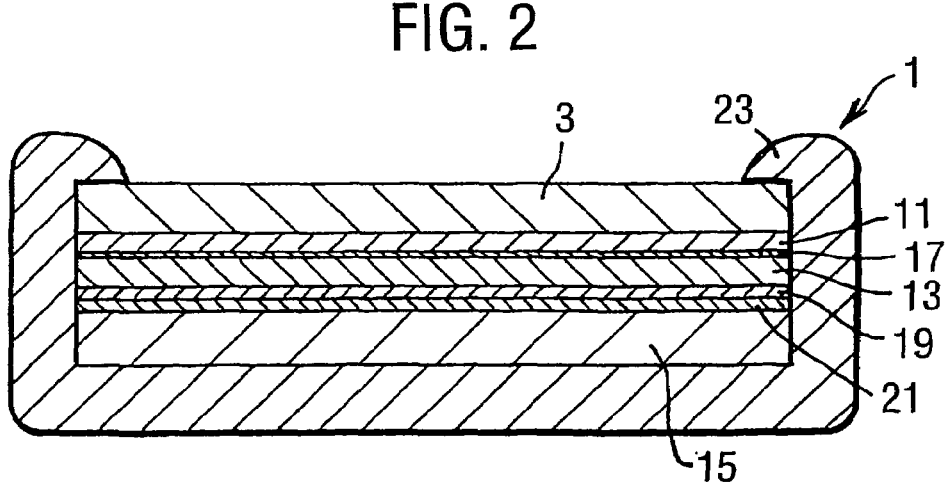

FIG. 2 shows a cross-sectional view on A-A of the PDA 1 shown in FIG. 1. As shown, the PDA 1 includes a liquid crystal display 3 which, in this embodiment, is between 1.5 mm and 3 mm thick. Beneath the LCD 3, there is an electroluminescent backlight 11 for providing a backlight for the LCD 3. In this embodiment, this backlight layer 11 has a thickness of approximately 150 μm. Beneath these layers, there is a 0.2 mm thick sensor printed circuit board (PCB) 13 which forms part of the above-mentioned x-y digitising system. This sensor PCB 13 carries the excitation winding and the sensor windings used for sending signals to and receiving signals from the resonant stylus 5. Beneath the sensor PCB 13 there is a printed circuit board 15 which carries the electronics for controlling the functions of the PDA and the digitiser electronics for processing the signals received from and controlling the signals sent to the windings on the sensor PCB 13.

As shown in FIG. 2, in this embodiment, a grounded electrostatic screen 17 is provided between the sensor printed circuit board 13 and the electroluminescent backlight 11 in order to reduce noise from the. liquid crystal display 3 and the backlight 11 from interfering with the x-y digitising system. In this embodiment, this electrostatic screen is formed from a continuous layer of carbon ink which is approximately 10 μm thick and has a relatively high surface resistivity (e.g. >1 ohm per square) so that it does not interfere with the magnetic sensing function. Further, as shown in FIG. 2, beneath the sensor PCB 13 is a 50 μm layer of pressure sensitive adhesive 19 for bonding the sensor PCB 13 onto a magnetic screen 21, which in this embodiment is a 25 μm layer of spin melt ribbon (for example Vitrovac 6018 manufactured by Vacuumschmelze, Hanau, Germany). As those skilled in the art will appreciate, the magnetic screen 21 is provided in order to reduce any disturbance which may be caused to the x-y digitising system by, for example, the electronics behind the sensor PCB 13. It also enhances the sensitivity of the x-y digitising system since it provides a permeable path for magnetic flux to pass behind the sensor windings on the sensor PCB 13. As shown in FIG. 2, encasing these layers and providing mechanical support is an outer casing 23 which is made, in this embodiment, from plastic.

Figure 3B:
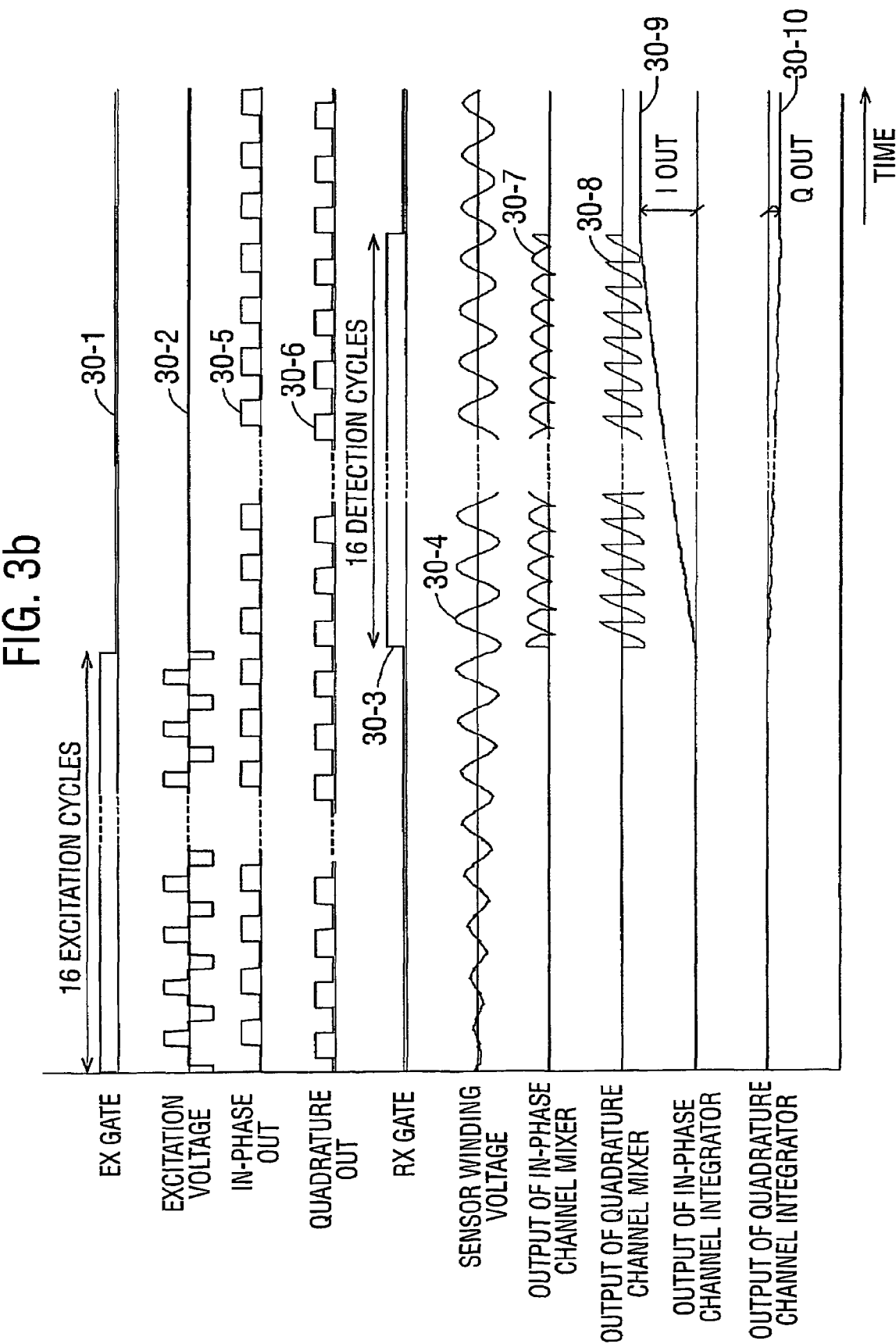
FIG. 3b is a timing plot illustrating the form of various signals within the x-y digitising system shown in FIG. 3a during an excitation and receive cycle.

FIG. 3a schematically illustrates a functional block diagram of the digitising system's processing electronics and FIG. 3b illustrates some of the signals in the digitising system during an excitation and receive cycle. FIG. 3a also illustrates the way in which the excitation winding and the sensor windings interact with the resonant stylus 5. In particular, FIG. 3 schematically shows an excitation winding 29, two x-sensor windings 31 and 33 for sensing x position and two y-sensor windings 35 and 37 for sensing y position. Each of these windings is formed by printed conductors on the sensor PCB 13. As will be explained in more detail below, the sensor windings 31, 33, 35 and 37 used in this embodiment are periodic and are in spatial phase quadrature relative to each other. Therefore, in the following description x-sensor winding 31 will be referred to as the sin x sensor winding, x-sensor 33 will be referred to as the cos x sensor winding, y-sensor winding 35, will be referred to as the sin y sensor winding and y-sensor winding 37 will be referred to as the cos y sensor winding. As illustrated by the arrows 39, these windings are operable, in use, to couple magnetically with a resonant circuit 41 (comprising a capacitor 43 and an inductor coil 45) in the resonant stylus 5.

In operation, an excitation current is applied to the excitation winding 29 through an excitation driver 51. In this embodiment, the excitation current comprises a sequence of positive and negative pulses having a fundamental frequency component ($F_0$) of approximately 100 kHz, which is approximately the resonant frequency of the resonant circuit 41. This excitation signal is generated by a variable frequency generator 53 which generates an appropriate excitation voltage which is applied to the excitation driver 51 through a switch 55.

In this embodiment, the frequency of the excitation voltage generated by the generator 53 is set by an excitation/receive frequency control circuit 57 which forms part of a digital processing and signal generation unit 59. As those skilled in the art will appreciate, by using such a variable frequency generator 53, the digitising system can be reconfigured to operate with a stylus having a different resonant frequency.

The excitation current flowing in the excitation winding 29 generates a corresponding electromagnetic field which magnetically couples, as indicated by the arrow 39-1, with the resonant circuit 41 and causes it to resonate. In this embodiment, the excitation winding 29 is arranged to keep the coupling with the resonator as constant as possible with the x-y position of the stylus relative to the LCD 3. When the resonator 41 is resonating, it generates its own electromagnetic field which magnetically couples, as represented by the arrows 39-2, 39-3, 39-4 and 39-5, with the sensor windings 31, 33, 35 and 37 respectively. As will be explained in more detail below, the sensor windings 31, 33, 35 and 37 are designed so that the coupling between them and the resonant stylus varies with the x or y position of the stylus and so that there is minimum direct coupling between them and the excitation winding 29. Therefore, the signal received in the sensor windings should.only vary with the magnetic coupling between the resonator 41 and the respective sensor winding. Consequently, by suitable processing of the signals received in the sensor windings, the x-y position of the resonator 41, and hence of the resonant stylus 5, can be determined relative to the sensor windings.

In this embodiment, the excitation current is not continuously applied to the excitation winding 29. Instead, bursts of the excitation current are applied, with the application of the excitation bursts being controlled by opening and closing the switch 55. As shown in FIG. 3a, this is controlled by an excitation gate controller 61 which forms part of the digital processing and signal generation unit 59. In this embodiment, in order to reduce the effect of any breakthrough from the excitation winding 29 to the sensor windings, the signals induced in the sensor windings are only detected between the bursts of the excitation current. This is achieved by controlling the positions of switches 63 and 65 with the receive gate controller 67 which forms part of the digital processing and signal generation unit 59. This mode of operation is referred to as pulse echo and works because the resonator 41 continues to resonate after the burst of excitation current has ended. This mode of operation also minimises power consumption of the digitiser.

FIG. 3b shows the excitation gate signal 30-1 applied to the switch 55; the excitation voltage 30-2 applied to the excitation winding 29; the receive gate signal 30-3 applied to the switches 63 and 65 and a typical voltage 30-4 induced in one of the sensor windings. In this illustration, sixteen excitation cycles (counting the start and end pulses as halves) are applied to the excitation winding 29 which energises the resonator 41 in the stylus 5 which in turn induces a signal such as 30-4 in each of the sensor windings. As a result of the periodic nature of the sensor windings and their relative positions, the four signals induced in the four sensor windings from the resonant circuit 41 can be approximated by:

$$E_{31} = Ae^{-t/\tau}\sin\left[\frac{2\pi x}{L_x}\right]\cos[2\pi F_o t + \varnothing] \quad (1)$$

$$E_{33} = Ae^{-t/\tau}\cos\left[\frac{2\pi x}{L_x}\right]\cos[2\pi F_o t + \varnothing] \quad (2)$$

$$E_{35} = Ae^{-t/\tau}\sin\left[\frac{2\pi y}{L_y}\right]\cos[2\pi F_o t + \varnothing] \quad (3)$$

$$E_{37} = Ae^{-t/\tau}\cos\left[\frac{2\pi y}{L_y}\right]\cos[2\pi F_o t + \varnothing] \quad (4)$$

where A is a coupling coefficient which depends upon, among other things, the distance of the stylus 5 from the windings and the number of turns in the sensor windings; x is the x-position of the resonant stylus relative to the sensor windings; y is the y-position of the resonant stylus relative to the sensor windings; $L_x$ is a spatial wavelength of the sensor windings in the x-direction and is typically slightly greater than the width of the board in the x-direction (and in this embodiment is 97 mm); $L_y$ is a spatial wavelength of the sensor windings in the y-direction and is typically slighter greater than the width of the board in the y-direction (and in this embodiment is 87 mm); $e^{-t/\tau}$ is the exponential decay of the resonator signal after the burst of excitation signal has ended, with τ being a resonator constant which depends upon, among other things, the quality factor of the resonant circuit 41; and ø is an electrical phase shift caused by a difference between the fundamental frequency of the excitation current and the resonant frequency of the resonator 41. In this embodiment, the resonant stylus 5 is designed so that its resonant frequency changes with the pressure applied to the tip of the stylus. This change in frequency causes a change in the phase shift ø.

As can be seen from equations (1) to (4), the peak amplitude of the signals induced in the sensor windings vary as the sin or cos of either the x or y position. This is illustrated in FIGS. 4a and 4b. In particular, FIG. 4a illustrates the way in which the peak amplitude of the signal induced in sensor winding 31 and the way in which the signal induced in sensor winding 33 varies with the x-position of the resonant stylus relative to the sensor windings and FIG. 4b shows the way in which the peak amplitude of the signals induced in sensor winding 35 and sensor winding 37 vary with the y-position of the resonant stylus relative to the sensor windings. As shown in FIG. 4, the pitch ($L_x$) of the windings in the x-direction is greater than the pitch ($L_y$) of the windings in the y-direction. This is because, in this embodiment, the measurement area is rectangular.

Therefore, as those skilled in the art will appreciate, both the x-y position information of the resonant stylus 5 and the phase shift ø can be determined from the signals induced in the sensor windings by suitable demodulation and processing. As shown in FIG. 3a, this demodulation is achieved by mixing the received signals with the excitation voltage generated by the variable frequency generator 53 in the mixers 69-1 to 69-8. In this embodiment, an in-phase component 30-5 and a quadrature phase component 30-6 (shown in FIG. 3b) of the excitation signal are mixed with the signal induced in each of the sensor windings. This generates an in phase (I) component 30-7 and a quadrature phase (Q) component 30-8 of each of the demodulated signals. In this embodiment, the in phase components 30-7 of the demodulated signals from all the sensor windings are used to determine the position information and the in phase and quadrature phase components of the demodulated signals are used to determine the electrical phase shift (i.e. ø). As shown in FIG. 3a, the output from these mixers 69 are input to a respective integrator 71-1 to 71-8 which, after being reset, integrate the outputs from the mixers over a time period which is a multiple of $1/F_0$ (in order to remove the effect of the time varying components output by the mixer). In this embodiment, the integration time is controlled by using the receive gate signal 30-3 (which in the illustration allows for the integration to be performed over sixteen excitation periods or cycles). The following equations approximate the outputs from the integrators 71-1 to 71-4:

$$\sin\_x\_I = A_1 \sin\left[\frac{2\pi x}{L_x}\right] \cos\emptyset \quad (5)$$

$$\sin\_x\_Q = A_1 \sin\left[\frac{2\pi x}{L_x}\right] \sin\emptyset \quad (6)$$

$$\cos\_x\_I = A_1 \cos\left[\frac{2\pi x}{L_x}\right] \cos\emptyset \quad (7)$$

$$\cos\_x\_Q = A_1 \cos\left[\frac{2\pi x}{L_x}\right] \sin\emptyset \quad (8)$$

where $A_1$ is a constant which varies with, among other things, the constant A, the resonator τ and the integration period. Similar signals are obtained from integrators 71-5 to 71-8, except these vary with the y-position rather than with the x-position. FIG. 3b also illustrates the output voltage 30-9 from one of the in-phase integrators and the output voltage 30-10 from one of the quadrature phase integrators.

As shown in FIG. 3a, the outputs from the integrators 71 are input to an analogue-to-digital converter 73 which converts the outputs into digital values which are input to the A to D interface unit 75 in the digital processing and signal generation unit 59. The digital processing and signal generation unit 59 then performs an arc tangent function (atan 2) on the ratio of the sin_x_I signal and the cos_x_I signal to determine the x-position of the resonant stylus 5 and similarly performs an arc tangent function on the ratio of the sin_y_I signal and the cos_y_I to determine the y-position of the resonant stylus 5. The digital processing and signal generation unit 59 also calculates an arc tangent function on the ratio of the quadrature phase component to the in phase component of the signals from the same sensor windings, in order to determine the electrical phase angle ø.

As shown in FIG. 3a, the in phase and quadrature phase component for the signal induced in each of the sensor windings is calculated. This is because, at certain x and y positions, the ratio of the in phase and quadrature phase components from some of the sensor windings will not be reliable. This occurs when the sin or cos position components are approximately zero. Therefore, in this embodiment, the digital processing and signal generation unit 59 determines the electrical phase angle ø using a weighted combination of the in phase and quadrature phase signals from both the sin and cos windings, where the weighting used varies in dependence upon the determined x and y position of the stylus 5. The processing electronics then uses this electrical phase angle measurement to determine if the tip of the stylus 5 has been brought down into contact with the writing surface of the PDA 1. The way in which this is achieved will be described in more detail later.

Returning to FIG. 3a, after the digital processing and signal generation unit 59 has determined the current x-y position of the resonant stylus 5 and determined whether or not the stylus 5 has been brought into contact with the LCD 3, it outputs this information to the PDA electronics through the interface unit 77. This information is then used by the PDA electronics to control information displayed on the LCD 3 and the PDA's mode of operation. In this embodiment, the digital processing and signal generation unit 59 is operable to perform the above calculations approximately 100 times per second when the stylus is in the vicinity of the PDA. However, when the system detects that the stylus is not present, it initially enters a standby state in which the above excitation and processing is performed approximately 20 times per second. After a predetermined length of time in this standby state, the system enters a sleep state in which the above calculations are performed approximately 2 times per second. Once the presence of the stylus is detected again, the processing resumes at the 100 times per second rate.

A brief description has been given above of the way in which the digitiser system of the present embodiment determines the x-y position of the resonant stylus 5 relative to the sensor windings. The particular form of excitation and sensor windings used and the particular resonant stylus 5, digital processing and excitation circuits used in this embodiment will now be described in more detail.

Digitiser Windings

The excitation winding 29 used in this embodiment is formed by two turns of rectangular conductor on each of the four layers of the sensor PCB 13. The conductors formed on the four layers are shown as full lines in FIGS. 5a to 5d. As shown in these figures, the two turns of the excitation winding 29 on each layer are wound around the outside of the conductors forming the sensor windings at the perimeter of the sensor PCB 13 and are connected in series with each other at through holes or vias, some of which are labelled 97.

FIG. 5a also shows the conductors which form the sin x sensor winding 31. The majority of the conductors forming the sin x sensor winding 31 are provided in a single layer which in this embodiment is the layer closest to the magnetic screen 21. The conductors of the sin x sensor winding 31 on this lower layer of the sensor PCB 13 are shown in full lines, whereas those conductors of the sin x sensor winding 31 which are formed on other layers of the sensor PCB 13 are shown as dashed lines. As shown, the conductor tracks on the different layers are connected together at via holes, some of which are labelled 97.

The conductor tracks of the sin x sensor winding 31 are connected to form a number of multi-turn loops which are arranged in succession along the x-direction. The loops of the sin x sensor winding 31 are connected in series and arranged so that the magnetic coupling between the resonant stylus 5 and the winding 31 varies in an approximate sinusoidal manner in the x-direction across the sensor PCB 13. The loops of the sensor winding 31 are also arranged so that there is substantially no variation in the magnetic coupling between the resonant stylus 5 and the sensor winding 31 if the resonant stylus 5 is moved across the sensor PCB 13 in the y-direction. In this way, the signal induced in the sensor winding 31 by the resonant stylus 5 will have a peak amplitude which approximately varies as the sine of the x-position of the stylus 5 relative to the sensor winding 31.

FIG. 5b shows some of the conductors which form part of the excitation winding 29 and the conductors which form the cos x sensor winding 33. The majority of the conductors forming the cos x sensor winding 33 are provided in a single layer of the PCB 13, which in this embodiment is the second closest layer to the magnetic screen 21. The conductors of the cos x sensor winding 33 on this layer of the sensor PCB 13 are shown in full lines, whereas those conductors of the cos x sensor winding 33 which are formed on other layers are shown as dashed lines. As shown, the conductor tracks on the different layers are connected together at via holes, some of which are labelled 97.

The conductor tracks of the cos x sensor winding 33 are also connected to form a number of multi-turn loops which are arranged in succession along the x-direction. The loops are also connected in series so that as the resonant stylus 5 moves across the sensor winding 33 along the x-direction, the magnetic coupling between the resonant stylus 5 and the sensor winding 33 will vary in a substantially sinusoidal manner with the x-position of the resonant stylus 5. The loops of the cos x sensor winding 33 are also arranged relative to the loops of the sin x sensor winding 31 so that this sinusoidal variation is substantially 90° out of phase with the corresponding sinusoidal variation associated with the sin x sensor winding 31. Further, the loops of the cos x sensor winding are arranged so that the magnetic coupling between the resonant stylus 5 and the sensor winding 33 does not vary with the y-position of the stylus 5 relative to the sensor winding 33. Therefore, when the resonant stylus 5 is resonating, it will induce a signal in the sensor winding 33 which has a peak amplitude which approximately varies as the cosine of the x-position of the stylus 5 relative to the sensor winding 33.

FIGS. 5c and 5d show the other conductors forming the excitation winding 29 and the conductors which form the sin y sensor winding 35 and the cos y sensor winding 37. As shown in these figures, these sensor windings 35 and 37 are similar to the sin x and cos x sensor windings 31 and 33, except they are rotated through 90°.

FIG. 5d also shows the connection pads which are provided for connecting the ends of the sensor windings to the processing electronics. In particular, the ends of the sin x sensor winding 31 are connected to connection pads 105 and 107; the ends of the cos x sensor winding 33 are connected to connection pads 109 and 111; the ends of the sin y sensor winding 35 are connected to connection pads 107 and 113; and the ends of the cos y sensor winding 37 is connected to connection pads 109 and 115. As shown, the sin y sensor winding 35 shares the connection pad 107 with the sin x sensor winding 31 and the cos y sensor winding 37 shares the connection pad 111 with the cos x sensor winding. FIG. 5d also shows the connection pads 101 and 103 which connect the excitation winding 29 to the excitation driver 51 (shown in FIG. 3a). FIG. 5d also shows a connection pad 117 which is for connection to a ground terminal (not shown) of the PDA device. As shown in FIG. 5d, this ground connection pad 117 is connected to a castellated conductor region 119 which provides the ground connection for the electrostatic screen 17. The conductor region 119 is castellated in order to reduce eddy currents from being generated therein. The grounded conductor region 119 is also connected (through via holes 97) to a grounding pad 121, formed on the lower layer of the PCB 13 shown in FIG. 5a, for grounding the magnetic screen 21.

Design of Sensor Windings

As those skilled in the art will appreciate, the design of the sensor windings is one of the most critical aspects of the digitiser. The design involves, for a given area of printed circuit board, maximising the digitising area and the accuracy of and the signal levels from the sensor windings.

In the following description, the conductor tracks of the x-position sensor windings 31 and 33 which extend across the sensor board in the y-direction will be referred to as the transverse conductors and those which extend in the x-direction will be referred to as the connecting conductors. Similarly, the y-position sensor windings 35 and 37 which extend across the sensor board in the x-direction will be referred to as the transverse conductors and those which extend in the y-direction will be referred to as the connecting conductors. For illustration, some of the transverse conductors are indicated by reference numerals 31-t, 33-t, 35-t and 37-t and some of the connecting conductors are illustrated by reference numerals 31-c, 33-c, 35-c and 37-c in FIGS. 5a to 5d.

As can be seen from FIGS. 5a to 5d, the most striking feature of most of the transverse sensing conductors is their irregular form with multiple bends or kinks as they extend from one side of the sensor board 13 to the other. In all prior art systems that the applicant is aware of, these transverse conductors are formed by substantially straight parallel lines. However, the applicant has found that the use of such irregular shaped transverse conductors can surprisingly result in more accurate position sensing by the digitising electronics.

These irregular transverse conductors can provide accurate position sensing because positional errors caused by irregularities or bends of the transverse conductors of the sin winding can be compensated by complementary irregularities or bends in the transverse conductors of the cosine winding. These errors then cancel with each other when the arc tangent function is calculated by the digitiser electronics, thereby giving a more accurate position measurement.

The design of the sensor windings has also been arranged in order to boost the signal levels generated by the sensor windings when the resonant stylus 5 is at the perimeter of the sensor PCB 13 and especially at the corners. This has been achieved by increasing the area enclosed by the loops at the corners of the PCB. In particular, considering the sin x sensor winding 31, this winding has four corner portions 31-1 to 31-4 which each extend in the x-direction towards a central portion of the sensor winding 31. As shown in FIG. 5b to 5d, each of the other sensor windings 33, 35 and 37 includes such inwardly extending corner areas, labelled 33-1 to 33-4, 35-1 to 35-4 and 37-1 to 37-4. As shown in FIGS. 5c and 5d, these corner portions of the y-direction sensor windings extend inwardly along the y-direction towards a central portion of the y-direction sensor windings. The effect of these "bulging" or "flared" corners is to increase the mutual inductance between the sensor coils and the resonant stylus 5 near the sensor board corners which therefore increases the minimum signal EMFs induced therein. Further, since the areas with increased coupling are restricted to the perimeter of the sensor board 13, the coupling to unwanted noise sources is not increased unnecessarily.

In addition to these bulging corners, the cos x sensor winding 33 and the cos y sensor winding 37 include additional design features which help to boost the signal levels obtained from the sensor windings when the stylus 5 is at the perimeter of the sensor board 13. In the case of the cos y sensor winding (shown in FIG. 5d), additional loops of conductor generally referenced 37-5 and 37-6 are provided at the left and right-hand edge of the sensor board 13. As a result of these additional loops, the signal levels from the resonant stylus 5 are boosted at these left and right-hand edges compared with the signal levels obtained when the stylus 5 is in the centre of the PCB 13.

As shown in FIG. 5b, the additional loops 33-5 and 33-6 in the cos x sensor winding 33 are provided at the top and bottom of the PCB 13 and are connected together across the middle of the PCB 13. The conductors which form this connection are close together in the x-direction so that the increase in coupling is minimised except near the top and bottom of the PCB 13. In addition, there is one loop of conductor 33-7 and 33-8 both to the left and to the right of this central connection region which is wound in the opposite direction to the main inner loop and serves to reduce the coupling in the central portion of the PCB 13 except at the top and bottom edges. This reduction in the coupling in the central region can alternatively be viewed as an increase in the relative coupling near the top and bottom edge of the sensor PCB 13. The inventors have found that with these additional design features of the sensor windings leads to increased accuracy of the x-y digitiser.

Stylus

The stylus 5 of the present embodiment overcomes a number of problems with previous styluses which have been proposed and in particular the stylus proposed in WO 00/33244 described above. The stylus 5 is also designed to be sufficiently compact for space-critical applications such as the hand-held PDA 1 of the present embodiment. As mentioned above, the resonant. stylus, 5 in this embodiment comprises a resonant circuit 41 which includes an inductor coil 45 and a capacitor 43. The resonant stylus 5 is also designed so that the resonant frequency of the resonant circuit 41 changes when the tip of the stylus 5 is brought down into contact with the writing surface of the digitising system.

FIG. 6 shows a plot 10 illustrating the way in which the resonant frequency of the stylus 5 used in this embodiment changes with the gap between the stylus 5 and the writing surface of the PDA 1. As shown, as the stylus 5 is brought closer to the writing surface, the resonant frequency of the stylus 5 decreases (due to the detuning effect of the magnetic screen 21) to a value of $f_{uc}$ at the point where the nib 159 of the stylus 5 touches the writing surface of the PDA 1. As pressure is applied to the nib, the nib is pushed back into the stylus body into its clicked state, at which point the resonant frequency of the stylus has increased to $f_c$. Therefore, by comparing the measured resonant frequency of the stylus 5 with a threshold frequency ($f_{th}$), the processing electronics can determine whether or not the stylus 5 is in its clicked state or unclicked state. As can be seen from FIG. 6, the change in resonant frequency between the unclicked and clicked states must be greater than the change in frequency caused by the detuning effect of the magnetic screen 21. Therefore, in this embodiment, the stylus 5 is designed to provide a change in resonant frequency of approximately 10% between the unclicked and clicked states. The stylus 5 is also designed so that this change in frequency can be achieved while keeping to a minimum the distance over which the nib of the stylus 5 must travel between the clicked and unclicked states.

The particular structure of the resonant stylus 5 used in this embodiment which achieves these functions will now be described with reference to FIGS. 7 to 9.

FIG. 7a shows an exploded view of the components of the resonant stylus 5 used in this embodiment. As shown, the stylus 5 comprises a hollow front body portion 152 and a hollow rear body portion 154 which house: the resonant circuit 41 comprising the inductor coil 45 and the capacitor 43; a 2 mm diameter ferrite rod 153; a plastic sleeve 155 having an inner diameter of 2.1 mm and an outer diameter of 2.2 mm; a split washer 157; a nib 159; and a spring 163. The coil 45 is manufactured from self-bonding enamelled copper wire for low-cost by eliminating a coil former. The ends of the coil 45 are welded to the side of a surface mount capacitor 43 to form the resonant circuit 41. The plastic sleeve 155 having a thin wall section (of approximately 50 microns) made from spirally wound and bonded plastic sheet fits inside the coil 45 and acts as a bearing surface for the ferrite rod 153 and prevents the ferrite rod 153 from rubbing against the capacitor 43 during use. The plastic sleeve 155 has a much thinner cross-section than can be achieved with an injection-moulded component, thereby enabling higher resonator Q-factor and hence lower system power consumption.

In this embodiment, the pen is manufactured as follows. The plastic sleeve 155 is pressed into the coil 45 and glued in place. This assembly is then placed into a jig (not shown) where the capacitor 43 is offered up and held in position. The wire ends of the coil 45 are positioned either side of the capacitor 43 and are welded in place by a welding head (not shown). The nib 159 component is dropped into the front body portion 152, followed by the split washer 157 and the coil assembly. The ferrite rod 153 is then dropped into the plastic sleeve 155. The spring 163 is then dropped into the rear body portion 154 and the forward body portion 152 and the rear body portion 154 are connected together and glued in position.

During the step of glueing the rear body portion 154 to the front body portion, the front body portion 152 and the rear body portion 154 are forced tightly together so that the neck portion 166 forces the coil 45 against the split washer 157 and a first shoulder 167 of the front body portion 152. In this way, the coil 45 and the split washer 157 are fixed in position with respect to the stylus body, with, in this embodiment, the coil 45 being positioned towards a front face 153a of the ferrite rod 153. Further, as shown in. FIG. 7a, the neck portion 166 of the rear body portion 154 includes a slot for receiving the capacitor 43 when the front and rear body portions are pushed together. This avoids the need for long coil leads which would be required were the capacitor 43 to be mounted behind the spring 163, and avoids increased assembly complexity and cost.

FIG. 7b shows the assembled stylus 5 in cross-section. The nib 159 and the ferrite rod 153 are slidably mounted within the stylus body and spring-biased (by spring 163) towards the front end 161 of the front body portion 152. The movement of the ferrite rod 153 in this forward direction is, however, limited by the abutment of a front face 160a (shown in FIG. 7a) of an enlarged head 160 of the nib 159 with a second shoulder 168 (shown in FIG. 7b) of the front body portion 152. When pressure is applied to the nib 159 of the stylus 5 against the biasing force of the spring 163, the nib 159 and the ferrite rod 153 move towards the rear body portion 154 until a rear face 160b of the nib's head 160 abuts against the split washer 157. As shown in FIG. 7b, the ferrite rod 153 can, therefore, only move a predetermined distance ($d_0$), referred to hereinafter as the click-distance, when pressure is applied to the end of the nib 159. In this embodiment, the stylus 5 is designed so that the click distance ($d_0$) is 0.35 mm. This movement of the front face 153a of the ferrite rod 153 from the front face 45a of the coil 45 causes a decrease in the inductance of the coil 45 due to the reduced coupling between the ferrite rod 153 and the coil 45, which in turn gives rise to an increase in the resonant frequency of the resonant circuit 41.

FIGS. 8a and 8b are a partial cross-sectional views of the assembled stylus 5 showing in more detail the relative positions of the ferrite rod 153, the coil 45, the split washer 157 and the nib 159 in these "unclicked" and "clicked" states respectively, and illustrating magnetic field lines 180 passing from the end of the ferrite rod 153 around the coil 45. As shown, in the unclicked state, the ferrite rod 153 is close to the split washer 157, which in this embodiment, is made of Vitrovac 6018, which is a high magnetic permeability material. Therefore, a relatively strong local magnetic field is established with resonating current in the coil 45 as illustrated by the tightly spaced magnetic field lines 180a in FIG. 8a. The radial extent of the locally strong magnetic field 180 is approximately from the inner diameter of the split washer 157 to between the inner and outer radius of the coil 45. The reason for the locally strong. magnetic field 180a is that both the ferrite rod 153 and the washer 157 have high magnetic permeability, and the distance between the ferrite rod 153 and the split washer 157 is relatively small compared to the radial extent of the locally strong magnetic field. Consequently, magnetic field couples easily from the ferrite rod 153 into the split washer 157, rather than passing out through the side of the coil 45. In contrast and as shown in FIG. 8b, when the stylus 5 is in its clicked state, the distance between the ferrite rod 153 and the washer 157 is greater and therefore less of the magnetic field 180 couples into the split washer 157 but instead passes out through the side of the coil 45. Therefore, less of the magnetic field couples with all of the coil 45 and the overall inductance of the coil 45 is reduced.

FIG. 9 is a plot illustrating how the resonant frequency of the resonator 41 changes with the gap between the ferrite rod 153 and the end face 45a of the coil 45 with the split washer (plot 8-1) and without the split washer 157 (plot 8-2). As shown in plot 8-1, the stylus 5 with the split washer 157 provides approximately an 8% change in the resonant frequency of the resonator 41 between the unclicked and clicked states. In contrast, without the washer 157, a change in resonant frequency of about 3.5% is achieved. Therefore, the use of the split washer 157 allows a greater change in resonant frequency between the clicked and unclicked states for a given click distance. As discussed in the introduction of this application, this is important where a large frequency change between the clicked and unclicked states is desired together with a relatively small click distance (so that the stylus feels like a conventional pen).

As those skilled in the art will appreciate, a critical component of the manufacturing variability of the stylus 5 is the position of the ferrite rod 153 relative. to. the end face 45a of the coil 45 and the split washer 157. In the design of the stylus 5 described above, in the unclicked state, the position is set by only two plastic dimensions—the first is the distance between rear face 159a of the nib 159 and front face 160a of the nib's head 160; and the second is the distance between the first shoulder 167 and the second shoulder 168 of the front body portion 152. Since these distances are relatively small (a few millimetres) and close together, it is relatively straightforward to maintain tight control of these distances and therefore tight control of the unclicked frequency of the stylus 5. Similarly, in the clicked state, the position of the ferrite rod 153 relative to the end face 45a of the coil 45 and the split washer 157 is defined by the distance between rear face 159a of the nib 159 and rear face 160b of the nib's head 160. As a result of the small number of critical dimensions (three in this embodiment), the manufacturing cost of the stylus 5 is relatively low. Further, although the plastic parts controlling the relative position of the ferrite rod 153, the coil 45 and the split washer 157 are subject to thermal expansion, because these critical dimensions are relatively small and close together, the position changes little with temperature.

The thickness of the split washer 157 also has an effect on the relative position of the ferrite rod 153, the coil 45 and the washer 157, but that thickness is well controlled because the washer material may either be manufactured from a punched sheet of metal formed in a rolling process or by a suitable etching process. For example, a sheet of the material may be covered with a photoresist, preferably on both sides, and then the resist exposed to ultraviolet light through a mask patterned with the required shape. The sheet is then etched in chemical solution leaving the washers, usually held by a spike of metal to the original sheet. The washers are then cut from the sheet and assembled into styluses. An advantage of etching is that there is no mechanical stressing so that there is no loss in magnetic permeability that would otherwise reduce frequency shift and introduce variability.

Stylus Testing

In this embodiment, the resonant frequency of each stylus 5 is tested before the front body portion 152 is glued together with the rear body portion 154. This testing is performed by the testing apparatus 200 schematically illustrated in FIG. 10. As shown, the testing apparatus 200 includes a pulsed current source 201 which applies a pulse of excitation current to a coil 203 which is magnetically coupled to the coil 45 in the stylus 5 which causes the resonant circuit 41 to resonate. The current from the pulsed current source 201 is then stopped and the resonator 41 continues to resonate and this resonating signal induces an EMF in a second coil 205 wound around the stylus 5. This induced EMF is then passed to a signal detector, processor and display unit 207 which measures the frequency of the ring-down signal, for example by performing a Fourier analysis of the sampled waveform. The signal detector, processor and display unit 207 also controls a nib actuator 209 which applies pressure to the nib 159 forcing the stylus 5 into its clicked state. The same excitation and measurement process is then carried out to determine the resonant frequency of the stylus 5 in the clicked state. The signal detector, processor and display unit 207 then compares the unclicked resonant frequency and the clicked resonant frequency with predefined manufacturing. limits and the stylus assembly is rejected if the measured values fall outside those limits. If the measured frequencies are within the manufacturing limits, then the rear body portion 154 is glued to the front body portion 152. As those skilled in the art will appreciate, the advantage of testing the partially assembled stylus 5 is that if the measured clicked and unclicked resonant frequencies fall outside the manufacturing limits, then the failure is identified earlier in the manufacturing process and hence there is less wastage.

Manufacturing Limits

As discussed above, during the testing of each stylus 5 during manufacture, the clicked and unclicked resonant frequencies of the stylus 5 are compared with manufacturing. limits. In particular, in this embodiment, each stylus 5 is designed so that their clicked and unclicked resonant frequencies lie within a "free space clicked resonant frequency band" and a "free space unclicked resonant frequency band", respectively. These are shown in FIG. 11 as the unclicked band $B_2$ between frequency $f_1$ and $f_2$ and the clicked band $B_2$ between frequency $f_6$ and $f_7$. The system is designed, however, to be able to detect pen frequencies over a much larger frequency range (DR) extending from frequency $f_0$ to $f_8$. This allows for a margin of frequency increase and decrease of the free space clicked and unclicked resonant frequencies due to, for example, changes in temperature and due to the proximity of the stylus 5 to conductive or magnetically permeable objects. These margins are illustrated by the bands $M_1^d$ extending from frequency $f_0$ to $f_1$; margin $M_1^i$ extending from frequency $f_2$ to $f_3$; margin $M_2^d$ extending from frequency $f_5$ to $f_6$; and margin $M_2^i$ extending from frequency $f_7$ to $f_8$. An overall unclicked frequency band $B_1$ extending from frequency $f_0$ to frequency $f_3$ and a clicked frequency band $B_1$ extending from frequency $f_5$ to frequency $f_8$ are therefore defined. A frequency spacing is also provided (labelled PE and extending from frequency $f_3$ to $f_5$) to account for phase detection inaccuracy in the electronics which results in uncertainty for frequencies close to the threshold frequency ($f_4$) used to determine the click state of the stylus 5.

Digital Processing and Signal Generation Unit

A brief description was given above with reference to FIG. 3 of the digital processing and signal generation unit 59. A more detailed description of the digital processing and signal generation unit 59 used in this embodiment will now be described with reference to FIG. 12. The components shown in FIG. 3 have been labelled with the same reference numeral.

As shown in FIG. 12, the digital values output by the analogue-to-digital converter 73 are passed via the A to D interface 75 to a buffer 251. At the end of a pulse echo excitation/receive cycle, eight digital values will be stored in the buffer 251 representing the in-phase and quadrature phase signal levels generated for each of the four sensor windings. A control unit 253 is provided for reading out these digital values and for passing them to the appropriate processing modules for processing. In this embodiment, the control unit 253 initially passes the digital signal values to a signal level comparator 255 which compares the signal levels with a threshold value. If all of the signal levels are below the threshold level, then this indicates that the stylus 5 is not in the vicinity of the PDA 1 and therefore, no further processing is required. If, however, the signal level comparator 255 determines that the signal levels are above the threshold, then it indicates back to the control unit 253 that the stylus 5 is present and that the signals should be processed by the other processing modules. In response, the control unit 253 passes the in-phase signal components to a position processor 257 which calculates the above-described arc tangent functions using the in-phase components to determine the x-y position of the stylus 5 relative to the sensor board 13.

The control unit 253 also passes the in-phase and quadrature phase components to a stylus frequency determining unit 259 which, as discussed above, performs the above mentioned arc tangent function on the in-phase and quadrature phase components of the signals from the same sensor winding, to generate a measure of the electrical phase (ø) of the received signal. This electrical phase can then be mapped to a difference in frequency between the resonant frequency of the stylus 5 and the fundamental frequency $F_0$ of the excitation signal applied to the excitation winding 29. However, the relationship relating this phase measurement to the frequency difference is cyclic in nature and can therefore only provide a unique one-to-one relationship between the measured phase and the resonant frequency for a limited range of frequency differences. Further, this range of frequency differences depends, among other things, on the number of excitation cycles ($N_{TX}$) in the burst of excitation current applied to the excitation winding 29 and the number of receive cycles ($N_{RX}$) over which the demodulated signals are integrated.

In the illustration shown in FIG. 3b, sixteen excitation cycles and sixteen receive cycles were used. With this number of excitation cycles and receive cycles, the phase measurement can only provide an unambiguous indication of the resonant frequency of the stylus 5 if the resonant frequency is within 3.5% of the excitation frequency. This is illustrated in plot 300-1 shown in FIG. 13. In particular, FIG. 13 shows the measured electrical phase (ø) plotted on the y-axis against the ratio of the stylus 5 resonant frequency to the excitation frequency as a percentage. As shown, this plot 300-1 is linear only for the ratio between the stylus frequency and the excitation frequency varying (as a percentage) between 98.2 and 101.7. Outside this range, the plot 300-1 repeats in a non-linear and cyclic manner. The system can therefore only unambiguously determine the resonant frequency of the stylus 5 if it is within a range of 1.75% of the excitation frequency on either side of the excitation frequency. This is sufficient for the type of stylus described in the applicant's earlier International application WO 00/33244, but not for the stylus 5 described above which is designed so that the resonant frequency changes by approximately 8% between its clicked and unclicked states.

This problem can be overcome by reducing the number of transmission and reception cycles (i.e. $N_{TX}$ and $N_{RX}$) in the pulse echo measurement, which has the effect of increasing the unambiguous range of frequencies of the plot 300. This is illustrated in FIG. 13 by the plot 300-2. In particular, plot 300-2 illustrates the relationship between the measured electrical phase (ø) and the percentage of the stylus resonant frequency to the excitation frequency when $N_{TX}=N_{RX}=3$. As shown, with this arrangement the resonant frequency of the stylus 5 can be determined unambiguously provided it is between 91% and 108% of the excitation frequency. This corresponds to a range of approximately 17%, which is sufficient for the stylus 5 used in this embodiment.

However, with such a low number of transmission and reception cycles ($N_{TX}$ and $N_{RX}$) being used, the measurement accuracy is significantly reduced. In particular, all resonant stylus detection systems suffer from phase detection inaccuracies. This error has many sources but is typically due to uncontrolled variable time delays in the processing channel, such as the slew rate of the power amplifier 51 shown in FIG. 3a. In order to determine correctly the click state of the stylus 5, it is necessary that this processor phase error corresponds to a sufficiently small processor frequency error band (frequency band PE illustrated in FIG. 11). Unfortunately, when the number of transmission and reception cycles are reduced so that the system can detect the stylus 5 used in this embodiment over the entire frequency range (DR), the processor frequency error is greater than before and is typically greater than the processor frequency error band (PE) required.

A further problem with using a small number of transmission cycles and reception cycles is that more energy is spread over the entire frequency band of operation, which reduces the power efficiency of the device as a whole. The issue of low power efficiency is described in detail in the applicant's earlier International application WO 01/29759. As described in this earlier International application, such low power efficiency systems are undesirable in hand-held battery-powered devices such as the PDA 1 of the present embodiment.

In this embodiment, therefore, the conflicting requirements of unambiguous phase detection over a wide frequency range and a frequency accuracy high enough to accurately detect the click status of the stylus are resolved by introducing a two-stage measurement cycle.

In the first stage a pulse-echo excitation/reception cycle is performed with $N_{TX}$ and $N_{RX}$ set to 3, with the fundamental frequency $F_0$ of the excitation signal being in the middle of the required frequency range (i.e. approximately at the decision frequency $f_4$ shown in FIG. 11). This first stage measurement will provide an electrical phase measurement that is unambiguous over the required frequency range (DR). The position processor 257 and the stylus frequency determining unit 259 can therefore determine an approximate x-y position of the stylus 5 relative to the sensor board 13 and the approximate resonant frequency of the stylus 5, but subject to the frequency and phase errors discussed above.

As shown in FIG. 12, the stylus frequency determined by the stylus frequency determining unit 259 is output to a stylus state determining unit 261. If the determined stylus frequency is far enough from the decision frequency ($f_4$) then, with all errors accounted for, it is possible to determine the click state of the stylus 5. If the determined frequency is not far enough from the decision frequency ($f_4$), then the stylus state remains uncertain.

In this embodiment, immediately after the first stage measurement cycle has been carried out, a second more accurate measurement cycle is performed using a pulse-echo excitation/reception cycle with $N_{TX}=N_{RX}=16$ and with the fundamental frequency $F_0$ of the excitation signal being chosen to be close to the resonant frequency of the stylus 5 determined in the first measurement stage by the stylus frequency determining unit 259. This closeness between the excitation frequency and the stylus resonant frequency allows for the greater number of transmission cycles and reception cycles to be used, thereby allowing for more accurate position and phase measurements to be obtained and allowing for a more power efficient measurement cycle.

In particular, in this embodiment, the excitation and receive control unit 57 receives the approximate resonant frequency of the stylus 5 determined by the stylus frequency determining unit 259 from the signals of the first stage measurement cycle. It then outputs a control signal to the. variable frequency generator 53, setting the fundamental frequency ($F_0$) of the excitation and mixing signals to be generated. The excitation and receive control unit 57 also outputs appropriate gate control signals to the excitation gate controller 61 and the receive gate controller 67 so that, in the second stage measurement cycle, sixteen excitation periods are transmitted and so that the integration of the demodulated signals is performed over sixteen excitation periods (i.e. $N_{TX}=N_{RX}=16$). The data from this second more accurate measurement cycle is then passed to the position processor 257 and the stylus frequency determining unit 259 as before, where more accurate estimates of the x-y position of the stylus 5 relative to the sensor board 13 and the resonant frequency of the stylus 5 are determined. This more accurate measurement of the resonant frequency of the stylus 5 is then passed to the stylus state determining unit 261 which compares the measured frequency with the decision frequency $f_4$ to determine if the stylus 5 is in its clicked state or its unclicked state. This determination together with the accurate x-y position measurement is then passed to the PDA electronics via the interface 77.

The entire two-stage measurement process described above is then repeated so that the position of the stylus 5 relative to the sensor board 13 can be tracked.

As those skilled in the art will appreciate, the above processing provides a number of advantages. These include:

i) power consumption of the system may be reduced by cancelling the second stage measurement if the first stage measurement does not detect the presence of the stylus 5;

ii) the first measurement stage can be optimised to minimise power consumption since accurate detection of position and resonant frequency of the stylus 5 is performed in the second measurement stage;

iii) in the second measurement stage, the excitation frequency transmitted may be at one of a set fixed number of frequencies spread between $f_0$ and $f_8$ (usually the closest one to the resonant frequency of the stylus 5 determined from the first measurement stage), thereby simplifying the decision making process and making the system more deterministic;

iv) if the first measurement stage results in high signal amplitudes (e.g. because the stylus 5 is in close proximity to the sensor board 13), then the second measurement stage can be performed at a lower power level while still maintaining sufficient frequency and position accuracy and resolution, thereby saving power; and v) if the first measurement cycle results in low signal amplitudes then the processing electronics can increase the power or increase the sensitivity of the detection circuits for the second measurement cycle (this is an advantage over the prior art systems where power level and sensitivity settings are set for worst case conditions, resulting in power consumption that is higher than is actually required on average).

Alternative Digital Processing and Signal Generation

In the above embodiment, the resonant frequency of the stylus 5 was determined from the electrical phase ($\phi$) of the sensed signals. This is possible because the electrical phase of the sensed signals varies linearly (over a limited range) with the difference between the excitation frequency and the resonant frequency of the stylus 5. Therefore, since the excitation frequency is known to the processing electronics, measuring the electrical phase ($\phi$) of the sensed signals allows the estimation of the resonant frequency of the stylus 5. In the following description, the above method of calculating the resonant frequency of the stylus 5 will be referred to as the "phase method", since it relies on the calculation of the electrical phase ($\phi$).

In addition to being able to estimate the resonant frequency of the stylus 5 from the phase of the sensed signals, it is also possible to estimate the resonant frequency of the stylus 5 from the amplitude ($A_1$) of the sensed signals, since this also varies with the difference between the excitation frequency and the resonant frequency of the stylus 5. FIG. 14a is a plot illustrating how an in-phase component (I) and a quadrature phase component (Q) (output from the integrators 71) vary with the difference between the resonant frequency of the stylus 5 and the excitation frequency. FIG. 14a also includes a plot (labelled $A_e$) which represents how the amplitude of the sensed signals varies with the difference between the resonant frequency of the stylus 5 and the excitation frequency. As shown in FIG. 14a, the amplitude plot $A_e$ is a non-linear parabolic type plot which peaks when the stylus frequency matches that of the excitation frequency.

The shape of the amplitude plot $A_e$ also depends on the number of transmission and reception cycles (i.e. $N_{TX}$ and $N_{RX}$) in the excitation-detection sequence. The plots shown in FIG. 14a are for an excitation-detection sequence in which $N_{TX}=N_{RX}=8$. FIG. 14b plots the same signals as shown in FIG. 14a, except for an excitation-detection sequence in which $N_{TX}=N_{RX}=16$. As shown in FIG. 14b, with more transmission and reception cycles, greater signal levels are generated and the amplitude plot $A_e$ varies more significantly with the difference between the resonant frequency of the stylus 5 and the excitation frequency.

In this embodiment, the stylus frequency determining unit 259 calculates an estimate of the amplitude ($A_1$) from:

$$A_e = \sqrt{I^2 + Q^2} \qquad (9)$$

In this embodiment, in order to be able to relate the amplitude measure to the resonant frequency of the stylus 5, the digital processing and signal generation unit 59 performs two excitation-detection sequences at two different excitation frequencies and then compares the amplitude values determined for each excitation-detection sequence. In particular, in this embodiment, the digital processing and signal generation unit 59 performs a first excitation-detection sequence with the fundamental frequency of the excitation signal being at frequency $f_1$ (which in this embodiment is 100.5 kHz) and then performs a second excitation-detection sequence with the fundamental frequency of the excitation signal being at a frequency $f_2$ (which in this embodiment is 1.06 kHz). For both excitation-detection sequences $N_{TX} = N_{RX} = 10$. During or after the excitation-detection sequences, the stylus frequency determining unit 259 calculates an estimate of the amplitude for each of the two excitation-detection sequences.

FIG. 15 is a plot showing how the two amplitude estimates ($A_e(F_1)$ and $A_e(F_2)$) vary with the resonant frequency of the stylus 5. FIG. 15 also shows a plot of the following two functions:

$$g_1(A_e) = \ln\left[\frac{A_e(F_1)}{A_e(F_2)}\right] \qquad (10)$$

$$g_2(A_e) = a\tan\left[\sqrt{\frac{A_e(F_1)}{A_e(F_2)}}\right] \qquad (11)$$

As can be seen from FIG. 15, these two functions are approximately linear with the resonant frequency of the stylus 5 and either may therefore be used to derive an unambiguous estimate for the resonant frequency of the stylus 5 through an appropriate rescaling function, such as:

$$F_{RES} = m_1 \cdot g_1(A_e) + c_1 \qquad (12)$$

$$F_{RES} = m_2 \cdot g_2(A_e) + c_2 \qquad (13)$$

where $m_1$, $m_2$, $c_1$ and $c_2$ are system constants that are determined in advance from an appropriate calibration routine from the straight line that best matches the $g_1$ and $g_2$ plots shown in FIG. 15.

As those skilled in the art will appreciate, other functions may be used to derive an estimate of the resonant frequency of the stylus 5 from the two amplitude measures at the different input frequencies. The general property of these functions is that they are raciometric and that the two amplitude measures may be exchanged, given appropriate modifications to the offset and gain terms in the relevant rescaling equation.

In the following description, the above technique for estimating the resonant frequency of the stylus 5 will be referred to as the "amplitude method". One important advantage of the amplitude method is that it allows for the unambiguous estimation of the resonant frequency of the stylus 5 over a much broader range of frequency differences than using the phase method used in the first embodiment. In particular, as shown in FIG. 15, the two functions $g_1$ and $g_2$ are approximately linear for a resonant frequency of the stylus between 95 kHz and 111 kHz. With the phase method described above, this range of unambiguous detection can only be achieved by significantly reducing the number of transmission and reception cycles ($N_{TX}$ and $N_{RX}$) which, as discussed above, has implications for signal levels and power efficiency.

FIG. 16 is a block diagram illustrating in more detail the components of the stylus frequency determining unit 259 that would be used in an embodiment which used the above-described amplitude method to estimate the resonant frequency of the stylus 5. As shown, the stylus frequency determining unit 259 used in this embodiment includes a signal amplitude determining unit 401 which receives the in-phase and quadrature phase signal levels (I and Q) for each of the two excitation-detection sequences, and calculates an amplitude measure for each using equation (9) above. In this embodiment, the signal amplitude determining unit 401 receives the in-phase and quadrature phase signal levels from the first excitation-detection sequence and stores the resulting amplitude value. ($A_e(F_1)$) in a buffer 403 until it receives the in-phase and quadrature phase signal levels from the second excitation-detection sequence. Once the amplitude measure ($A_e(F_2)$) for the second excitation-detection sequence has been determined and stored in the buffer 403, the two amplitude measures are then passed to a logarithm determining unit 405 which performs the logarithm calculation given above in equation (10). The value output by the logarithm determining unit 405 is then passed to a transformation unit 407 which estimates the resonant frequency of the stylus 5 using the linear transformation defined in equation (12) above. The stylus frequency determining unit 259 then outputs the estimated frequency to the stylus state determining unit 261 as before.

In the above embodiment, amplitude measures from two excitation-detection sequences which use different excitation frequencies were used to estimate the resonant frequency of the stylus 5. In some cases, the use of two frequencies may not provide sufficient accuracy in the measurement. This problem may be overcome by using amplitude measures from more than two excitation-detection sequences (each with a different excitation frequency) and then by using the two amplitude measurements that yield the highest amplitudes or by using a combination of all of the measurements. For example, in the case of N excitation frequencies $F_1, F_2 \ldots FN_1$ with calculated amplitudes $A_e(F_1), A_e(F_2) \ldots A_e(F_n)$, the following function may be employed instead of the logarithmic or arc-tangent function defined in equations (10) and (11) above:

$$g_3(A_e) = \frac{\sum_{n=1}^{N} F_n \cdot A_e(F_n)}{\sum_{n=1}^{N} A_e(F_n)} \qquad (14)$$

Alternatively, in the case of three excitation-detection sequences being used each with a different excitation frequency, the following function may be employed which generates an estimate based on the assumption that the amplitude measures vary approximately in a parabolic manner with the resonant frequency of the stylus 5:

$$g_4(A_e) = \frac{A_e(F_1) - A_e(F_3)}{2(A_e(F_1) - 2A_e(F_2) + A_e(F_3))} \qquad (15)$$

Offset Errors

The processing electronics illustrated in FIG. 3a typically introduce an offset error into the signal levels applied to the analogue-to-digital converter 73. For example, the sin x in-phase and quadrature phase components may be represented as:

$$SXI = \sin\_x\_I = A_1 \sin\left[\frac{2\pi x}{L_x}\right]\cos\phi + SXI_{off} \quad (16)$$

$$SXQ = \sin\_x\_Q = A_1 \sin\left[\frac{2\pi x}{L_x}\right]\sin\phi + SXQ_{off} \quad (17)$$

Where $SXI_{off}$ and $SXQ_{off}$ are offsets which, in general, are a function of the particular mixer and integrator channel on a particular device, supply voltage, temperature and time. They may also depend on other factors specific to the circuit implementation, such as the integration time of the integrators. In some cases, these offsets may be sufficiently large to interfere with the estimation of the resonant frequency of the stylus 5. In this case, a calibration step could be employed in which these offsets are measured and then subtracted from the appropriate signal level.

One approach for measuring these offsets is to perform the excitation-detection sequence omitting the excitation, so that $A_1=0$ in equations (16) and (17) above to yield the offset values directly. A single measurement or a set of average measurements may not yield sufficient accuracy given that the offsets vary with temperature and supply voltage. Therefore, measurements would preferably be taken repeatedly, for example, before every normal excitation-detection sequence.

An alternative approach is to base each measurement on two excitation-detection sequences, having the same excitation frequency but with inverted excitation voltage so that the amplitude term $A_1$ is inverted. The offsets can then be removed by subtracting the respective measurements generated by the same channel from the two excitation-detection sequences. The resonant frequency of the stylus 5 can then be estimated using either the phase method or the amplitude method from the offset compensated in-phase and quadrature phase components.

As those skilled in the art will appreciate, the problem with the above offset compensation technique is that it doubles the number of excitation-detection sequences that are required and this may limit the number of times the digital processing and signal generation unit 59 can determine the position of the stylus 5, and hence the ability of the system to respond to the user moving the stylus 5 across the sensor board.

As an alternative to inverting the excitation signal, the mixing signals applied to the sensed signals may be inverted. However, inverting the mixing signals may not be preferred since the offset from each channel may be a function of the mixer waveform, such that an inverted waveform may yield a slightly different offset and hence imperfect cancellation of the offsets.

Alternatively, the offsets may be eliminated by combining the channel outputs from different excitation-detection sequences in which different excitation frequencies are used. FIG. 17a shows a plot $I(F_1)$ which shows how the output of one of the in-phase channels varies with the resonant frequency of the stylus 5 with an excitation frequency of 100.5 kHz. FIG. 17a also shows a second plot $I(F_2)$ showing how the same in-phase measurement from the same channel varies with the resonant frequency of the stylus 5 when an excitation frequency of 106 kHz is used. For illustration, approximately 50 units of offset ($I_{off}$) are included within these measurements. FIG. 17a also shows a plot $I(F_2-F_1)$ that it obtained by subtracting plot $I(F_1)$ from plot $I(F_2)$. As shown from this combined plot, the offset is cancelled while the signal remains. Further, in this illustration, the excitation frequencies have been chosen so that the plots $I(F_1)$ and $I(F_2)$ are approximately 180° out of phase with each other, so that their subtraction yields a larger wanted signal than either $I(F_1)$ or $I(F_2)$ alone. Whilst this is not necessary, it is preferred since it results in a measurement with good signal-to-noise.

FIG. 17b shows the corresponding plots for the corresponding quadrature phase channel measurements $Q(F_1)$, $Q(F_2)$ and the combined plot $Q(F_2-F_1)$ obtained from their subtraction. As shown, the offset from the quadrature phase channel is also cancelled, while maximising the wanted signal components, in a similar way as for the in-phase channel.

The resonant frequency of the stylus 5 may then be estimated from $I(F_2-F_1)$ and $Q(F_2-F_1)$ using the above-described phase method. This approach has the advantage of removing errors caused by offsets and the use of two excitation frequencies broadens the frequency range over which useful signal level is obtained.

A further excitation-detection sequence may be employed at a third excitation frequency yielding $I(F_3)$ and $Q(F_3)$. The measurements from the second and third excitation-detection sequence (or from the first and third excitation-detection sequence) may then be combined in the same way as the measurements from the first and second excitation-detection sequences to yield $I(F_3-F_2)$ and $Q(F_3-F_2)$. In this embodiment a third excitation frequency of 111.5 kHz is preferred as this results in in-phase and quadrature phase components that are approximately 180° out of phase with the corresponding components of the second excitation-detection sequence, thereby resulting in maximum wanted signal levels after the combination. The in-phase and quadrature phase measurements from the first and second excitation-detection sequences may then be combined to generate an amplitude measure $A_e(F_2-F_1)$ and similarly the in-phase and quadrature phase measurements from the second and third excitation-detection sequence may be combined to give an amplitude measure $Ae(F_3-F_2)$. The above-described amplitude method may then be used to estimate the resonant frequency of the stylus 5 using these two amplitude measures. For example by taking the logarithm of the ratio of these amplitude measures as follows:

$$g(F_3, F_2, F_1) = \ln\left[\frac{A_e(F_3-F_2)}{A_e(F_2-F_1)}\right] \quad (18)$$

and then by applying the resulting measure $g(F_3,F_2,F_1)$ through an appropriate transformation equation similar to equation (12) above.

The resulting frequency estimate is therefore based on only three excitation-detection sequences, unlike the approach outlined earlier which used excitation signal inversion that requires four excitation-detection sequences. This approach therefore takes less time to perform thereby allowing more position measurements to be made per second, and hence improving the system's ability to respond to movements of the stylus 5 relative to the sensor PCB 13. In addition, since excitation is performed at three different excitation frequencies, the excitation power is not concentrated at any particular frequency but at multiple excitation frequencies over the frequency band of interest. As a result, the power is more evenly distributed across the frequencies of interest, which is desirable since it minimises the power required to cover the frequency range of operation with sufficient energy to detect the stylus 5 with significant signal level.

FIG. 18 is a block diagram illustrating in more detail the components of the stylus frequency determining unit 259 that would be used in the above embodiment in which three excitation-detection sequences are used with different excitation frequencies, in which the offsets are removed and in which the frequency of the stylus 5 is determined using the above-described amplitude method. As shown, the in-phase and quadrature phase signal levels are initially stored in a buffer 409. Once the in-phase and quadrature phase components from the three excitation-detection sequences have been stored in the buffer 409, pairs of in-phase components and pairs of quadrature phase components are passed to an offset elimination unit 411 which calculates the following offset compensated in-phase and quadrature phase values:

$$I(F_2-F_1)=I(F_2)-I(F_1) \quad (19)$$

$$I(F_3-F_2)=I(F_3)-I(F_2) \quad (20)$$

$$Q(F_2-F_1)=Q(F_2)-Q(F_1) \quad (21)$$

$$Q(F_3-F_2)=Q(F_3)-Q(F_2) \quad (22)$$

These offset compensated in-phase and quadrature phase values are then passed to the signal amplitude determining unit 401 which calculates $A_e(F_2-F_1)$ and $A_e(F_3-F_2)$ as described above. These amplitude measures are then passed directly to the logarithm determining unit 405 which calculates the logarithm calculation defined in the equation (18) above. The logarithm value output by the logarithm determining unit 405 is then passed to the transformation unit 407' which uses an appropriate linear transformation to transform the logarithm value into a measure of the resonant frequency of the stylus 5. The linear transformation used will be similar to the one used in the transformation unit 407 shown in FIG. 16, except with different gain and offset parameters.

In the above embodiment, the signal measurements from three excitation-detection sequences were used to estimate the resonant frequency of the stylus 5. It is possible to extend this approach using more than three excitation-detection sequences with different excitation frequencies and to combine the amplitudes, for-example, using equation (14) above.

A problem with the embodiment described above is that the offsets may not remain constant across the different excitation frequencies, for example if they depend on integration time. In this case, the above approach may not result in ideal cancellation of the offsets. This could be overcome by weighting each of the in-phase and quadrature phase components depending on the integration time used for the different excitation-detection sequences. Alternatively, an additional fixed offset may be added to $I(F_2-F_1)$. In this case, the majority of the offset will be removed by the subtraction of $I(F_1)$ from $I(F_2)$ because the integration times are typically similar. The additional offset that is subtracted then removes any additional offset due to, for example, different integration times. Similar constant offsets may be subtracted from $I(F_3-F_2)$ and the corresponding quadrature phase components.

Combined Amplitude and Phase Method

Two general techniques (the phase method and the amplitude method) have been described above for estimating the resonant frequency of the stylus 5 from the in-phase and quadrature phase signals produced by the processing electronics. In general, for the same number of transmission and reception cycles (i.e. $N_{TX}$ and $N_{RX}$), the amplitude method can provide a coarse estimate of the resonant frequency of the stylus 5 over a relatively large range of frequencies and the phase method can provide a more accurate estimate but one which is ambiguous over the same frequency range. It is therefore possible to use the results of the amplitude method to resolve the ambiguity associated with the phase method.

EXAMPLE

Where three excitation-detection sequences are performed at three different excitation frequencies and the above offset compensation is performed, the pair of in-phase components $I(F_3-F_2)$ and $I(F_2-F_1)$ may be combined together and the pair of quadrature phase components $Q(F_3"F_2)$ and $Q(F_2-F_1)$ may be combined together as follows:

$$I(F_3,F_2,F_1)=I(F_3-F_2)-I(F_2-F_1) \quad (23)$$

$$Q(F_3,F_2,F_1)=Q(F_3-F_2)-Q(F_2-F_1) \quad (24)$$

A measure of the electrical phase ($\phi$) can then be determined (using the phase method) from these combined in-phase and quadrature phase measurements as follows:

$$\phi(F_3, F_2, F_1) = a\tan\left[\frac{Q(F_3, F_2, F_1)}{I(F_3, F_2, F_1)}\right] \quad (25)$$

FIG. 19a shows how these combined in-phase and quadrature phase measurements from the three excitation-detection sequences vary with the resonant frequency of the stylus 5. FIG. 19a also shows how the combined phase measurement ($\phi(F_3,F_2,F_1)$) varies with the resonator frequency. As shown by the sawtooth nature of this phase plot, the phase measurement is ambiguous over the frequency detection range of interest. This ambiguity can then be resolved using the combined amplitude measure $g(F_3,F_2,F_1)$ calculated above in equation (18), using the following calculation:

$$A\phi(F_3, F_2, F_1) = \quad (26)$$
$$\phi(F_3, F_2, F_1) + \pi \cdot \text{round}\left[\frac{m_3 \cdot g(F_3, F_2, F_1) - c_3 - \phi(F_3, F_2, F_1)}{\pi}\right]$$

where $m_3$ is a constant such that the rate of change of $g(F_3, F_2, F_1)$ multiplied by $m_3$ with the resonant frequency of the stylus 5 is nominally equal to the rate of change of $\phi(F_3,F_2,F_1)$ with the resonant frequency of the stylus 5; $c_3$ is a constant that is chosen so that the result of the rounding calculation nominally increments at the same resonator frequency as the phase measurement $\phi(F_3,F_2,F_1)$ wraps (i.e. changes from $-\pi/2$ to $\pi/2$). FIG. 19b is a plot illustrating the way in which both $\phi(F_3,F_2,F_1)$ and $g(F_3,F_2,F_1)$ vary with the resonant frequency of the stylus 5. The effect of the gain term $m_3$ and the offset term $c_3$ and the rounding calculation effectively resolves the ambiguity in the phase measurement $\phi(F_3,F_2,F_1)$.

It should be noted that in this embodiment, the phase measure $\phi(F_3,F_2,F_1)$ repeats every $\pi$ radians. This is because the coupling factor between the stylus 5 and each of the sensor windings can invert depending on the position of the stylus 5 relative to the sensor windings. This is because of the "figure of eight" arrangement of the sensor windings. In embodiments where the coupling factor between the stylus 5 and the sensor winding does not invert, the phase measure will repeat every $2\pi$ radians. Therefore, in such embodiments, the $\pi$ term in equation (26) should be replaced by $2\pi$.

The combined amplitude and phase measurement generated using equation (26) will vary linearly with the resonant frequency of the stylus 5 over the desired frequency range of interest. It may therefore be transformed into an estimate of the resonant frequency of the stylus 5 through an appropriate linear transformation like those defined in equations (12) and (13) above.

FIG. 20 is a block diagram illustrating in more detail the components of the stylus frequency determining unit 259 that would be used in the above embodiment in which the amplitude measure is used to resolve the phase ambiguity associated with the phase measure of the resonant frequency of the stylus 5. The same reference numerals have been given to components which are the same as those shown in FIG. 18 and these components will not be described again. As shown in FIG. 20, the offset compensated in phase and quadrature phase values are passed not only to the signal amplitude determining unit 401 but also to a signal combination unit 415 which calculates and stores in the buffer 417 the combined in-phase and quadrature phase values $I(F_3,F_2,F_1)$ and $Q(F_3,F_2,F_1)$ in accordance with equations (23) and (24) above. These combined in-phase and quadrature phase values are then passed to a phase determining unit 419 which calculates a measure of the electrical phase angle ($\phi(F_3,F_2,F_1)$) in accordance with equation (25) above.

As shown in FIG. 20, the phase measure ($\phi(F_3,F_2,F_1)$) determined by the phase determining unit 419 and the amplitude measure ($g(F_3,F_2,F_1)$) determined by the signal amplitude determining unit 405 are input to a phase ambiguity resolving unit 421 which calculates the above described combined amplitude and phase measurement ($A\phi(F_3,F_2,F_1)$) in accordance with equation (26) above. This combined amplitude and phase measurement is then output to a transformation unit 407″ which transforms the measurement into an estimate of the resonant frequency of the stylus 5 using an appropriate linear transformation like those defined in equations (12) and (13) above.

Multiple Sensor Windings

The amplitude method and the offset compensation techniques described above assume that there is a single in-phase and quadrature phase measurement for each excitation-detection sequence. This is possible where a single sensor coil is used which has a uniform coupling with the resonant stylus 5 over the measurement area of interest. However, with sensor windings like those used in the first embodiment described above or those described in U.S. Pat. No. 4,878,553, the resonant stylus 5 does not always couple with each sensor winding over the entire measurement area of interest. As discussed above in the first embodiment, this is because at certain x and y positions, the in-phase and quadrature phase components from some of the sensor windings will be approximately zero. However, for all x,y positions of interest, at least one of the pairs of in-phase and quadrature phase measurements from one of the sensor windings will have suitable signal levels to allow the calculation of the resonant frequency of the stylus 5. Therefore, the processing electronics 59 may be arranged to identify the sensor winding which outputs the largest in-phase and quadrature phase signal levels which it then uses in the above calculations. Alternatively, the in-phase and quadrature phase measurements from the x-direction sensor windings may be combined and/or the in-phase and quadrature phase measurements from the y-direction sensor windings may be combined, with the resonant frequency estimation and offset compensation being performed using the combined in-phase and quadrature phase measurements.

As those skilled in the art will appreciate, there are various ways in which these components may be combined. For example, if SXI and SXQ are the in-phase and quadrature phase measurements produced by the sin x sensor winding 33 and CXI and CXQ are the in-phase and quadrature phase measurements obtained from the cos x sensor winding 33, then for the purposes of carrying out the above described amplitude method, these in-phase and quadrature phase components may be combined to give an amplitude measure as follows:

$$SCXA_e = \sqrt{SXI^2 + SXQ^2 + CXI^2 + CXQ^2} \tag{27}$$

Further, as those skilled in the art will appreciate, other combinations may be used, such as by summing the moduli as follows:

$$SCXA_e' = |\sqrt{SXI^2 + SXQ^2}| + |\sqrt{CXI^2 + CXQ^2}| \tag{28}$$

Similar combinations may also be performed for the in-phase and quadrature phase components from the y-direction sensor windings 35 and 37. By calculating the above amplitude measures at different excitation frequencies, the. above-described amplitude method may then be used to estimate the resonant frequency of the stylus 5.

For the purposes of the above-described phase method, it is possible to determine the phase angle ($\phi$) from whichever of the sensor windings provides the most reliable measurements, for example by determining which has the greater signal strength. For example, for the x-direction sensor windings, the following measures may be determined:

$$MSX = \sqrt{SXI^2 + SXQ^2} \tag{29}$$

$$MCX = \sqrt{CXI^2 + CXQ^2}$$

However, these measures of signal strength require a relatively complicated calculation and may be replaced by the following without significant loss in accuracy, since the ratio of in-phase to quadrature phase signal strength in the two x-direction sensor windings are approximately equal:

$$MSX' = |SXI| + |SXQ| \tag{30}$$

$$MCX' = |CXI| + |CXQ|$$

The in-phase and quadrature phase measurements to be used in the phase method may then be determined from the following:

$$MXI = SXI \text{ if } MSX' \geq MCX' \text{ else } CXI \tag{31}$$

$$MXQ = SXQ \text{ if } MSX' \geq MCX' \text{ else } CXQ$$

As those skilled in the art will appreciate, whilst the above technique is relatively simple, information from some of the sensor windings is lost. This may be significant when MSX' and MCX' are approximately equal and may result in incorrect frequency estimation. As an alternative, instead of choosing the in-phase and quadrature phase measurements which have the largest signal strength, the in-phase and quadrature phase measurements from the sensor winding with the lower measure of signal strength may be included in the phase measurement by combining it with MXI and MXQ above. If the in-phase and quadrature phase components of the sensor winding with the lower measure of signal strength are defined as LXI and LXQ respectively, then these are defined as follows:

$$LXI = CXI \text{ if } MSX \geq MCX \text{ else } SXI \tag{32}$$

$$LXQ = CXQ \text{ if } MSX \geq MCX \text{ else } SXQ$$

In this embodiment, it is not appropriate to combine LXI with MXI and to combine LXQ with MXQ by adding them directly together, because of the "figure of eight" arrangement of the sensor windings which results in the coupling factor between the resonant stylus 5 and the sensor windings having opposite signs for some positions of interest. Therefore, this relative sign must be taken into account when combining the in-phase components together and when combining the quadrature phase components together. The combination can therefore be determined from:

$$XI = MXI + RSIGNSC.LXI \quad (33)$$

$$XQ = MXQ + RSIGNSC.LXQ$$

where RSIGNSC is the relative sign between the coupling factors between the sin x sensor winding 31 and the stylus 5 and the cos x sensor winding 33 and the stylus 5, which may be determined from:

$$RSIGNSC = \quad (34)$$
$$1 \text{ if } \frac{-\pi}{2} \le a\tan2(MXI, MXQ) - a\tan2(LXI, LXQ) < \frac{\pi}{2} \text{else} - 1$$

Alternatively, RSIGNSC may be calculated from:

$$RSIGNSC = SIGN[MXI \cdot LXI + MXQ \cdot LXQ] \quad (35)$$

or from $$RSIGNSC = 1 \text{ if}(|MXI| + |MXQ|) \ge (|MXI - LXI| + |MXQ - LXQ|) \text{ else} -1 \quad (36)$$

which should be faster to implement.

As those skilled in the art will appreciate, similar combinations may be performed for the in-phase and quadrature phase measurements obtained from the y-direction sensor windings 35 and 37. The above combination process may be performed on any set of in-phase and quadrature phase measurements from any two sensor windings. For example, the in-phase and quadrature phase measurements obtained from different excitation-detection sequences using different excitation frequencies may be combined in a similar manner to allow improved estimation of the phase and therefore of resonant frequency of the stylus 5. Further, the in-phase components from the x-direction sensor windings can be combined with the in-phase components from the y-direction sensor windings and similarly the quadrature phase components from the x-direction sensor windings can be combined with the quadrature phase components from the y-direction sensor windings.

The above combination procedure may also be used in embodiments which use many sensor windings, such as those used in U.S. Pat. No. 4,878,553. In such an embodiment, the sensor winding having the maximum signal strength can be determined and the signals from additional sensor windings near the sensor winding with the maximum signal strength would then be combined in the above manner.

Position Measurement

In the first embodiment described above, the position of the stylus 5 relative to the sensor PCB 13 was determined solely on the basis of the in-phase signal components from the sensor windings. Whilst this approach yields the most accurate results when the excitation frequency matches the resonant frequency of the stylus 5, this may not be the case. Therefore, instead of using only the in-phase components, the processing electronics 59 can be arranged to use the in-phase or the quadrature phase component, depending on which one has the largest signal level. Alternatively, the two components from the same sensor winding can be combined. This may be achieved, for example, by using the length of the corresponding (I,Q) vector defined by these components resolved at a phase angle PR, which can be selected for some optimum system performance. For example, the phase angle PR may be set equal to the electrical phase angle φ calculated above, which results in maximum signal strength. Alternatively, the phase angle PR may be set equal to the phase angle φ plus some constant, where the constant is chosen to minimise the effect of some known error source such as eddy currents flowing in the electrostatic screen 17 provided over the sensor PCB 13.

As an example, the following equation may be employed to determine the length of the vector $(I(F_3,F_2,F_1), Q(F_3,F_2,F_1))$ along a line at angle $A\phi(F_3,F_2,F_1)$ to the origin:

$$IQ(F_3,F_2,F_1) = I(F_3,F_2,F_1) \cdot \cos(A\phi(F_3,F_2,F_1)) + Q(F_3,F_2,F_1) \cdot \sin(A\phi(F_3,F_2,F_1)) \quad (37)$$

Other translations may be employed. For example, the phase angle PR may be selected from one of a possible number of angles, with the appropriate phase angle being chosen which is closest to the estimated electrical phase angle Aφ. The advantage of this approach is that it can simplify the calculation of equation (37) above, by choosing the different phase angles to be ones that are easy for a micro-controller to calculate with a limited instruction set and speed. For example, co-ordinate rotation by 0.896 radians can be achieved by substituting cos (0.896)=1.25 and sin (0.896)=1 in equation (37) above. In this case, multiplication by 1 is trivial and by 1.25 is relatively straightforward since it requires a shift by two bits in binary representation followed by one addition. As those skilled in the art will appreciate, whilst this approach simplifies the calculation, it results in an amplitude error. However, this amplitude error may be insignificant provided the same rotation process is applied to the signals from all of the sensor windings and the subsequent position calculations are ratiometric.

It should be noted that by resolving the (I,Q) vector at the angle Aφ in this way, IQ does not flip sign with frequency, unlike I and Q. It should also be noted that if Aφ were replaced by φ (the phase estimate based on phase alone and excluding amplitude), then IQ would flip sign due to the phase wrapping of φ at ±π/2 radians.

Once the in-phase and quadrature phase components from all of the sensor windings have been resolved in the above manner, the position of the stylus 5 relative to the sensor PCB 13 can be estimated from:

$$X = X_0 + X_1 \text{ a tan } 2(CXIQ(F_3,F_2,F_1), SXIQ(F_3,F_2,F_1)) \quad (38)$$

$$Y = Y_0 + Y_1 \text{ a tan } 2(CYIQ(F_3,F_2,F_1), SYIQ(F_3,F_2,F_1)) \quad (39)$$

where $X_o$, $Y_o$, $X_1$ and $Y_1$ are system constants. As those skilled in the art will appreciate, whilst the above position calculation approach has been described with respect to the in-phase and quadrature phase components obtained from three excitation-detection sequences, the above approach may also be used for any in-phase and quadrature phase components from the sensor windings.

Once the resonant frequency of the stylus 5 has been estimated using one of the above approaches, it is possible to perform an additional excitation-detection sequence with the excitation frequency equal to this frequency estimate, in order to improve the estimate of the resonant frequency of the stylus 5 and to improve the accuracy of the determined position of the stylus 5. In this second stage of the measurement process, the number of excitation and reception cycles (i.e. $N_{TX}$ and $N_{RX}$) may be chosen to yield high signal levels without the risk of errors caused by phase wrapping. If this second measurement stage yields a phase measurement PN, then the estimate of the resonant frequency of the stylus 5 may then be corrected as follows:

$$RFE = F_{EX} - GN \cdot PN + O_d \qquad (40)$$

where RFE is the final estimate of the resonant frequency of the stylus 5, $F_{ex}$ is the final excitation frequency, GN is the rate of change of the phase estimate PN with resonator frequency and $O_d$ is an offset to compensate for system phase and frequency offsets and errors.

Modified Phase Method

In the above embodiments the techniques described above for estimating the resonant frequency of the stylus 5 and for estimating the position of the stylus 5 relative to the sensor PCB 13 may fail if the resonant frequency of the stylus 5 changes significantly between two or more of the excitation-detection sequences. This may be acceptable providing false frequency and position data is not reported to the PDA electronics via the interface 77. Therefore, the position and frequency data is preferably passed to the control unit 253 which performs tests to verify that the data is correct. In the case of a two-stage measurement process such as the one used in the first embodiment, one possible test is to verify that position and frequency calculations for each stage are within a predetermined tolerance of each other. A reasonable tolerance will have to be provided since the position and frequency measurements obtained from the first stage will be relatively coarse and the resonator position may change during the measurement process.

A disadvantage of the two-stage measurement process outlined above is that several excitation-detection sequences are required. Further, the first stage is relatively wasteful of both time and power because most of the time the resonant frequency of the stylus 5 will not change between position samples especially at high sample rates of approximately 100 Hz (i.e. 100 position measurements per second). This problem may be overcome simply by omitting the first stage once the resonant frequency of the stylus 5 has been reliably estimated. The resonant frequency of the stylus 5 may still be updated each time using equation (40) above, enabling the system to track subsequent changes to the resonant frequency of the stylus 5.

However, if the resonant frequency of the stylus 5 changes very rapidly or if a low position sample frequency were required for power saving such that the time interval between samples allows significant frequency change, the phase could wrap, leading to frequency ambiguity as described earlier. This problem can be detected by observing the subsequent change in position indication or amplitude. However, a system based on these tests might not be sufficiently reliable. For example, if the stylus 5 approaches the sensor PCB 13 rapidly and position and frequency estimates are determined once at some distance unclicked then a second time clicked so that the frequency changes significantly, the increase in amplitude of the signals caused by the closer proximity of the stylus 5 to the sensor PCB 13 will be offset by the reduction in the amplitude due to the difference in frequency between the resonant frequency of the stylus 5 and the excitation frequency. Therefore, the estimated amplitude measure $A_e$ might not change significantly between the two measurements. Further, the phase ($\phi$) may have wrapped twice so that the phase and position remains the same between the two measurements. The system may therefore be unable to tell the difference between the position and frequency data from the two measurements.

This ambiguity can be resolved by arranging for the processing electronics 59 to have processing channels with two or more different rates of change of phase with frequency. For example, the mixers 69 and 71 could be repeated, with the second set driven by a second RX gate signal with a different duration. Each sensor winding would then be connected to four input channels, comprising I and Q at two different RX gate durations. The in-phase and quadrature phase components output from the channels with the first RX gate duration can be labelled IA and QA and the in-phase and quadrature phase components output from the channels driven by the RX gate with the second duration may be labelled IB and QB. FIG. 21a illustrates the way in which these four in-phase and quadrature phase components vary with the resonant frequency of the stylus 5 for the case where the number of excitation cycles (i.e. $N_{TX}$) is set at 16 and the number of receive cycles (i.e. $N_{RX}$) is set at 16 for the A channels and 24 for the B channels. FIG. 21b illustrates the calculated amplitudes ($A_e(A), A_e(B)$) and phases ($P_e(A), P_e(B)$) for the A and B channel pairs. FIG. 21b also illustrates the phase difference measurement $P_e(B-A)$ which is defined as follows:

$$P_e(B-A) = P_e(B) - P_e(A) + \pi \left[ \left( 1 \text{ If } \{P_e(B) - P_e(A)\} < \frac{-\pi}{2} \text{ else } 0 \right) - \left( 1 \text{ If } \{P_e(B) - P_e(A)\} \geq \frac{\pi}{2} \text{ else } 0 \right) \right] \qquad (41)$$

As shown in FIG. 21b, $P_e(B-A)$ is unambiguous over a much greater frequency range than either $P_e(A)$ or $P_e(B)$. The resonant frequency of the stylus 5 can then be estimated from the value of $P_e(B-A)$ and an appropriate linear transformation function. However, the frequency estimate based on $P_e(B-A)$ is relatively inaccurate. The accuracy may be improved by combining $P_e(B-A)$ with $P_e(B)$ or $P_e(A)$, or some function of the two, whichever yields the best accuracy. That combination may be performed in a similar way to the way in which $\phi(F_3,F_2,F_1)$ was combined with $g(F_3,F_2,F_1)$ using equation (26) above.

This approach may therefore yield an estimate for the resonant frequency of the stylus 5 for resonator frequencies substantially beyond the wrapping points of $P_e(A)$ or $P_e(B)$ individually. If the frequency difference between the excitation frequency and the resonant frequency of the stylus 5 is sufficient, $P_e(B-A)$ may wrap and there will be an ambiguity. However, at this point the amplitude will be very substantially lower than before, and the signal level comparator 255 will be able to detect that the data is inconsistent between the two measurements. In this case, the original two-stage measurement process may be used the next time a position and frequency estimate is to be determined.

As those skilled in the art will appreciate, one of the disadvantages with the embodiment just described is that it doubles the number of electronics detection channels and is therefore costly and power-hungry. However, the sensor windings used in the first embodiment described above include two sensor windings for measuring in the X-direction (SX and CX) and two for the Y-direction (SY and CY). The signals from the SX and CX sensor windings may be sufficient to determine phase with the stylus 5 at any point of interest over the sensor board. This is also true for the signals from the SY and CY sensor windings. It is therefore possible to drive the X and Y sensor winding channels with an RX gate signal of different duration and to determine $P_e(A)$ from the X-direction sensor windings and $P_e(B)$ from the Y-direction sensor windings. In this way, the number of electronic processing channels is minimised.

FIG. 22 is a schematic functional block diagram illustrating the excitation and processing electronics used in such an embodiment. As shown, the digital processing and signal generation unit 59 includes two RX gate controllers 67-1 and 67-2 which generate two different RX gate signals of different.durations which are applied to the switches 63 and 65. In particular, the RX gate signal from the first RX gate controller 67-1 is applied to switches 63-1 and 65-1. Switch 63-1 controls the time over which the in-phase mixing signal is applied to the mixers 69-1 and 69-3 for mixing with the signals induced in the X-direction sensor windings 31 and 33. Switch 65-1 controls the time over which the quadrature phase mixing signal is applied to mixers 69-2 and 69-4 for mixing with the signals induced in the X-direction sensor windings 31 and 33. Similarly, the RX gate signal generated by the second RX gate controller 67-2 is applied to switches 63-2 and 65-2. As shown in FIG. 22, these switches control the time over which the in-phase and quadrature phase mixing signals generated by the frequency generator 53 are applied to the signals induced in the Y-direction sensor windings 35 and 37 via the appropriate mixers 69-5 to 69-8. The in-phase and quadrature phase components generated by the integrators 71 are then passed to the digital processing and signal generation.unit 59, via the A to D converter 73, which then determines the resonant frequency of the stylus 5 and the position of the stylus 5 relative to the sensor board in the manner described above.

In the above embodiment, in-phase and quadrature phase signals from channels having different rates of change of phase with resonant frequency of the stylus 5 were used to estimate the resonant frequency and position of the stylus 5. The channels were arranged to have different rates of change of phase with resonant frequency by using RX gate signals with different duration for the different channels. A similar result may be achieved other than by varying the RX gate signals. For example, the time between the end of the excitation cycles and the beginning of the RX gate signal may be modified or the gain of the respective channels may be modulated differently as a function of time during the integration process. Another option is to employ two sets of mixer signals for the two sets of channels, where each set is at a different frequency. The approximate resonant frequency of the stylus 5 may then be calculated from the relative amplitude of signals from each set of channels, and this information may be combined with phase information from one or both sets to determine resonator frequency more accurately and without phase wrapping.

Multi-Mode Operation

In some applications, such as the handheld PDA application described in the first embodiment, a standby state is required which consumes minimum power and which is used only to detect the presence of the resonant stylus 5 and to "wake up" the PDA electronics from the standby state when an approaching stylus 5 is detected. The stylus detection strategies described above are optimised for accurate position and frequency detection, but generally require more than one excitation-detection sequence and are therefore relatively power-hungry. As an alternative, during this standby state, a single excitation-detection sequence may be employed with sufficiently broad frequency range to detect any resonant stylus 5 of interest. The effects of offset may be limited by comparing successive measurements, rather than observing when some combination of a current measurement exceeds a predetermined threshold. If the system detects a significant difference between the current data and historical data, for example the immediately previous data, a flag may be set to indicate that the stylus 5 has appeared. As those skilled in the art will appreciate, this approach does not yield an accurate estimate of the resonant frequency of the stylus 5 or an accurate estimate of its position, but it is sufficient to wake up the host system (i.e. the PDA electronics) and initiate an alternative stylus sensing mode.

In the preferred embodiment, the system operates in one of three modes:
i) standby mode—in which single excitation detection sequences are carried out twice a second until a significant change in signal levels is observed.
ii) stylus frequency acquisition mode—which is entered when a significant change in signal levels is observed and in which the three frequency excitation-detection process (described above with reference to FIGS. 19 and 20) is employed to determine the resonant frequency of the stylus 5 and its current position. During this acquisition mode, this three frequency excitation-detection process is repeated at a rate of 5 times per second if the signals induced in the sensor windings by the stylus 5 are below some first threshold level. If the signal levels induced in the sensor windings fall below some second threshold level which is lower than the first threshold level, then the system reverts back to the standby mode.
iii) a tracking mode—which is entered if the signals induced in the sensor windings by the stylus 5 are above a third threshold which is greater than the first threshold and in which the above-described modified phase method (described with reference to FIG. 21) is used to determine the resonant frequency and position of the stylus 5. In this embodiment, this tracking mode of operation is carried out 100 times per second until either the level of the signals induced in the sensor windings by the stylus 5 falls below some fourth threshold level (between the first and third threshold levels) or the system loses track of the resonant frequency of the stylus 5 (for example due to rapid change in frequency). In this case, the system reverts back to the acquisition mode discussed above.

FIG. 23 is a block diagram illustrating in more detail the components of the stylus frequency determining unit 259 that would be used in this preferred embodiment in which the system operates in one of the above three modes. In the first mode, the control unit 253 controls the excitation and receive control unit 57 to perform a single excitation-detection sequence twice a second until the signal level comparator 255 detects a significant change in the signal level. At this stage, the control unit 253 controls the excitation and receive control unit 57 to perform the three sequence excitation-detection process in accordance with the stylus frequency acquisition mode discussed above. The in-phase and quadrature phase signal measurements received from the buffer 251 are then passed by the control unit 253 to the stylus frequency determining unit 259 shown in more detail in FIG. 23. Initially, these in-phase and quadrature phase values are passed via the switch 408 to the buffer 409 where the in-phase and quadrature phase values from the three excitation-detection sequences are stored. The subsequent processing performed on these in-phase and quadrature measurements are the same as those described with reference to FIG. 20 and will not be described again.

When the control unit 253 determines that the tracking mode is to be entered, it sends an appropriate control signal to the stylus frequency determining unit 259 in order to change the position of the switch 408 so that the in-phase and quadrature phase measurements obtained from the x-direction sensor windings are passed to the x-direction I and Q combination unit 421 and the in-phase and quadrature phase measurements from the y-direction sensor windings are passed to the y-direction I and Q combination unit 423. The x-direction combination unit 421 is where the in-phase measurements from the two x-direction sensor windings are combined to give a single combined in-phase measurement and where the two quadrature phase measurements from the two x-direction sensor windings are combined to give a single quadrature phase measurement. In this embodiment, these combined in-phase and quadrature phase measurements are obtained in accordance with equation (33) above. The y-direction in-phase and quadrature phase combination unit 423 performs a similar combination on the in-phase and quadrature phase measurements obtained from the two y-direction sensor windings.

As shown in FIG. 23, the combined in-phase and quadrature phase values are then passed to a second phase determining unit 425 which calculates a value ($P_e(A)$) for the electrical phase angle ($\phi$) using an inverse arc tangent function. A similar inverse arc tangent function is performed by the third phase determining unit 427 on the combined in-phase and quadrature phase measurements obtained from the y-direction combination unit 423, to provide a second value ($P_e(B)$) for the electrical phase angle ($\phi$). The two measurements of the electrical phase angle ($\phi$) are then passed to a first phase combination unit 429 which calculates $P_e(B-A)$ defined in equation (41) above, which is then output to a second phase combination unit 431 where it is combined with the original phase estimate determined by the third phase determining unit 427. In this embodiment, this combination is performed in accordance with the calculations defined by equation (26), except using $P_e(B-A)$ in place of $g(F_3,F_2,F_1)$ and $P_e(B)$ in place of $\phi(F_3,F_2,F_1)$. This corrected phase value is then passed to a second transformation unit 407''' where the phase estimate is converted into an estimate of the resonant frequency of the stylus 5 through an appropriate linear transformation.

In some applications, such as the handheld PDA application described above in the first embodiment, the PDA electronics may only require position data when the stylus is in the clicked state. If the frequency estimate generated by the acquisition mode is within a first set of frequency limits, determined to test for the unclicked state and including an allowance for possible frequency error of the electronics, it is not necessary to waste power by proceeding to the tracking mode in order to refine the frequency and position estimate, since it is already clear that the stylus 5 is in the unclicked state. However, if it can not be determined that the stylus 5 is unclicked then the system would enter the tracking mode to determine more accurately whether or not the stylus 5 is clicked.

Further, information generated by one excitation-detection process may be used to improve the performance of the following excitation-detection process. For example, a measurement of signal level from a current excitation-detection sequence may be used to optimise the sensitivity for the next excitation-detection sequence. That optimisation may take the form of a modification to the excitation power level, integrator gain and the number of excitation and receive cycles (i.e. $N_{TX}$ and $N_{RX}$), so that the ratios of signal to noise and signal to errors are maintained at an acceptable level. For example, if the amplitude detected by a current excitation-detection sequence were below a certain threshold, the next excitation-detection sequence could be performed with an increased power level.

Further Modifications and Alternative Embodiments

In the above embodiment, a hand-held personal digital assistant has been described which includes an x-y digitising tablet which operates with a resonant stylus. Various novel features of the digitiser windings, the stylus and the processing electronics have been described which make the system suited for such low cost high volume applications. The skilled reader will appreciate that many of the novel aspects of the system described are independent of each other. For example, the stylus described above can operate with the prior art digitiser windings described in U.S. Pat. No. 4,878,553 or WO98/58237 and the digitiser windings described above can operate with the prior art stylus, such as those described in U.S. Pat. No. 5,565,632, or with any other prior art magnetic field generating or altering device.

In all of the embodiments described above, an excitation operation was performed followed by a detection operation. As those skilled in the art will appreciate, it is not essential for the detection process to be performed after the excitation process. For example, the detection process may begin before the excitation process has ended, although this is not preferred due to potential coupling between the excitation winding and the sensor windings, which may induce significant errors in the measurements.

In the above embodiments, the signals induced in each sensor winding were mixed with phase quadrature mixing signals. As those skilled in the art will appreciate, the signal induced in each sensor winding may be mixed with more than two mixing signals with different mixing phases. In such an embodiment, the resonant frequency of the stylus can still be estimated using the above-described amplitude method by determining, for example, the square-root of the sum of the squared signal levels from each phase, to replace the sum of the squares of the I and Q data. Similarly, the calculation of phase could be performed by resolving the appropriate signals into two orthogonal phases, followed by an inverse tangent in the normal way. An example of this approach is described in WO 99/18653.

In the above embodiments, the signals induced in the sensor windings were passed through respective processing channels comprising a mixer and an integrator. As those skilled in the art will appreciate, the mixing and integration process may be performed in the digital electronics, with the raw sensor signals being fed directly into the analogue-to-digital converter. However, such an embodiment requires more complex digital electronics.

In the above embodiments, digital electronics were provided for processing the signals generated in the sensor windings by the resonant stylus. This processing electronics may be formed from separate electronic components or as a single integrated circuit. The processing electronics is preferably programmable by the host electronics so that the equations and equation coefficients used to manipulate the input signal levels can be modified if desired. Preferably, the processing electronics can use any of the above described techniques for estimating the resonant frequency of the resonant stylus, with the technique to be used currently being programmed or controlled by the host electronics.

In the preferred embodiment, the processing electronics is also programmed with tilt correction data for correcting the determined x-y position measurements for the effects of stylus tilt. In particular, it is known that in x-y digitising systems that use an electromagnetic stylus, errors occur in the determined position measurement if the user holds the stylus at an angle to the digitising tablet. Various approaches have been proposed for overcoming this problem. In the preferred embodiment, a set of tilt correction errors are stored within the processing electronics and are used to correct the determined position measurement. In particular, in the preferred embodiment, tilt correction data (measured in advance for different positions across the measurement area) is stored within the processing electronics. The determined x-y position is then used to address this tilt correction data to identify the correction to be applied. The appropriate correction is then applied to the position measurement and then the corrected measurement is passed to the host electronics.

In a preferred embodiment, separate sets of tilt correction data are stored outside of the processing electronics, with each set being associated with a different angle and orientation (e.g. left handed user or a right handed user) of tilt, with the set of correction values most appropriate to the current user being downloaded and stored in the digitising electronics. The different sets of tilt correction data may be stored within the host or within some external computer and downloaded when required.

In the above embodiment, the resonant frequency of the stylus was estimated and then used to determine whether or not the stylus was clicked or unclicked. In a more sophisticated embodiment, where the stylus is designed so that its resonant frequency smoothly varies with pressure applied to the tip, the above system may be adapted to output a number representing the resonator frequency and therefore indicative of the pressure applied to the tip. This information may be used, for example, to control the thickness of lines drawn on a display.

Additionally, the stylus may be designed so that its resonant frequency changes with more than just pressure applied to the tip. For example, one or more switches may be provided on the side of the stylus which may be actuated by a user in order to change the resonant frequency of the stylus. In this case, as long as the digital processing and signal generation unit knows how the resonant frequency of the stylus will change, the status of the stylus can be determined and reported to the appropriate host system (e.g. the PDA electronics).

Alternatively still, the stylus may include two resonators having different resonant frequencies, with one resonator being provided at a writing end of the stylus and one at an erasing end of the stylus. The digital processing and signal generation unit can then determine the frequency of the resonator in proximity with the sensor PCB and therefore whether the user requires a writing or an erasing action, depending on the resonant frequency that is detected.

In the alternatives described above which combined the amplitude and phase method to determine the resonant frequency of the stylus, a single in-phase measurement was obtained using equation (23) and a single quadrature phase measurement was obtained using equation (24). An inverse arc tangent function was then performed on these two in-phase and quadrature phase measurements in accordance with equation (25). In an alternative embodiment, a measure of the electrical phase ($\phi$) can be determined for $I(F_3-F_2)$ and $Q(F_3-F_2)$ and for $I(F_2-F_1)$ and $Q(F_2-F_1)$, with the two phase measures then being combined to provide a single phase estimate. However, as those skilled in the art will appreciate, this alternative approach requires the calculation of two inverse tangent functions.

The offset compensation techniques described above with reference to FIG. 17 are for fixed excitation and detection phases which do not change across the different excitation frequencies. However, it is possible to vary the phase of either the excitation or the mixing signals or both for each excitation-detection process. In this case, the difference between excitation frequencies is preferably modified so that the offset cancellation calculations also yield maximum signal level. The frequency difference for optimum signal level may be increased, by suitable choice of excitation and/or mixing signal phase. This approach may therefore be used to extend the range of excitation frequencies, thereby extending the range of possible resonator frequencies which can be detected.

The resonator frequency detection techniques described above are appropriate for applications other than stylus sensing. For example, the system could be used in conjunction with the sensor and resonator designs described in WO 99/18653 for determining the position and speed of the rotor of an electric motor. If the resonator described in this earlier International application is designed so that its resonant frequency varies with some external parameter which is to be measured, and the most convenient mounting point for an appropriate transducer is the moving rotor, then the resonator frequency detection techniques described above could be used to determine the value of the parameter of interest, without the need for slip rings for connection to the transducer. For example, a transducer could be constructed including an inductance or capacitance that depended on rotor torque. In combination with a suitable resonating capacitance and/or inductance and a resonator coil arrangement suitable for position sensing, the above techniques for determining the resonant frequency of the resonator may be used to report both position and motor torque to the motor controller. This approach can therefore yield improvements to product cost by minimising components such as slip rings and by centralising the electronic processing and signalling into a single controller device.

In the above embodiment, the resonant frequency of the stylus was varied by varying the inductance of the resonant circuit. As those skilled in the art will appreciate, other techniques may be used to vary the resonant frequency of the stylus. For example, the capacitance and/or the resistance of the resonant circuit may be varied either through pressure applied to the tip of the stylus or through the activation of one or more switches on the stylus.

In the main embodiment described above, various novel features of the sensor windings were described. As those skilled in the art will appreciate, some of the novel features of the sensor windings may be applied to other types of sensor windings. For example, the provision of the inwardly extending bulges or flared portions at the corners of the sensor windings may be used with sensor windings having straight parallel transverse conductors, such as those described in WO 98/58237 or WO 00/33244. Similarly, the additional loops provided at the periphery of the sensor windings for increasing the sensitivity of the sensor windings at their edges, can be applied to other types of sensor winding design, such as those described in the above mentioned earlier PCT applications.

In the above embodiment, a magnetic washer was provided to increase the change in the resonant frequency of the stylus between its clicked and unclicked states. As those skilled in the art will appreciate, it is not essential to use such a magnetic washer. Further, if a magnetic washer is to be used, it is not essential that the washer is split. However, using a split washer prevents eddy currents being generated in the washer which would generate their own magnetic field which would oppose the magnetic field generated by the resonant circuit. Further, if a washer is to be used, it does not need to be formed as a flat ring with circular inner and outer edges. For example, the washer may be star-shaped, with a star-shaped or square etc. central hole. Further, the washer need not necessarily have a smaller inside diameter than the ferrite rod. FIG. 14 illustrates an alternative embodiment where the ferrite rod 153 may pass through the magnetic washer 157 in operation. In particular, FIG. 14a illustrates the alternative stylus design in the unclicked state, with the ferrite rod 153 extending through the inner diameter of the split washer 157. As pressure is applied to the nib 159 of the stylus, the ferrite rod 153 passes through the washer 157 thereby increasing the gap between the ferrite rod 153 and the split washer 157.

In the main embodiment described above, the unclicked position of the ferrite rod relative to the coil and the split washer was defined by the distance between the rear face 159a of the nib 159 and the front face 160a of the nib's head 160; and the distance between the first shoulder 167 and the second shoulder 168 of the front body portion 152. Alternatively, the unclicked position may be defined by the thickness of a non-conductive, non-magnetic spacer. Such an embodiment is illustrated in FIG. 15 which shows the spacer 303 provided between the ferrite rod 153 and the washer 157. The thickness of the spacer 303 can be tightly toleranced compared to dimensions of injection-moulded parts. In this case, plastic tolerances ensure that the rear face 159a of the nib 159 does not touch the spacer 303 in the unclicked state. In the clicked state, shown in FIG. 15b, the ferrite rod 153 position relative to the coil 45 and washer 157 is defined by only one dimension, the distance between the rear face 159a of the nib and the rear face 160b of the nib head 160. That dimension can be tightly controlled since the same side of an injection mould tool can define both faces. In a further alternative, the spacer 303 can be omitted, but low unclicked resonator Q-factor may result due to eddy currents in the split washer since the ferrite rod 153 will rest on the split washer 157.

The split washer may be manufactured from Permalloy for low cost and ease of handling, or from any other magnetically permeable metals such as Mumetal or spin-melt ribbon. A non-conductive magnetically permeable device, for example a ferrite component, may replace the metal washer. In this case, there is no need for a split in the washer and the ferrite and washer may contact each other without Q-factor penalty. The ferrite component may be thicker than the washer since it is easier to manufacture and handle that way. There will be an increase in the frequency shift between the clicked and unclicked frequencies in this case, due to the low resistance to magnetic field passing through the washer component. However, a disadvantage of a ferrite washer component is that the tolerance on its thickness may be significantly greater than that of a thin metal washer.

In the above embodiment, the resonant frequency of each stylus was tested for both the clicked and unclicked states at the time of manufacture, to ensure that the resonant frequencies were within the manufacturing tolerances. If they were not, then the stylus was discarded. Alternatively, if the clicked or unclicked resonant frequency do not meet the required manufacturing limits, then the manufacturing step may include the additional step of varying the stylus set-up in order to change the clicked resonant frequency and/or the unclicked resonant frequency. This may be achieved in a number of different ways.

FIG. 16 schematically illustrates a mechanical approach to varying the clicked and unclicked resonant frequencies of the stylus at the time of manufacture. In this case, the resonant frequency is adjusted with a small adjustment in the relative axial position of the ferrite rod 153 and the nib 159. This adjustment is achieved with a pin 301 sliding in a recess 302 in the nib 159. The pin 301 or recess 302 or both may be splined to prevent the pin insertion creating stored pressure that subsequently shifts the position of the pin 301. Glue is preferably applied to the pin 301 or recess 302 before assembly. When the ferrite rod 153 has been dropped into position or is forced downwards to press the pin 301 into the nib 159 until a frequency measurement system, such as the one illustrated in FIG. 10, indicates the optimum frequency has been reached. This adjustment step may be performed with the nib 159 in any chosen position with an appropriate frequency target, such as the desired clicked or unclicked resonant frequency.

A similar approach is to perform an initial test of the resonant frequency of the stylus with a pin 301 of known length, then to remove this pin 301 and ferrite rod 153 and to reassemble it with an alternative pin 301 whose length is determined by the results of the initial test. An alternative to this approach is illustrated in FIG. 17, where a spacer 303 is added between the nib 159 and the ferrite rod 153, with the thickness of the spacer being determined from the initial test. The initial test may be performed with a stylus with no spacer, or possibly a reference spacer. In both these situations, the algorithm for choosing a spacer or pin component may be performed automatically by the signal detector, processor and display unit of the test apparatus.

As a further alternative to removing the ferrite rod 153 in order to remove a pin 301 to adjust frequency, the height of the rear end face 159a of the nib 159 relative to rear face 160b of the nib head 160 can be reduced by spinning the ferrite rod 153 at high speed and pressing it against the nib 159 until the friction has softened the nib 159 and the ferrite rod 153 has reached the required position.

Another alternative is to assemble the stylus 5 with the coil 45 free to slide, requiring a modification to the design of the rear body portion 154 so that it no longer locates the coil 45 against the front body shoulder 167. Initially, the coil 45 would be against the front body shoulder 167. The resonant frequency of the stylus would then be tested with an appropriate test apparatus. The nib 159 would then be forced upward and released and the unclicked frequency measured. While the unclicked frequency is above the desired resonant frequency, this process would be repeated, each time increasing the distance between the coil 45 and the front body head 160. In this way, the unclicked frequency is set to the target value. The coil 45 may then be glued in position, for example, by injecting glue through a small hole in the side of the stylus body. Or, if glue were previously applied to the coil 45, the cure time of the glue may be chosen such that movement during adjustment as described above is possible but further movement after adjustment is prevented.

As those skilled in the art will appreciate, it is also possible to vary the resonant frequency of the resonator 41 by changing the length of the ferrite rod 153. For example, when the front body sub-assembly is tested using the test apparatus, the top of the ferrite rod 153 may be ground shorter until the resonant frequency reaches the desired target value. Alternatively, as illustrated in FIG. 18, an additional length of ferrite 305 may be added to the assembly, to increase the effective length of the ferrite rod 153. Again, the length of this additional ferrite component 305 would be chosen depending on the results of an initial test of the resonant frequency. As shown in FIG. 18, in this case, the plastic sleeve 155 preferably acts to retain the additional ferrite component 305.

As an alternative to mechanical trimming, the value of the capacitor 43 may be modified, for example by laser trimming. Another option is to vary the number of turns in the coil 45. For example, turns may be added or removed from the coil 45 with the stylus in a test apparatus such as that shown in FIG. 10. The coil ends would be left long so that it is possible to wind further turns over the plastic sleeve 155. The operator would add or subtract turns until the resonant frequency of the stylus reached the required target frequency band.

As a further alternative, the coil 45 may be manufactured with a variable number of turns in order to compensate for the variability in other components such as the capacitor 43. For example, FIG. 19 illustrates a plot 325 which shows that the resonant frequency of the resonator 41 varies by +/−2.5% in response to a variation in the capacitor value of +/−5%. Therefore, if the number of coil turns is matched to the capacitor value, by first measuring the capacitor value and then matching it with a coil with an appropriate number of turns, the frequency variability can be reduced dramatically. For example, the number of coil turns may be specified from plot 321 illustrated in FIG. 20 and results in +/−0.15% frequency variability, as illustrated in plot 327 shown in FIG. 19. As those skilled in the art will appreciate, an automated machine may perform this selection process. A station of the machine would measure the capacitor's value and would send a signal to a coil winding station specifying how many turns to wind. On completion of the winding, the capacitor 43 would then be welded to the coil 45.

In the main embodiment described above, the rear body portion 154 maintains the coil 45 in position. As an alternative, the coil 45 may be fixed in place before the rear body portion 154 is fixed in position. For example, glue may be applied between the plastic sleeve 155 and the front body portion 152. In this case, the plastic sleeve 155 acts to prevent glue from flowing onto the ferrite rod 153 and fouling operation.

In the main embodiment described above, a two-stage pulse-echo measurement process was carried out. In the first stage, three excitation pulses were transmitted and the received signals were integrated over three excitation periods and in the second stage sixteen excitation pulses were transmitted and the received signals were integrated over sixteen excitation periods. As those skilled in the art will appreciate, the precise number of excitation periods and/or receive periods used may be varied depending on the system design. Further, it is not essential for the number of excitation periods to match the number of receive periods. It is also possible to vary the number of excitation periods without varying the number of receive periods between the first and second measurement stages. Similarly, it is possible to vary the number of receive periods over which the signals are integrated without varying the number of excitation periods during the two measurement stages.

In the above embodiment, the excitation and processing circuitry was formed in the same device as the excitation and sensor windings. As those skilled in the art will appreciate, the excitation and the processing circuitry may be provided on a remote body from the sensor windings. All that is required is that the resonant stylus be energised by an appropriate energising field and for the signals received in the sensor windings to be transmitted to the processing circuitry.

As those skilled in the art will appreciate, the excitation and processing techniques described above may be used with other types of windings and with other types of stylus, such as those described in U.S. Pat. No. 4,878,553. Similarly, the above-described stylus may be used with different types of windings such as those described in U.S. Pat. No. 4,878,553 or it can be used with other types of processing electronics.

In the main embodiment described above, the number of excitation pulses transmitted during the second measurement cycle was fixed at sixteen. In an alternative embodiment, the number of excitation pulses used in the second measurement cycle may be varied, depending on the results of the first measurement cycle. For example, if the processing electronics can determine the click state of the stylus from the signals of the first measurement cycle, the second measurement cycle may be adapted to transmit fewer excitation pulses, thereby saving power. If the system can determine the click state of the stylus from the first measurement cycle, then it is not necessary for the system to recalculate the click status of the pen from the signals received in the second measurement cycle. Similarly, if the system can determine the x,y position of the stylus from the signals in the first measurement cycle, then it is not necessary for the system to recalculate that position using the signals from the second measurement cycle. Further, as those skilled in the art will appreciate, if the processing electronics can determine both the resonator state and the resonator's position from the signals in the first measurement cycle, it is not essential to perform the second measurement cycle at all. In this case, an appropriate inhibiting signal may be output to the excitation and receive control unit to prevent the performance of the second measurement cycle.

In the above embodiment, the stylus was designed so that when pressure was applied to the nib of the stylus the resonant frequency increased. As those skilled in the art will appreciate, the stylus may be designed so that the resonant frequency decreases when pressure is applied to the nib. This may be achieved, for example, by placing the coil towards the rear end of the ferrite rod.

In the above embodiment, a biasing spring was provided towards the rear of the stylus. In an alternative embodiment, this spring may be replaced by a low force spring at the nib-end of the inductor coil. However, in such an embodiment, the spring may need to be made short and therefore of an undesirably thin wire diameter to ensure a low actuation force for the nib, which adds to the component cost and assembly difficulty. Further, the use of a metal spring at the nib end may adversely interfere with the resonator's magnetics. A plastic spring arrangement could be used instead, but this would be susceptible to creep over time, resulting in a loss of return force.

The above embodiment has described a hand-held personal digital assistant which employs a digitising system which is embedded behind the LCD of the device. As those skilled in the art will appreciate, the digitising system described above can be used for various applications. It is particularly useful, however, for low cost high volume consumer products such as PDAS, web browsers and mobile telephones and the like. FIG. 31 illustrates the way in which a mobile telephone 351 may be adapted to include a liquid crystal display 355 and underneath the display an x-y set of digitiser windings such as those described above which are operable to sense the position of a resonant stylus 357. The digitising system may be used to allow the user to create, for example, short text messages which can then be sent by the mobile telephone to another party. If the mobile telephone includes, for example, an organiser, then the digitiser can be used to control the inputting, manipulation and outputting of data from the organiser.

In the first embodiment, the digitiser system employed a number of sensor windings, an excitation winding and a resonant stylus. In an alternative embodiment, rather than using a resonant stylus, a stylus having either a short-circuit coil or a magnetic field concentrator (such as a piece of ferrite) could be used. However, in such embodiments, lower signal levels would be induced in the sensor windings and the system could not operate in the pulse-echo mode of operation since the non-resonant elements do not continue to "ring" after the excitation signal has ended. In a further alternative embodiment, rather than using a passive stylus, a powered stylus could be used with the sensor windings discussed above. In this case, since the stylus has power to generate its own magnetic field, there is no need for the excitation winding, although it may still be provided in order to give a phase reference signal to the stylus. The power to the stylus may be provided either by a battery contained within the stylus or by connecting the stylus, via a lead, to a power source. As those skilled in the art will appreciate, whilst such powered stylus embodiments are possible, they are not preferred since they increase the cost of the stylus and/or they require a lead to the stylus which interferes with the normal use of the device by the user.

In the above embodiment, a single resonant stylus was provided. As those skilled in the art will appreciate, the system may operate with multiple styluses having different resonant frequencies. Each stylus may then be assigned a different function in the system.

In the above embodiments, the ferrite core was mounted for movement with the tip and the coil was fixed to the housing. As those skilled in the art will appreciate, the stylus can operate with the ferrite core being fixed relative to the housing and the coil being mounted for movement with the tip. In such an embodiment, the washer would preferably be mounted for movement with the coil relative to the ferrite core. Various other modifications to the stylus will be apparent to those skilled in the art and will not be described further here.

In the above embodiments, the windings were arranged over a generally rectangular measurement area corresponding to the x-y display. As those skilled in the art will appreciate, this is not essential. The sensor winding design techniques described above may be applied to winding designs which are arranged over non rectangular areas. FIG. 32a is a schematic block diagram of a hand-held personal digital assistant 401 having a rectangular display screen 403 and two electronic slider bars 405a and 405b which are positioned over the measurement area of an x-y. digitising tablet. These electronic scroll bars 405 are controlled by the interaction of the resonant stylus (not shown) and the digitizer windings mounted on the printed circuit board 407. As shown in FIG. 32a, the lower right hand corner of the printed circuit board 407 is cut away to allow space for three mechanical buttons 409a, 409b and 409c. This means that the active area of the x-y digitising tablet is not rectangular. FIG. 32b schematically illustrates the form of one of the windings 411 which forms part of the printed circuit board 407 shown in FIG. 32a. This winding 411 was designed using the same design techniques described above in the first embodiment. As shown, the winding 411 includes, for example, the flared corners 413a, 413b, 413c and 413d. The winding 411 shown in FIG. 32b is schematic in that it does not have any connection points for connecting it to the processing electronics. As those skilled in the art will appreciate, these connection points may be made at any convenient location on the winding 411.

In the above embodiment, a processing channel comprising two mixers and an integrator was provided for each sensor winding. In an alternative embodiment, a single processing channel may be used to process the signals induced in two or more of the sensor windings in a time multiplexed manner. As those skilled in the art will appreciate, whilst this reduces the complexity of the processing electronics, it increases the time required to obtain a position measurement.

In the above embodiment, the sensor windings were arranged to have a sensitivity to magnetic field from the resonator which approximately varies as a single period of a sinusoid over the measurement range. As those skilled in the art will appreciate, the sensor windings may be arranged so that this sensitivity varies through multiple periods of a sinusoid. In this case, the system will have to keep track of the current period in which the resonant stylus is located. Examples of such multiperiod windings can be found in the applicant's earlier International Application WO98/58237. Another alternative is that the sensor windings are arranged so that their sensitivity to the magnetic field from the resonator varies through a fraction of a sinusoid over the measurement area. Such an embodiment is particularly useful in applications where the measurement area is rectangular, in order to ensure that the pitch of the x sensor windings and the y sensor windings are the same.

In the above embodiment, the excitation winding was used to energise the resonator and the signals received in the sensor windings were used to identify the resonator position. In an alternative embodiment, the sensor windings may be used to energise the resonator and the signals received on the excitation winding used to identify the location of the resonator. In such an embodiment, either the sensor windings would have to be energised in turn or if the sensor windings are energised together then separate excitation frequencies would have to be applied to each (which would require separate resonant circuits in the resonator which resonate at those frequencies) so that the processing electronics can distinguish the received signals. Alternatively still, the system could operate by energising the resonator using one of the sensor windings and then receiving the signal from the resonator on another sensor winding. The way that such a system can operate is described in the applicant's earlier International Application W098/58237.

In the above embodiment, the excitation winding was wound around the outside of the sensor windings. In order to extend the measurement range of the sensor windings as far as possible towards the periphery of the sensor PCB, some of the turns of the excitation coil may alternatively be interlaced with the conductors of the sensor windings. This arrangement can also help maintain uniform outer coil field/sensitivity over the entire sensor board, which helps minimise the dynamic range of the sensor system and hence simplifies the design.

The sensor PCB which carries the excitation and sensor windings may be manufactured on a flexible printed circuit board. In this case, the connecting portion may be extended to form a flexible tail for connecting the coils to the processing electronics. A flexible PCB can also be used to minimise the thickness of the sensor board, e.g. to less than 0.2 mm.

As described above, each of the sensor windings comprises a number of transverse conductors and a number of connecting conductors for connecting the transverse conductors to each other. In the embodiment described above, the transverse conductors for the x-position sensor windings were located substantially in the y-direction whilst those for the y-position sensor windings extended substantially in the x-direction. As those skilled in the art will appreciate, this is not essential, the transverse conductors only have to cross the relevant measurement direction.

In the above embodiment, an electrostatic screen formed from a layer of carbon ink was provided between the sensor PCB and the backlight for the LCD. Other conductive layers may be used such as an evaporated aluminium film coating or a cross-hatched, fishbone or comb-shaped copper layer. Alternatively still, if the base of the electroluminescent backlight layer 11 can be grounded, then this can effectively act as the electrostatic screen instead.

In the above embodiment, a hand-held personal digital assistant has been described which employs a liquid crystal type display. As those skilled in the art will appreciate, the above digitiser system can be employed with other types of screen, such as TFT screens and the like.

In the above embodiment, the sensor PCB was located directly underneath the LCD of the hand-held PDA device. As those skilled in the art will appreciate, the sensor PCB does not have to be located underneath the LCD, it, can, for example, be located to one side of it. However, if this is the case, then the overall size of the device will have to be larger.

In the above embodiment, each of the sensor windings was formed using multiple turns of conductor. As those skilled in the art will appreciate, the sensor windings can be formed using a single turn of conductor. However, this is not preferred, since the sensor winding's sensitivity to the magnetic field generated by the resonator is less sinusoidal and the signal levels output are smaller. It is therefore preferred to have as many turns as possible in the sensor windings.

In the main embodiment described above, most of the transverse conductors of each phase quadrature sensor winding have an irregular form with multiple bends along their length. As those skilled in the art will appreciate, this is not essential. In an alternative embodiment one of the phase quadrature windings may be a conventional type of winding having substantially parallel transverse conductors (such as those described in WO 00/33244), with the transverse conductors of the other phase quadrature winding having multiple bends along their length which are designed to compensate for the positional errors of the conventional winding.

In the above embodiment, sensor windings were used which were designed to have an approximate sinusoidal coupling with the resonant stylus, as a result of which the signals output from the sensor windings varied approximately sinusoidally with the position of the stylus relative to the windings. As those skilled in the art will appreciate, the approach taken to the design of the sensor windings described above is not limited to such "sinusoidal" windings. The technique can be used on any windings which produce an output signal which varies in a non-monotonic fashion with the position to be measured and in which two or more of such sensor windings are used to resolve the ambiguity caused by this non-monotonic characteristic of the windings by appropriate processing of the sensor signals by the processing electronics.

In the above embodiment, the signals induced in the sensor windings were mixed with the excitation signal and a 90° phase shifted version of the excitation signal in order to generate in phase and quadrature phase outputs, from which the electrical phase information of the resonator was determined. As those skilled in the art will appreciate, other techniques can be used in order to extract this resonator electrical phase information, such as the timing of zero crossings of the resonator signals, although this technique is not preferred because it is sensitive to noise. Further, if the sensed signals are to be mixed with phase offset mixing signals, it is not essential that the mixing signals be 90° out of phase. However, this is preferred since it simplifies the measurement of the electrical phase.

In the above embodiments, two-dimensional x-y digitising systems have been described. As those skilled in the art will appreciate, some aspects of the present invention are not, however, limited to two-dimensional position encoders. In particular, some aspects of the present invention can be incorporated into a one-dimensional linear or rotary position encoder. For example, the resonant stylus, the sensor windings or the processing electronics described above could be used in a linear position detector. Further, it is not essential to use multiple sensor windings. The signals from a single sensor winding may be used to determine both the electrical phase information and the position information.

In the above embodiments, the resonator was magnetically coupled to the excitation windings and the sensor windings. As those skilled in the art will appreciate, the above processing electronics may be used in systems where the excitation device and/or the sensing device are capacitively coupled to the resonator.

In the above embodiments, the signals output from the sensor windings were used and position measurements were obtained by performing an arc-tangent calculation. As those skilled in the art will appreciate, it is possible to extract the position information from the received signals without performing such an arc-tangent calculation. The applicant's earlier International Applications WO98/00921 or WO90/34171 disclose alternative techniques for determining the position information from the signals induced in the sensor windings.

In the above embodiments, two phase quadrature sensor windings in each of the x- and y-directions were used in order to generate signals which varied with position in phase quadrature to each other. As those skilled in the art will appreciate, this is not essential. As long as the windings are separated along the measurement axis by some non-zero or non-multiple of 180° phase shift, the signals induced in the sensor windings can be processed to extract the position information.

Various other modifications and alternative embodiments will be apparent to those skilled in the art.

The invention claimed is:

1. A frequency determining system comprising:
   a signal generator operable, when energised by an alternating excitation signal, to generate an alternating response signal of predetermined but unknown frequency and whose amplitude varies in dependence upon the difference in frequency between the excitation signal and the response signal;
   an energising circuit operable to generate first and second excitation signals at first and second different excitation frequencies for energising said signal generator;
   a receiver operable to receive a first response signal generated by said signal generator when energised by said first excitation signal and a second response signal generated by said signal generator when energised by said second excitation signal;
   a processing circuit operable to process each of the first and second response signals received by said receiver to generate first and second amplitude measures indicative of the amplitudes of the corresponding response signals; and
   a determining circuit operable to determine a frequency measure indicative of the frequency of the alternating response signals generated by said signal generator using said first and second amplitude measures.

2. A system according to claim 1, wherein said processing circuit comprises:
   a mixing circuit operable to mix the first response signal with first and second mixing signals to provide first and second mixed signals and operable to mix the second response signal with third and fourth mixing signals to provide third and fourth mixed signals; and
   a combining circuit operable to combine the first and second mixed signals to provide said first amplitude measure and operable to combine the third and fourth mixed signals to provide said second amplitude measure.

3. A system according to claim 2, wherein said signal generator is a first signal generator and further comprising a second signal generator operable to generate said first, second, third and fourth mixing signals.

4. A system according to claim 3, wherein said second signal generator is operable to generate said mixing signals so that said first and second mixing signals are in phase quadrature and so that the said third and fourth mixing signals are in phase quadrature.

5. A system according to claim 4, wherein said second signal generator is operable to generate said first and second mixing signals at a frequency corresponding to said first excitation frequency and is operable to generate said third and fourth mixing signals at a frequency corresponding to said second excitation frequency.

6. A system according to claim 5, wherein said processing circuit is operable to process at least said first and second mixed signals to determine a phase measure which varies with the difference in frequency between the mixing signals and the respective response signal and wherein said determining circuit is operable to determine said frequency measure in dependence upon said amplitude measure and said phase measure.

7. A system according to claim 6, wherein said phase measure cyclically varies with the difference in frequency between the frequency of the alternating response signal and the corresponding mixing signals and wherein said determining circuit is operable to use said first and second amplitude measures to resolve the cyclic ambiguity associated with said phase measure.

8. A system according to claim 2, wherein said combining circuit is operable to combine said first and second mixed signals by taking the sum of the squares of the first and second mixed signals, to provide said first amplitude measure.

9. A system according to claim 2, wherein said combining circuit is operable to combine said third and fourth mixed signals by taking the sum of the squares of the third and fourth mixed signals, to provide said second amplitude measure.

10. A system according to claim 1, wherein said determining circuit is operable to determine an amplitude ratio by taking the ratio of the first and second amplitude measures and is operable to determine said frequency measure using said amplitude ratio.

11. A system according to claim 10, wherein said determining circuit is operable to determine said frequency measure in dependence upon a result of a non-linear function of said amplitude ratio.

12. A system according to claim 11, wherein said determining circuit is operable to determine said frequency measure in dependence upon a result of a logarithmic function of said amplitude ratio.

13. A system according to claim 11, wherein said determining circuit is operable to determine said frequency measure in dependence upon a result of an arc tangent function of said amplitude ratio.

14. A system according to claim 11, wherein said determining circuit is operable to determine said frequency measure by applying the result of said non-linear function to a predetermined linear transformation.

15. A system according to claim 14, wherein said determining circuit is programmable so that said predetermined linear transformation can be varied.

16. A system according to claim 11, wherein said determining circuit is programmable so that said non-linear function can be varied.

17. A system according to claim 1, wherein said energising circuit is operable to generate first and second electromagnetic signals at said first and second different excitation frequencies for energising said signal generator.

18. A system according to claim 1, wherein said signal generator is operable to generate alternating electromagnetic response signals when energised by said excitation signal.

19. A system according to claim 1, wherein said signal generator comprises a resonator.

20. A system according to claim 19, wherein said resonator is an electromagnetic resonant circuit.

21. A system according to claim 20, wherein said electromagnetic resonant circuit comprises a coil and a capacitor.

22. A system according to claim 1, wherein said signal generator is passive.

23. A system according to claim 1, wherein said signal generator is provided separate from but is electromagnetically coupled to said receiver.

24. A system according to claim 23, wherein said signal generator and said receiver are relatively movable.

25. A system according to claim 24, further comprising position processing circuitry operable to process at least one of said first and second response signals to determine the relative position between said signal generator and said receiver.

26. A system according to claim 1, wherein said signal generator is operable to vary the frequency of said response signal in dependence upon the value of a variable and wherein said determining circuit is operable to determine the value of said variable from the determined frequency measure.

27. A system according to claim 26, wherein said signal generator comprises an electrically resonant circuit and a component for varying the inductance, capacitance or resistance of the resonant circuit.

28. A system according to claim 27, wherein said component comprises a ferrite element which is displaceable relative to an inductance coil of said resonant circuit and wherein the position of said ferrite element relative to said coil is moved in dependence upon the value of said variable in order to vary the inductance of said coil and hence the resonant frequency of said resonant circuit.

29. A system according to claim 1 wherein said energising circuit is operable to generate said first excitation signal during a first time interval and is operable to generate said second excitation signal during a second time interval after said first time interval.

30. A system according to claim 29, wherein said processing circuit is operable to process the first response signal during a third time interval between said first and second time intervals and is operable to process said second response signal during a fourth time interval after said second time interval.

31. A system according to claim 1, wherein said energising circuit is operable to generate three or more excitation signals at respective different excitation frequencies, wherein said receiver is operable to receive three or more response signals generated by said signal generator when energised by the respective three or more excitation signals, wherein said processing circuit is operable to process said three or more response signals to generate three or more amplitude measures indicative of the amplitudes of the corresponding response signals; and wherein said determining circuit is operable to determine said frequency measure using said three or more amplitude measures.

32. A system according to claim 31, wherein said processing circuit is operable to process the first, second and third response signals to generate first, second and third processed signals respectively, wherein said processing circuit comprises a combining circuit operable to combine the first and second processed signals to remove a common offset from the first and second processed signals to provide a first combined signal and to combine the second and third processed signals to remove a common offset from the second and third processed signals and to provide a second combined signal, and wherein said processing circuit is operable to determine said first and second amplitude measures using said first and second combined signals.

33. An apparatus according to claim 1, wherein said receiver is operable to receive three or more response signals generated by said signal generator when energised by three or more excitation signals, wherein said processing circuit is operable to process said three or more response signals to generate three or more amplitude measures indicative of the amplitudes of the corresponding response signals; and wherein said determining circuit is operable to determine said frequency measure using said three or more amplitude measures.

34. An apparatus according to claim 33, wherein said processing circuit is operable to process the first, second and third response signals to generate first, second and third processed signals respectively, wherein said processing circuit comprises a combining circuit operable to combine the first and second processed signals to remove a common offset from the first and second processed signals to provide a first combined signal and to combine the second and third processed signals to remove a common offet from the second and third processed signals and to provide a second combined signal, and wherein said processing circuit is operable to determine said first and second amplitude measures using said first and second combined signals.

35. A positioning system comprising first and second relatively moveable members,
the first member comprising a signal generator operable, when energised by an alternating excitation signal, to generate an alternating response signal of predetermined but unknown frequency and whose amplitude varies in dependence upon the difference in frequency between the excitation signal and the response signal; and
the second member comprising:
an energising circuit operable to generate first and second excitation signals at first and second different excitation frequencies for energising said signal generator;
a receiver operable to receive a first response signal generated by said signal generator when energised by said first excitation signal and a second response signal generated by said signal generator when energised by said second excitation signal;
a processing circuit operable to process each of the first and second response signals received by said receiver to generate first and second amplitude measures indicative of the amplitudes of the corresponding response signals;
a determining circuit operable to determine a frequency measure indicative of the frequency of the alternating response signals generated by said signal generator using said first and second amplitude measures; and
a positioning circuit operable to process at least one of the first and second response signals to determine the relative position between the first and second members.

36. A positioning system according to claim 35, wherein said signal generator is operable to vary the frequency of said response signal in dependence upon a status of the first member and wherein said second member further comprises a second determining circuit operable to determine the status of said first member using the determined frequency measure.

37. A positioning system according to claim 36, wherein said first member comprises a position pointer, wherein said second member comprises an x-y digitising tablet and wherein said signal generator is operable to vary the frequency of said response signal when the position pointer is brought into contact with an x-y digitising surface of said tablet.

38. A positioning system according to claim 35, wherein said processing circuit comprises:
a mixing circuit operable to mix the first response signal with first and second mixing signals to provide first and second mixed signals and operable to mix the second response signal with third and fourth mixing signals to provide third and fourth mixed signals; and
a combining circuit operable to combine the first and second mixed signals to provide said first amplitude measure and operable to combine the third and fourth mixed signals to provide said second amplitude measure.

* * * * *